(12) United States Patent
Kochanek et al.

(10) Patent No.: US 12,435,112 B2
(45) Date of Patent: Oct. 7, 2025

(54) ADENOVIRUS COMPRISING A MODIFIED ADENOVIRUS HEXON PROTEIN

(71) Applicant: UNIVERSITÄT ULM, Ulm (DE)

(72) Inventors: Stefan Kochanek, Blaubeuren (DE); Lea Krutzke, Sachsenheim (DE); Robin Nilson, Ulm (DE); Olivia Lübbers, Neu-Ulm (DE)

(73) Assignee: UNIVERSITÄT ULM, Ulm (DE)

( * ) Notice: Subject to any disclaimer, the term of this patent is extended or adjusted under 35 U.S.C. 154(b) by 832 days.

(21) Appl. No.: 17/769,689

(22) PCT Filed: Oct. 20, 2020

(86) PCT No.: PCT/EP2020/079494
§ 371 (c)(1),
(2) Date: Apr. 15, 2022

(87) PCT Pub. No.: WO2021/078735
PCT Pub. Date: Apr. 29, 2021

(65) Prior Publication Data
US 2022/0380411 A1 Dec. 1, 2022

(30) Foreign Application Priority Data
Oct. 21, 2019 (EP) ..................................... 19204420

(51) Int. Cl.
| | |
|---|---|
| *A61K 48/00* | (2006.01) |
| *A61K 35/28* | (2015.01) |
| *C07K 14/005* | (2006.01) |
| *C12N 15/86* | (2006.01) |

(52) U.S. Cl.
CPC ............ *C07K 14/005* (2013.01); *A61K 35/28* (2013.01); *C12N 15/86* (2013.01); *C12N 2710/10322* (2013.01); *C12N 2710/10332* (2013.01); *C12N 2710/10343* (2013.01); *C12N 2810/40* (2013.01)

(58) Field of Classification Search
CPC .... C07K 14/005; C07K 14/745; A61K 35/28; A61K 48/0041; A61K 35/761; C12N 15/86; C12N 2710/10322; C12N 2710/10332; C12N 2710/10343; C12N 2810/40; C12N 2710/10345
See application file for complete search history.

(56) References Cited

U.S. PATENT DOCUMENTS

| | | | |
|---|---|---|---|
| 11,155,599 B2 * | 10/2021 | Fueyo-Margareto | ........................ A61K 39/00117 |
| 2013/0302313 A1 | 11/2013 | Yu et al. | |
| 2014/0377294 A1 * | 12/2014 | Fueyo-Margareto | ........................ C07K 14/70596 435/235.1 |

FOREIGN PATENT DOCUMENTS

| | | | |
|---|---|---|---|
| CA | 3090859 A1 * | 8/2019 | ........... A61K 35/761 |
| JP | 2016521709 A | 7/2016 | |
| JP | 2017518765 A | 7/2017 | |
| WO | 2014197638 A3 | 2/2015 | |
| WO | 2015173578 A1 | 11/2015 | |
| WO | 2016049201 A1 | 3/2016 | |
| WO | 2016118433 A1 | 7/2016 | |

OTHER PUBLICATIONS

Khare R, Reddy VS, Nemerow GR, Barry MA. Identification of adenovirus serotype 5 hexon regions that interact with scavenger receptors. J Virol. Feb. 2012;86(4):2293-301. (Year: 2012).*
Yu D, Jin C, Leja J, Majdalani N, Nilsson B, Eriksson F, Essand M. Adenovirus with hexon Tat-protein transduction domain modification exhibits increased therapeutic effect in experimental neuroblastoma and neuroendocrine tumors. J Virol. Dec. 2011;85(24):13114-23. (Year: 2011).*
Lucas T, Benihoud K, Vigant F, Schmidt CQ, Wortmann A, Bachem MG, Simmet T, Kochanek S. Hexon modification to improve the activity of oncolytic adenovirus vectors against neoplastic and stromal cells in pancreatic cancer. PLoS One. Feb. 18, 2015;10(2):e0117254. (Year: 2015).*
Krutzke, L , et al., "Substitution of blood coagulation factor X-binding to Ad5 by position-specific PEGylation: Preventing vector clearance and preserving infectivity", Journal of Controlled Release 235, 379-392 (2016).
Patent Cooperation Treaty, International Searching Authority, Search Report and Written Opinion for PCT/EP2020/079494, 16 pages, dated Jan. 25, 2021.
Jonsson, M , et al., "Coagulation Factors IX and X Enhance Binding and Infection of Adenovirus Types 5 and 31 in Human Epithelial Cells", Journal of Virology 83 (8), 3816-3825 (2009).
Zaiss, A , et al., "Differential Effects of Murine and Human Factor X on Adenovirus Transduction via Cell-surface Heparan Sulfate", Journal of Biological Chemistry 286 (28) 24535-24543 (2011).

(Continued)

*Primary Examiner* — Janet L Andres
*Assistant Examiner* — Samadhan Jaising Jadhao
(74) *Attorney, Agent, or Firm* — Viksnins Harris Padys Malen LLP

(57) ABSTRACT

The invention discloses a human adenovirus species C having a capsid which comprises a modified adenovirus hexon protein, wherein the modified adenovirus hexon protein has a modified HVR1 region, wherein the modified HVR1 region has the sequence DEAATA-LEINLKKKKQAEQQ (SEQ ID NO.: 1). The invention further discloses the adenovirus of the disclosure for use in treating or preventing a human disease. The invention further discloses a nucleic acid encoding the modified adenovirus hexon protein. The invention further discloses the use of an adenovirus according to the disclosure for transducing mesenchymal stromal cells (MSCs) or tumor cells. The invention further discloses an in vitro method for transducing MSCs and a transduced MSC obtainable by the method. The invention further discloses the transduced MSC of the disclosure for use in treating a disease.

21 Claims, 16 Drawing Sheets
Specification includes a Sequence Listing.

(56) References Cited

OTHER PUBLICATIONS

Zhao, C., et al., "Adenovirus-Mediated Gene Transfer in Mesenchymal Stem Cells Can Be Significantly Enhanced by the Cationic Polymer Polybrene", PLOS One 9 (3), e92908, 1-8 (2014).

Alba, R., et al., "Identification of coagulation factor (F)X binding sites on the adenovirus serotype 5 hexon: effect of mutagenesis on FX interactions and gene transfer", Blood 114, 965-971 (2009).

Alemany, R., et al., "Blood clearance rates of adenovirus type 5 in mice", J Gen Virol 81, 2605-2609 (2000).

Fekete, N., et al., "GMP-compliant isolation and large-scale expansion of bone marrow-derived MSC", PLOS One 7, e43255 (2012).

Fekete, N., et al., "Platelet lysate from whole blood-derived pooled platelet concentrates and apheresis-derived platelet concentrates for the isolation and expansion of human bone marrow mesenchymal stromal cells: production process, content and identification of active compo", Cytotherapy 14, 540-554 (2012).

Khare, R., et al., "Identification of Adenovirus Serotype 5 Hexon Regions That Interact with Scavenger Receptors", J Virol 86, 2293-2301 (2012).

Kirby, I., et al., "Identification of Contact Residues and Definition of the CAR-Binding Site of Adenovirus Type 5 Fiber Protein", J Virol 74, 2804-2813 (2000).

* cited by examiner

Hypervariable region 1 of hexon

HAdV5 wildtype  DEAATALEINLEEEDDDNEDEVDEQAEQQKTHVF
HAdV5 Mut3      DEAATALEINL----KKKK------QAEQQKTHVF

A

B

| | HVR1 | HVR5 | HVR7 |
|---|---|---|---|
| HAdV5 wildtype | DEAATALEINLEEEDDDNEDEVDEQAEQQKTHVF | STTEAAAGNGDNLTPK | GGVINTETLTKVKPKTGQENGWEKDATEFSDKNEIRVGNNF |
| HAdV5-ΔHVR1 | DEAATALEINL------------QAEQQKTHVF | (...) | (...) |
| HAdV5 Mut2 | DEAATALKINLEEEKKKMEKEVDEQAEQQKTHVF | (...) | (...) |
| HAdV5 Mut3 | DEAATALEINL----KKKK------QAEQQKTHVF | (...) | (...) |
| HAdV5 Mut4 | DEAATALAINLKK------NK--VK-QAEQQKTHVF | (...) | (...) |
| HAdV5 Mut5 | DEAATALEINL----KKKK------QAEQQKTHVF | STTKAAAGNGKNLTPK | GGVINTETLTKVKPKTGQRNGWKKKATEFSDKNEIRVGNNF |
| HAdV5 Mut6 | DEAATALKIRLKK------NK--VK-QAKQQKTHVF | STTKAAAGNGKNLTPK | GGVINTETLTKVKPKTGQRNGWKKKATEFSDKNEIRVGNNF |

Fig. 1

Hypervariable region 1 of hexon

```
HAdV5 wildtype  gatgaagctgctactgctcttgaaataaacctagaagaagaggacgatgac
HAdV5 Mut3      gatgaagctgctactgctcttgaaataaaccta-----------AAAAAG HAdV5 wildtype  aacgaagacgaagtagacgagcaagctgagcagcaaaaaactcacgtattt
HAdV5 Mut3      AAAAAG-------------caagctgagcagcaaaaaactcacgtattt
```

Fig. 2

Hypervariable region 1 of hexon

HAdV5 wildtype    DEAATALEINLEEEDDDNEDEVDEQAEQQKTHVF
HAdV5 Mut7        DEAATALEINLKKKKK------QAEQQKTHVF
HAdV5 Mut8        DEAATALEINLKKKKKKK----QAEQQKTHVF
HAdV5 Mut9        DEAATALEINLGGSGGGSGKKKKKKKGSGGGSGGQAEQQKTHVF

Fig. 14

SEQUENCE LISTING

```
<160> NUMBER OF SEQ ID NOS: 53

<210> SEQ ID NO 1
<211> LENGTH: 20
<212> TYPE: PRT
<213> ORGANISM: Human Adenovirus Species C

<400> SEQUENCE: 1

Asp Glu Ala Ala Thr Ala Leu Glu Ile Asn Leu Lys Lys Lys Lys Gln
1               5                   10                  15

Ala Glu Gln Gln
            20
```

<210> SEQ ID NO 2
<211> LENGTH: 2832
<212> TYPE: DNA
<213> ORGANISM: Human Adenovirus Species C

<400> SEQUENCE: 2

```
atggctaccc cttcgatgat gccgcagtgg tcttacatgc acatctcggg ccaggacgcc      60
tcggagtacc tgagccccgg gctggtgcag tttgcccgcg ccaccgagac gtacttcagc     120
ctgaataaca agtttagaaa ccccacggtg gcgcctacgc acgacgtgac cacagaccgg     180
tcccagcgtt tgacgctgcg gttcatccct gtggaccgtg aggatactgc gtactcgtac     240
aaggcgcggt tcaccctagc tgtgggtgat aaccgtgtgc tggacatggc ttccacgtac     300
tttgacatcc gcggcgtgct ggacaggggc cctactttta agccctactc tggcactgcc     360
tacaacgccc tggctcccaa gggtgcccca atccttgcg aatgggatga agctgctact      420
gctcttgaaa taaacctaaa aagaaaaag caagctgagc agcaaaaaac tcacgtattt      480
gggcaggcgc cttattctgg tataaatatt acaaaggagg gtattcaaat aggtgtcgaa     540
ggtcaaacac ctaaatatgc cgataaaaca tttcaacctg aacctcaaat aggagaatct     600
cagtggtacg aaacagaaat taatcatgca gctgggagag tcctaaaaaa gactacccca     660
atgaaaccat gttacggttc atatgcaaaa cccacaaatg aaaatggagg caaggcatt      720
cttgtaaagc aacaaatgg aaagctagaa agtcaagtgg aaatgcaatt tttctcaact      780
actgaggcag ccgcaggcaa tggtgataac ttgactccta aagtggtatt gtacagtgaa     840
gatgtagata tagaaacccc agacactcat atttcttaca tgcccactat taaggaaggt     900
aactcacgag aactaatggg ccaacaatct atgcccaaca ggcctaatta cattgctttt     960
agggacaatt ttattggtct aatgtattac aacagcacgg gtaatatggg tgttctggcg    1020
ggccaagcat cgcagttgaa tgctgttgta gatttgcaag acagaaacac agagctttca    1080
taccagcttt tgcttgattc cattggtgat agaaccaggt acttttctat gtggaatcag    1140
gctgttgaca gctatgatcc agatgttaga attattgaaa atcatggaac tgaagatgaa    1200
cttccaaatt actgctttcc actgggaggt gtgattaata cagagactct taccaaggta    1260
aaacctaaaa caggtcagga aatggatgg aaaaagatg ctacagaatt ttcagataaa    1320
aatgaaataa gagttggaaa taattttgcc atggaaatca atctaaatgc caacctgtgg    1380
agaaatttcc tgtactccaa catagcgctg tatttgcccg acaagctaaa gtacagtcct    1440
tccaacgtaa aaatttctga taacccaaac acctacgact acatgaacaa gcgagtggtg    1500
gctcccgggc tagtggactg ctacattaac cttggagcac gctggtccct tgactatatg    1560
gacaacgtca acccatttaa ccaccaccgc aatgctggcc tgcgctaccg ctcaatgttg    1620
ctgggcaatg tcgctatgt gcccttccac atccaggtgc ctcagaagtt ctttgccatt    1680
aaaaacctcc ttctcctgcc gggctcatac acctacgagt ggaacttcag gaaggatgtt    1740
aacatggttc tgcagagctc cctaggaaat gacctaaggg ttgacggagc agcattaag    1800
tttgatagca tttgccttta cgccaccttc ttccccatgg cccacaacac cgcctccacg    1860
cttgaggcca tgcttagaaa cgacaccaac gaccagtcct ttaacgacta tctctccgcc    1920
gccaacatgc tctaccctat acccgccaac gctaccaacg tgcccatatc catcccctcc    1980
cgcaactggg cggctttccg cggctgggcc ttcacgcgcc ttaagactaa ggaaacccca    2040
tcactgggct cgggctacga cccttattac acctactctg gctctatacc ctacctagat    2100
ggaaccttt acctcaacca cacctttaag aaggtggcca ttacctttga ctcttctgtc    2160
```

-continued

```
agctggcctg gcaatgaccg cctgcttacc cccaacgagt ttgaaattaa gcgctcagtt    2220
gacggggagg gttacaacgt tgcccagtgt aacatgacca agactggttc ctggtacaa    2280 atgctagcta actataacat tggctaccag ggcttctata tcccagagag ctacaaggac    2340
cgcatgtact ccttctttag aaacttccag cccatgagcc gtcaggtggt ggatgatact    2400
aaatacaagg actaccaaca ggtgggcatc ctacaccaac acaacaactc tggatttgtt    2460
ggctaccttg cccccaccat gcgcgaagga caggcctacc ctgctaactt ccccatccg    2520 cttataggca agaccgcagt tgacagcatt acccagaaaa agtttctttg cgatcgcacc    2580 cttctggcgca tcccattctc cagtaacttt atgtccatgg gcgcactcac agacctgggc    2640
caaaaccttc tctacgccaa ctccgcccac gcgctagaca tgacttttga ggtggatccc    2700
atggacgagc ccaccttcct ttatgttttg tttgaagtct ttgacgtggt ccgtgtgcac    2760
cagccgcacc gcggcgtcat cgaaaccgtg tacctgcgca cgcccttctc ggccggcaac    2820
gccacaacat aa                                                          2832
```

<210> SEQ ID NO 3
<211> LENGTH: 943
<212> TYPE: PRT
<213> ORGANISM: Human Adenovirus Species C

<400> SEQUENCE: 3

```
Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
            20                  25                  30

Arg Ala Thr Glu Thr Tyr Phe Ser Leu Asn Asn Lys Phe Arg Asn Pro
        35                  40                  45

Thr Val Ala Pro Thr His Asp Val Thr Thr Asp Arg Ser Gln Arg Leu
    50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
                85                  90                  95

Ala Ser Thr Tyr Phe Asp Ile Arg Gly Val Leu Asp Arg Gly Pro Thr
            100                 105                 110

Phe Lys Pro Tyr Ser Gly Thr Ala Tyr Asn Ala Leu Ala Pro Lys Gly
        115                 120                 125

Ala Pro Asn Pro Cys Glu Trp Asp Glu Ala Ala Thr Ala Leu Glu Ile
    130                 135                 140

Asn Leu Lys Lys Lys Lys Gln Ala Glu Gln Gln Lys Thr His Val Phe
145                 150                 155                 160

Gly Gln Ala Pro Tyr Ser Gly Ile Asn Ile Thr Lys Glu Gly Ile Gln
                165                 170                 175

Ile Gly Val Glu Gly Gln Thr Pro Lys Tyr Ala Asp Lys Thr Phe Gln
            180                 185                 190

Pro Glu Pro Gln Ile Gly Glu Ser Gln Trp Tyr Glu Thr Glu Ile Asn
        195                 200                 205

His Ala Ala Gly Arg Val Leu Lys Lys Thr Thr Pro Met Lys Pro Cys
    210                 215                 220

Tyr Gly Ser Tyr Ala Lys Pro Thr Asn Glu Asn Gly Gly Gln Gly Ile
225                 230                 235                 240

Leu Val Lys Gln Gln Asn Gly Lys Leu Glu Ser Gln Val Glu Met Gln
                245                 250                 255
```

-continued

```
Phe Phe Ser Thr Thr Glu Ala Ala Gly Asn Gly Asp Asn Leu Thr
            260                 265                 270

Pro Lys Val Val Leu Tyr Ser Glu Asp Val Asp Ile Glu Thr Pro Asp
        275                 280                 285

Thr His Ile Ser Tyr Met Pro Thr Ile Lys Glu Gly Asn Ser Arg Glu
    290                 295                 300

Leu Met Gly Gln Gln Ser Met Pro Asn Arg Pro Asn Tyr Ile Ala Phe
305                 310                 315                 320

Arg Asp Asn Phe Ile Gly Leu Met Tyr Tyr Asn Ser Thr Gly Asn Met
                325                 330                 335

Gly Val Leu Ala Gly Gln Ala Ser Gln Leu Asn Ala Val Val Asp Leu
                340                 345                 350

Gln Asp Arg Asn Thr Glu Leu Ser Tyr Gln Leu Leu Leu Asp Ser Ile
            355                 360                 365

Gly Asp Arg Thr Arg Tyr Phe Ser Met Trp Asn Gln Ala Val Asp Ser
    370                 375                 380

Tyr Asp Pro Asp Val Arg Ile Ile Glu Asn His Gly Thr Glu Asp Glu
385                 390                 395                 400

Leu Pro Asn Tyr Cys Phe Pro Leu Gly Gly Val Ile Asn Thr Glu Thr
                405                 410                 415

Leu Thr Lys Val Lys Pro Lys Thr Gly Gln Glu Asn Gly Trp Glu Lys
            420                 425                 430

Asp Ala Thr Glu Phe Ser Asp Lys Asn Glu Ile Arg Val Gly Asn Asn
        435                 440                 445

Phe Ala Met Glu Ile Asn Leu Asn Ala Asn Leu Trp Arg Asn Phe Leu
    450                 455                 460

Tyr Ser Asn Ile Ala Leu Tyr Leu Pro Asp Lys Leu Lys Tyr Ser Pro
465                 470                 475                 480

Ser Asn Val Lys Ile Ser Asp Asn Pro Asn Thr Tyr Asp Tyr Met Asn
                485                 490                 495

Lys Arg Val Val Ala Pro Gly Leu Val Asp Cys Tyr Ile Asn Leu Gly
            500                 505                 510

Ala Arg Trp Ser Leu Asp Tyr Met Asp Asn Val Asn Pro Phe Asn His
        515                 520                 525

His Arg Asn Ala Gly Leu Arg Tyr Arg Ser Met Leu Leu Gly Asn Gly
    530                 535                 540

Arg Tyr Val Pro Phe His Ile Gln Val Pro Gln Lys Phe Phe Ala Ile
545                 550                 555                 560

Lys Asn Leu Leu Leu Leu Pro Gly Ser Tyr Thr Tyr Glu Trp Asn Phe
                565                 570                 575

Arg Lys Asp Val Asn Met Val Leu Gln Ser Ser Leu Gly Asn Asp Leu
            580                 585                 590

Arg Val Asp Gly Ala Ser Ile Lys Phe Asp Ser Ile Cys Leu Tyr Ala
        595                 600                 605

Thr Phe Phe Pro Met Ala His Asn Thr Ala Ser Thr Leu Glu Ala Met
    610                 615                 620

Leu Arg Asn Asp Thr Asn Asp Gln Ser Phe Asn Asp Tyr Leu Ser Ala
625                 630                 635                 640

Ala Asn Met Leu Tyr Pro Ile Pro Ala Asn Ala Thr Asn Val Pro Ile
                645                 650                 655

Ser Ile Pro Ser Arg Asn Trp Ala Ala Phe Arg Gly Trp Ala Phe Thr
            660                 665                 670
```

Arg Leu Lys Thr Lys Glu Thr Pro Ser Leu Gly Ser Gly Tyr Asp Pro
            675                 680                 685

Tyr Tyr Thr Tyr Ser Gly Ser Ile Pro Tyr Leu Asp Gly Thr Phe Tyr
        690                 695                 700

Leu Asn His Thr Phe Lys Lys Val Ala Ile Thr Phe Asp Ser Val
705                 710                 715                 720

Ser Trp Pro Gly Asn Asp Arg Leu Leu Thr Pro Asn Glu Phe Glu Ile
                725                 730                 735

Lys Arg Ser Val Asp Gly Glu Gly Tyr Asn Val Ala Gln Cys Asn Met
                740                 745                 750

Thr Lys Asp Trp Phe Leu Val Gln Met Leu Ala Asn Tyr Asn Ile Gly
            755                 760                 765

Tyr Gln Gly Phe Tyr Ile Pro Glu Ser Tyr Lys Asp Arg Met Tyr Ser
        770                 775                 780

Phe Phe Arg Asn Phe Gln Pro Met Ser Arg Gln Val Val Asp Asp Thr
785                 790                 795                 800

Lys Tyr Lys Asp Tyr Gln Gln Val Gly Ile Leu His Gln His Asn Asn
                805                 810                 815

Ser Gly Phe Val Gly Tyr Leu Ala Pro Thr Met Arg Glu Gly Gln Ala
                820                 825                 830

Tyr Pro Ala Asn Phe Pro Tyr Pro Leu Ile Gly Lys Thr Ala Val Asp
            835                 840                 845

Ser Ile Thr Gln Lys Lys Phe Leu Cys Asp Arg Thr Leu Trp Arg Ile
        850                 855                 860

Pro Phe Ser Ser Asn Phe Met Ser Met Gly Ala Leu Thr Asp Leu Gly
865                 870                 875                 880

Gln Asn Leu Leu Tyr Ala Asn Ser Ala His Ala Leu Asp Met Thr Phe
                885                 890                 895

Glu Val Asp Pro Met Asp Glu Pro Thr Leu Leu Tyr Val Leu Phe Glu
            900                 905                 910

Val Phe Asp Val Val Arg Val His Gln Pro His Arg Gly Val Ile Glu
        915                 920                 925

Thr Val Tyr Leu Arg Thr Pro Phe Ser Ala Gly Asn Ala Thr Thr
930                 935                 940

<210> SEQ ID NO 4
<211> LENGTH: 2859
<212> TYPE: DNA
<213> ORGANISM: Human Adenovirus Species C

<400> SEQUENCE: 4
atggctaccc cttcgatgat gccgcagtgg tcttacatgc acatctcggg ccaggacgcc     60
tcggagtacc tgagcccggg ctggtgcag tttgcccgcg ccaccgagac gtacttcagc     120
ctgaataaca gtttagaaa ccccacggtg gcgcctacgc acgacgtgac cacagaccgg     180
tcccagcgtt tgacgctgcg gttcatccct gtggaccgtg aggatactgc gtactcgtac     240
aaggcgcggt tcacccctagc tgtgggtgat aaccgtgtgc tggacatggc ttccacgtac     300
tttgacatcc gcggcgtgct ggacaggggc cctacttta agccctactc tggcactgcc     360
tacaacgccc tggctcccaa gggtgcccca atccttgcg aatgggatga agctgctact     420
gctcttgaaa taaacctaga agaaggaac gatgacaacg aagacgaagt agacgagcaa     480
gctgagcagc aaaaaactca cgtatttggg caggcgcctt attctggtat aaatattaca     540
aaggagggta ttcaaatagg tgtcgaaggt caaacaccta aatatgccga taaaacattt     600

```
caacctgaac ctcaaatagg agaatctcag tggtacgaaa cagaaattaa tcatgcagct    660
gggagagtcc taaaaaagac taccccaatg aaaccatgtt acggttcata tgcaaaaccc    720
acaaatgaaa atggagggca aggcattctt gtaaagcaac aaaatggaaa gctagaaagt    780
caagtggaaa tgcaattttt ctcaactact gaggcagccg caggcaatgg tgataacttg    840
actcctaaag tggtattgta cagtgaagat gtagatatag aaaccccaga cactcatatt    900
tcttacatgc ccactattaa ggaaggtaac tcacgagaac taatgggcca acaatctatg    960
cccaacaggc ctaattacat tgcttttagg gacaatttta ttggtctaat gtattacaac   1020
agcacgggta atatgggtgt tctggcgggc caagcatcgc agttgaatgc tgttgtagat   1080
ttgcaagaca gaaacacaga gctttcatac cagcttttgc ttgattccat tggtgataga   1140
accaggtact tttctatgtg gaatcaggct gttgacagct atgatccaga tgttagaatt   1200
attgaaaatc atggaactga agatgaactt ccaaattact gctttccact gggaggtgtg   1260
attaatacag agactcttac caaggtaaaa cctaaaacag gtcaggaaaa tggatgggaa   1320
aaagatgcta cagaattttc agataaaaat gaaataagag ttggaaataa ttttgccatg   1380
gaaatcaatc taaatgccaa cctgtggaga aatttcctgt actccaacat agcgctgtat   1440
ttgcccgaca agctaaagta cagtccttcc aacgtaaaaa tttctgataa cccaaacacc   1500
tacgactaca tgaacaagcg agtggtggct cccgggctag tggactgcta cattaacctt   1560
ggagcacgct ggtcccttga ctatatggac aacgtcaacc catttaacca ccaccgcaat   1620
gctggcctgc gctaccgctc aatgttgctg gcaatggtc gctatgtgcc cttccacatc   1680
caggtgcctc agaagttctt tgccattaaa acctccttc tcctgccggg ctcatacacc   1740
tacgagtgga acttcaggaa ggatgttaac atggttctgc agagctccct aggaaatgac   1800
ctaagggttg acggagccag cattaagttt gatagcattt gcctttacgc caccttcttc   1860
cccatggccc acaacaccgc ctccacgctt gaggccatgc ttagaaacga caccaacgac   1920
cagtcccttta cgactatct ctccgccgcc aacatgctct accctatacc cgccaacgct   1980
accaacgtgc ccatatccat ccccctcccgc aactgggcgg cttccgcgg ctgggccttc   2040
acgcgcctta agactaagga aaccccatca ctgggctcgg gctacgaccc ttattacacc   2100
tactctggct ctataccctta cctagatgga acctttttacc tcaaccacac ctttaagaag   2160
gtggccatta cctttgactc ttctgtcagc tggcctggca atgaccgcct gcttacccc    2220
aacgagtttg aaattaagcg ctcagttgac ggggagggtt acaacgttgc ccagtgtaac   2280
atgaccaaag actggttcct ggtacaaatg ctagctaact ataacattgg ctaccagggc   2340
ttctatatcc cagagagcta caaggaccgc atgtactcct tctttagaaa cttccagccc   2400
atgagccgtc aggtggtgga tgatactaaa tacaaggact accaacaggt gggcatccta   2460
caccaacaca caacctctgg atttgttggc taccttgccc ccaccatgcg cgaaggacag   2520
gcctaccctg ctaacttccc ctatccgctt ataggcaaga ccgcagttga cagcattacc   2580
cagaaaaagt ttctttgcga tcgcaccctt tggcgcatcc cattctccag taactttatg   2640
tccatgggcg cactcacaga cctgggccaa aaccttctct acgccaactc cgcccacgcg   2700
ctagacatga cttttgaggt ggatcccatg gacgagccca ccttcttta tgttttgttt   2760
gaagtctttg acgtggtccg tgtgcaccag ccgcaccgcg gcgtcatcga aaccgtgtac   2820
ctgcgcacgc ccttctcggc cggcaacgcc acaacataa                          2859

<210> SEQ ID NO 5
<211> LENGTH: 952
```

<212> TYPE: PRT
<213> ORGANISM: Human Adenovirus Species C

<400> SEQUENCE: 5

```
Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
            20                  25                  30

Arg Ala Thr Glu Thr Tyr Phe Ser Leu Asn Asn Lys Phe Arg Asn Pro
        35                  40                  45

Thr Val Ala Pro Thr His Asp Val Thr Thr Asp Arg Ser Gln Arg Leu
    50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
                85                  90                  95

Ala Ser Thr Tyr Phe Asp Ile Arg Gly Val Leu Asp Arg Gly Pro Thr
            100                 105                 110

Phe Lys Pro Tyr Ser Gly Thr Ala Tyr Asn Ala Leu Ala Pro Lys Gly
        115                 120                 125

Ala Pro Asn Pro Cys Glu Trp Asp Glu Ala Ala Thr Ala Leu Glu Ile
    130                 135                 140

Asn Leu Glu Glu Glu Asp Asp Asp Asn Glu Asp Glu Val Asp Glu Gln
145                 150                 155                 160

Ala Glu Gln Gln Lys Thr His Val Phe Gly Gln Ala Pro Tyr Ser Gly
                165                 170                 175

Ile Asn Ile Thr Lys Glu Gly Ile Gln Ile Gly Val Glu Gly Gln Thr
            180                 185                 190

Pro Lys Tyr Ala Asp Lys Thr Phe Gln Pro Glu Pro Gln Ile Gly Glu
        195                 200                 205

Ser Gln Trp Tyr Glu Thr Glu Ile Asn His Ala Ala Gly Arg Val Leu
    210                 215                 220

Lys Lys Thr Thr Pro Met Lys Pro Cys Tyr Gly Ser Tyr Ala Lys Pro
225                 230                 235                 240

Thr Asn Glu Asn Gly Gly Gln Gly Ile Leu Val Lys Gln Gln Asn Gly
                245                 250                 255

Lys Leu Glu Ser Gln Val Glu Met Gln Phe Phe Ser Thr Thr Glu Ala
            260                 265                 270

Ala Ala Gly Asn Gly Asp Asn Leu Thr Pro Lys Val Val Leu Tyr Ser
        275                 280                 285

Glu Asp Val Asp Ile Glu Thr Pro Asp Thr His Ile Ser Tyr Met Pro
    290                 295                 300

Thr Ile Lys Glu Gly Asn Ser Arg Glu Leu Met Gly Gln Gln Ser Met
305                 310                 315                 320

Pro Asn Arg Pro Asn Tyr Ile Ala Phe Arg Asp Asn Phe Ile Gly Leu
                325                 330                 335

Met Tyr Tyr Asn Ser Thr Gly Asn Met Gly Val Leu Ala Gly Gln Ala
            340                 345                 350

Ser Gln Leu Asn Ala Val Val Asp Leu Gln Asp Arg Asn Thr Glu Leu
        355                 360                 365

Ser Tyr Gln Leu Leu Leu Asp Ser Ile Gly Asp Arg Thr Arg Tyr Phe
    370                 375                 380

Ser Met Trp Asn Gln Ala Val Asp Ser Tyr Asp Pro Asp Val Arg Ile
385                 390                 395                 400
```

```
Ile Glu Asn His Gly Thr Glu Asp Glu Leu Pro Asn Tyr Cys Phe Pro
            405                 410                 415

Leu Gly Gly Val Ile Asn Thr Glu Thr Leu Thr Lys Val Lys Pro Lys
            420                 425                 430

Thr Gly Gln Glu Asn Gly Trp Glu Lys Asp Ala Thr Glu Phe Ser Asp
            435                 440                 445

Lys Asn Glu Ile Arg Val Gly Asn Asn Phe Ala Met Glu Ile Asn Leu
450                 455                 460

Asn Ala Asn Leu Trp Arg Asn Phe Leu Tyr Ser Asn Ile Ala Leu Tyr
465                 470                 475                 480

Leu Pro Asp Lys Leu Lys Tyr Ser Pro Ser Asn Val Lys Ile Ser Asp
            485                 490                 495

Asn Pro Asn Thr Tyr Asp Tyr Met Asn Lys Arg Val Val Ala Pro Gly
            500                 505                 510

Leu Val Asp Cys Tyr Ile Asn Leu Gly Ala Arg Trp Ser Leu Asp Tyr
            515                 520                 525

Met Asp Asn Val Asn Pro Phe Asn His His Arg Asn Ala Gly Leu Arg
            530                 535                 540

Tyr Arg Ser Met Leu Leu Gly Asn Gly Arg Tyr Val Pro Phe His Ile
545                 550                 555                 560

Gln Val Pro Gln Lys Phe Phe Ala Ile Lys Asn Leu Leu Leu Leu Pro
            565                 570                 575

Gly Ser Tyr Thr Tyr Glu Trp Asn Phe Arg Lys Asp Val Asn Met Val
            580                 585                 590

Leu Gln Ser Ser Leu Gly Asn Asp Leu Arg Val Asp Gly Ala Ser Ile
            595                 600                 605

Lys Phe Asp Ser Ile Cys Leu Tyr Ala Thr Phe Phe Pro Met Ala His
610                 615                 620

Asn Thr Ala Ser Thr Leu Glu Ala Met Leu Arg Asn Asp Thr Asn Asp
625                 630                 635                 640

Gln Ser Phe Asn Asp Tyr Leu Ser Ala Ala Asn Met Leu Tyr Pro Ile
            645                 650                 655

Pro Ala Asn Ala Thr Asn Val Pro Ile Ser Ile Pro Ser Arg Asn Trp
            660                 665                 670

Ala Ala Phe Arg Gly Trp Ala Phe Thr Arg Leu Lys Thr Lys Glu Thr
            675                 680                 685

Pro Ser Leu Gly Ser Gly Tyr Asp Pro Tyr Tyr Thr Tyr Ser Gly Ser
            690                 695                 700

Ile Pro Tyr Leu Asp Gly Thr Phe Tyr Leu Asn His Thr Phe Lys Lys
705                 710                 715                 720

Val Ala Ile Thr Phe Asp Ser Ser Val Ser Trp Pro Gly Asn Asp Arg
            725                 730                 735

Leu Leu Thr Pro Asn Glu Phe Glu Ile Lys Arg Ser Val Asp Gly Glu
            740                 745                 750

Gly Tyr Asn Val Ala Gln Cys Asn Met Thr Lys Asp Trp Phe Leu Val
            755                 760                 765

Gln Met Leu Ala Asn Tyr Asn Ile Gly Tyr Gln Gly Phe Tyr Ile Pro
            770                 775                 780

Glu Ser Tyr Lys Asp Arg Met Tyr Ser Phe Phe Arg Asn Phe Gln Pro
785                 790                 795                 800

Met Ser Arg Gln Val Val Asp Asp Thr Lys Tyr Lys Asp Tyr Gln Gln
            805                 810                 815
```

-continued

```
Val Gly Ile Leu His Gln His Asn Asn Ser Gly Phe Val Gly Tyr Leu
                820                 825                 830

Ala Pro Thr Met Arg Glu Gly Gln Ala Tyr Pro Ala Asn Phe Pro Tyr
            835                 840                 845

Pro Leu Ile Gly Lys Thr Ala Val Asp Ser Ile Thr Gln Lys Lys Phe
        850                 855                 860

Leu Cys Asp Arg Thr Leu Trp Arg Ile Pro Phe Ser Ser Asn Phe Met
865                 870                 875                 880

Ser Met Gly Ala Leu Thr Asp Leu Gly Gln Asn Leu Leu Tyr Ala Asn
                885                 890                 895

Ser Ala His Ala Leu Asp Met Thr Phe Glu Val Asp Pro Met Asp Glu
            900                 905                 910

Pro Thr Leu Leu Tyr Val Leu Phe Glu Val Phe Asp Val Val Arg Val
        915                 920                 925

His Gln Pro His Arg Gly Val Ile Glu Thr Val Tyr Leu Arg Thr Pro
    930                 935                 940

Phe Ser Ala Gly Asn Ala Thr Thr
945                 950

<210> SEQ ID NO 6
<211> LENGTH: 13
<212> TYPE: PRT
<213> ORGANISM: Human Adenovirus Species C

<400> SEQUENCE: 6

Glu Glu Glu Asp Asp Asp Asn Glu Asp Glu Val Asp Glu
1               5                   10

<210> SEQ ID NO 7
<211> LENGTH: 38
<212> TYPE: PRT
<213> ORGANISM: Human Adenovirus Species C

<400> SEQUENCE: 7

Glu Gln Glu Glu Pro Thr Gln Glu Met Ala Glu Leu Glu Asp Glu
1               5                   10                  15

Glu Glu Ala Glu Glu Glu Ala Glu Glu Glu Ala Glu Ala Pro Gln
            20                  25                  30

Ala Asp Gln Lys Val Lys
        35

<210> SEQ ID NO 8
<211> LENGTH: 36
<212> TYPE: PRT
<213> ORGANISM: Human Adenovirus Species C

<400> SEQUENCE: 8

Glu Gln Thr Glu Asp Ser Gly Arg Ala Val Ala Glu Asp Glu Glu
1               5                   10                  15

Glu Asp Glu Asp Glu Glu Glu Glu Glu Gln Asn Ala Arg Asp
            20                  25                  30

Gln Ala Thr Lys
        35

<210> SEQ ID NO 9
<211> LENGTH: 32
<212> TYPE: PRT
<213> ORGANISM: Human Adenovirus Species C

<400> SEQUENCE: 9
```

Glu Gln Asn Glu Thr Ala Gln Val Asp Ala Gln Glu Leu Asp Glu Glu
1               5                   10                  15

Glu Asn Glu Ala Asn Glu Ala Gln Ala Arg Glu Gln Glu Gln Ala Lys
                20                  25                  30

<210> SEQ ID NO 10
<211> LENGTH: 31
<212> TYPE: PRT
<213> ORGANISM: Human Adenovirus Species C

<400> SEQUENCE: 10

Asp Glu Asp Asp Thr Gln Val Gln Val Ala Ala Glu Asp Asp Gln Asp
1               5                   10                  15

Asp Asp Glu Glu Glu Glu Gln Leu Pro Gln Gln Arg Asn Gly Lys
                20                  25                  30

<210> SEQ ID NO 11
<211> LENGTH: 946
<212> TYPE: PRT
<213> ORGANISM: Human Adenovirus Species C

<400> SEQUENCE: 11

Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
                20                  25                  30

Arg Ala Thr Glu Thr Tyr Phe Ser Leu Asn Asn Lys Phe Arg Asn Pro
            35                  40                  45

Thr Val Ala Pro Thr His Asp Val Thr Thr Asp Arg Ser Gln Arg Leu
    50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
                85                  90                  95

Ala Ser Thr Tyr Phe Asp Ile Arg Gly Val Leu Asp Arg Gly Pro Thr
                100                 105                 110

Phe Lys Pro Tyr Ser Gly Thr Ala Tyr Asn Ala Leu Ala Pro Lys Gly
            115                 120                 125

Ala Pro Asn Ser Cys Glu Trp Asp Glu Ala Ala Thr Ala Leu Glu Ile
    130                 135                 140

Asn Leu Lys Lys Lys Lys Gln Ala Glu Gln Gln Lys Thr His Val Tyr
145                 150                 155                 160

Ala Gln Ala Pro Leu Ala Gly Glu Lys Ile Thr Ala Asn Gly Leu Gln
                165                 170                 175

Ile Val Ser Asp Thr Gln Thr Glu Gly Asn Pro Val Phe Ala Asp Pro
                180                 185                 190

Thr Tyr Gln Pro Glu Pro Gln Val Gly Glu Ser Gln Trp Asn Glu Ala
            195                 200                 205

Glu Ala Thr Ala Ser Gly Gly Arg Val Leu Lys Lys Thr Thr Pro Met
    210                 215                 220

Lys Pro Cys Tyr Gly Ser Tyr Ala Arg Pro Thr Asn Lys Asn Gly Gly
225                 230                 235                 240

Gln Gly Ile Leu Val Ala Asn Asn Gln Gly Ala Leu Glu Ser Lys Val
                245                 250                 255

Glu Met Gln Phe Phe Ala Pro Ser Gly Thr Ala Met Asn Glu Arg Asn
                260                 265                 270

```
Ala Val Gln Pro Ser Ile Val Leu Tyr Ser Glu Asp Val Asn Met Glu
            275                 280                 285

Thr Pro Asp Thr His Ile Ser Tyr Lys Pro Ser Lys Thr Asp Glu Asn
290                 295                 300

Ser Lys Ala Met Leu Gly Gln Gln Ala Met Pro Asn Arg Pro Asn Tyr
305                 310                 315                 320

Ile Ala Phe Arg Asp Asn Phe Ile Gly Leu Met Tyr Tyr Asn Ser Thr
                325                 330                 335

Gly Asn Met Gly Val Leu Ala Gly Gln Ala Ser Gln Leu Asn Ala Val
                340                 345                 350

Val Asp Leu Gln Asp Arg Asn Thr Glu Leu Ser Tyr Gln Leu Leu Leu
                355                 360                 365

Asp Ser Ile Gly Asp Arg Thr Arg Tyr Phe Ser Met Trp Asn Gln Ala
370                 375                 380

Val Asp Ser Tyr Asp Pro Asp Val Arg Ile Ile Glu Asn His Gly Thr
385                 390                 395                 400

Glu Asp Glu Leu Pro Asn Tyr Cys Phe Pro Leu Gly Gly Ile Gly Val
                405                 410                 415

Thr Asp Thr Tyr Gln Gly Ile Lys Ser Asn Gly Asn Gly Asn Pro Gln
                420                 425                 430

Asn Trp Thr Lys Asn Asp Asp Phe Ala Ala Arg Asn Glu Ile Gly Val
                435                 440                 445

Gly Asn Asn Phe Ala Leu Glu Ile Asn Leu Asn Ala Asn Leu Trp Arg
                450                 455                 460

Asn Phe Leu Tyr Ser Asn Ile Ala Leu Tyr Leu Pro Asp Lys Leu Lys
465                 470                 475                 480

Tyr Thr Pro Thr Asn Val Glu Ile Ser Pro Asn Pro Asn Ser Tyr Asp
                485                 490                 495

Tyr Met Asn Lys Arg Val Val Ala Pro Gly Leu Val Asp Cys Tyr Ile
                500                 505                 510

Asn Leu Gly Ala Arg Trp Ser Leu Asp Tyr Met Asp Asn Val Asn Pro
                515                 520                 525

Phe Asn His His Arg Asn Ala Gly Leu Arg Tyr Arg Ser Met Leu Leu
                530                 535                 540

Gly Asn Gly Arg Tyr Val Pro Phe His Ile Gln Val Pro Gln Lys Phe
545                 550                 555                 560

Phe Ala Ile Lys Asn Leu Leu Leu Pro Gly Ser Tyr Thr Tyr Glu
                565                 570                 575

Trp Asn Phe Arg Lys Asp Val Asn Met Val Leu Gln Ser Ser Leu Gly
                580                 585                 590

Asn Asp Leu Arg Val Asp Gly Ala Ser Ile Lys Phe Asp Ser Ile Cys
                595                 600                 605

Leu Tyr Ala Thr Phe Phe Pro Met Ala His Asn Thr Ala Ser Thr Leu
610                 615                 620

Glu Ala Met Leu Arg Asn Asp Thr Asn Asp Gln Ser Phe Asn Asp Tyr
625                 630                 635                 640

Leu Ser Ala Ala Asn Met Leu Tyr Pro Ile Pro Ala Asn Ala Thr Asn
                645                 650                 655

Val Pro Ile Ser Ile Pro Ser Arg Asn Trp Ala Ala Phe Arg Gly Trp
                660                 665                 670

Ala Phe Thr Arg Leu Lys Thr Lys Glu Thr Pro Ser Leu Gly Ser Gly
                675                 680                 685
```

Tyr Asp Pro Tyr Tyr Thr Tyr Ser Gly Ser Ile Pro Tyr Leu Asp Gly
            690                 695                 700

Thr Phe Tyr Leu Asn His Thr Phe Lys Lys Val Ala Ile Thr Phe Asp
705                 710                 715                 720

Ser Ser Val Ser Trp Pro Gly Asn Asp Arg Leu Leu Thr Pro Asn Glu
            725                 730                 735

Phe Glu Ile Lys Arg Ser Val Asp Gly Glu Gly Tyr Asn Val Ala Gln
            740                 745                 750

Cys Asn Met Thr Lys Asp Trp Phe Leu Val Gln Met Leu Ala Asn Tyr
            755                 760                 765

Asn Ile Gly Tyr Gln Gly Phe Tyr Ile Pro Glu Ser Tyr Lys Asp Arg
770                 775                 780

Met Tyr Ser Phe Phe Arg Asn Phe Gln Pro Met Ser Arg Gln Val Val
785                 790                 795                 800

Asp Asp Thr Lys Tyr Lys Asp Tyr Gln Gln Val Gly Ile Leu His Gln
            805                 810                 815

His Asn Asn Ser Gly Phe Val Gly Tyr Leu Ala Pro Thr Met Arg Glu
            820                 825                 830

Gly Gln Ala Tyr Pro Ala Asn Phe Pro Tyr Pro Leu Ile Gly Lys Thr
            835                 840                 845

Ala Val Asp Ser Ile Thr Gln Lys Lys Phe Leu Cys Asp Arg Thr Leu
850                 855                 860

Trp Arg Ile Pro Phe Ser Ser Asn Phe Met Ser Met Gly Ala Leu Thr
865                 870                 875                 880

Asp Leu Gly Gln Asn Leu Leu Tyr Ala Asn Ser Ala His Ala Leu Asp
            885                 890                 895

Met Thr Phe Glu Val Asp Pro Met Asp Glu Pro Thr Leu Leu Tyr Val
            900                 905                 910

Leu Phe Glu Val Phe Asp Val Val Arg Val His Gln Pro His Arg Gly
            915                 920                 925

Val Ile Glu Thr Val Tyr Leu Arg Thr Pro Phe Ser Ala Gly Asn Ala
            930                 935                 940

Thr Thr
945

<210> SEQ ID NO 12
<211> LENGTH: 952
<212> TYPE: PRT
<213> ORGANISM: Human Adenovirus Species C

<400> SEQUENCE: 12

Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
            20                  25                  30

Arg Ala Thr Glu Thr Tyr Phe Ser Leu Asn Asn Lys Phe Arg Asn Pro
        35                  40                  45

Thr Val Ala Pro Thr His Asp Val Thr Thr Asp Arg Ser Gln Arg Leu
    50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
            85                  90                  95

Ala Ser Thr Tyr Phe Asp Ile Arg Gly Val Leu Asp Arg Gly Pro Thr
            100                 105                 110

```
Phe Lys Pro Tyr Ser Gly Thr Ala Tyr Asn Ala Leu Ala Pro Lys Gly
        115                 120                 125

Ala Pro Asn Ser Cys Glu Trp Asp Glu Ala Ala Thr Ala Leu Glu Ile
130                 135                 140

Asn Leu Lys Lys Lys Gln Ala Glu Gln Lys Thr His Val Tyr
145                 150                 155                 160

Ala Gln Ala Pro Leu Ser Gly Glu Thr Ile Thr Lys Ser Gly Leu Gln
                    165                 170                 175

Ile Gly Ser Asp Asn Ala Glu Thr Gln Thr Lys Pro Val Tyr Ala Asp
                180                 185                 190

Pro Ser Tyr Gln Pro Glu Pro Gln Ile Gly Glu Ser Gln Trp Asn Glu
            195                 200                 205

Ala Asp Ala Asn Ala Ala Gly Gly Arg Val Leu Lys Lys Thr Thr Pro
210                 215                 220

Met Lys Pro Cys Tyr Gly Ser Tyr Ala Arg Pro Thr Asn Pro Phe Gly
225                 230                 235                 240

Gly Gln Ser Val Leu Val Pro Asp Glu Lys Gly Val Pro Leu Pro Lys
                245                 250                 255

Val Asp Leu Gln Phe Phe Ser Asn Thr Thr Ser Leu Asn Asp Arg Gln
            260                 265                 270

Gly Asn Ala Thr Lys Pro Lys Val Val Leu Tyr Ser Glu Asp Val Asn
            275                 280                 285

Met Glu Thr Pro Asp Thr His Leu Ser Tyr Lys Pro Gly Lys Gly Asp
290                 295                 300

Glu Asn Ser Lys Ala Met Leu Gly Gln Gln Ser Met Pro Asn Arg Pro
305                 310                 315                 320

Asn Tyr Ile Ala Phe Arg Asp Asn Phe Ile Gly Leu Met Tyr Tyr Asn
                325                 330                 335

Ser Thr Gly Asn Met Gly Val Leu Ala Gly Gln Ala Ser Gln Leu Asn
                340                 345                 350

Ala Val Val Asp Leu Gln Asp Arg Asn Thr Glu Leu Ser Tyr Gln Leu
            355                 360                 365

Leu Leu Asp Ser Ile Gly Asp Arg Thr Arg Tyr Phe Ser Met Trp Asn
370                 375                 380

Gln Ala Val Asp Ser Tyr Asp Pro Asp Val Arg Ile Ile Glu Asn His
385                 390                 395                 400

Gly Thr Glu Asp Glu Leu Pro Asn Tyr Cys Phe Pro Leu Gly Gly Ile
                405                 410                 415

Gly Val Thr Asp Thr Tyr Gln Ala Ile Lys Ala Asn Gly Asn Gly Ser
                420                 425                 430

Gly Asp Asn Gly Asp Thr Thr Trp Thr Lys Asp Glu Thr Phe Ala Thr
            435                 440                 445

Arg Asn Glu Ile Gly Val Gly Asn Asn Phe Ala Met Glu Ile Asn Leu
450                 455                 460

Asn Ala Asn Leu Trp Arg Asn Phe Leu Tyr Asn Ile Ala Leu Tyr
465                 470                 475                 480

Leu Pro Asp Lys Leu Lys Tyr Asn Pro Thr Asn Val Glu Ile Ser Asp
                485                 490                 495

Asn Pro Asn Thr Tyr Asp Tyr Met Asn Lys Arg Val Val Ala Pro Gly
            500                 505                 510

Leu Val Asp Cys Tyr Ile Asn Leu Gly Ala Arg Trp Ser Leu Asp Tyr
515                 520                 525
```

```
Met Asp Asn Val Asn Pro Phe Asn His His Arg Asn Ala Gly Leu Arg
530                 535                 540

Tyr Arg Ser Met Leu Leu Gly Asn Gly Arg Tyr Val Pro Phe His Ile
545                 550                 555                 560

Gln Val Pro Gln Lys Phe Phe Ala Ile Lys Asn Leu Leu Leu Leu Pro
                565                 570                 575

Gly Ser Tyr Thr Tyr Glu Trp Asn Phe Arg Lys Asp Val Asn Met Val
                580                 585                 590

Leu Gln Ser Ser Leu Gly Asn Asp Leu Arg Val Asp Gly Ala Ser Ile
            595                 600                 605

Lys Phe Asp Ser Ile Cys Leu Tyr Ala Thr Phe Phe Pro Met Ala His
        610                 615                 620

Asn Thr Ala Ser Thr Leu Glu Ala Met Leu Arg Asn Asp Thr Asn Asp
625                 630                 635                 640

Gln Ser Phe Asn Asp Tyr Leu Ser Ala Ala Asn Met Leu Tyr Pro Ile
                645                 650                 655

Pro Ala Asn Ala Thr Asn Val Pro Ile Ser Ile Pro Ser Arg Asn Trp
                660                 665                 670

Ala Ala Phe Arg Gly Trp Ala Phe Thr Arg Leu Lys Thr Lys Glu Thr
                675                 680                 685

Pro Ser Leu Gly Ser Gly Tyr Asp Pro Tyr Tyr Thr Tyr Ser Gly Ser
690                 695                 700

Ile Pro Tyr Leu Asp Gly Thr Phe Tyr Leu Asn His Thr Phe Lys Lys
705                 710                 715                 720

Val Ala Ile Thr Phe Asp Ser Ser Val Ser Trp Pro Gly Asn Asp Arg
                725                 730                 735

Leu Leu Thr Pro Asn Glu Phe Glu Ile Lys Arg Ser Val Asp Gly Glu
                740                 745                 750

Gly Tyr Asn Val Ala Gln Cys Asn Met Thr Lys Asp Trp Phe Leu Val
            755                 760                 765

Gln Met Leu Ala Asn Tyr Asn Ile Gly Tyr Gln Gly Phe Tyr Ile Pro
770                 775                 780

Glu Ser Tyr Lys Asp Arg Met Tyr Ser Phe Phe Arg Asn Phe Gln Pro
785                 790                 795                 800

Met Ser Arg Gln Val Val Asp Asp Thr Lys Tyr Lys Glu Tyr Gln Gln
                805                 810                 815

Val Gly Ile Leu His Gln His Asn Asn Ser Gly Phe Val Gly Tyr Leu
                820                 825                 830

Ala Pro Thr Met Arg Glu Gly Gln Ala Tyr Pro Ala Asn Val Pro Tyr
                835                 840                 845

Pro Leu Ile Gly Lys Thr Ala Val Asp Ser Ile Thr Gln Lys Lys Phe
850                 855                 860

Leu Cys Asp Arg Thr Leu Trp Arg Ile Pro Phe Ser Ser Asn Phe Met
865                 870                 875                 880

Ser Met Gly Ala Leu Thr Asp Leu Gly Gln Asn Leu Tyr Ala Asn
                885                 890                 895

Ser Ala His Ala Leu Asp Met Thr Phe Glu Val Asp Pro Met Asp Glu
                900                 905                 910

Pro Thr Leu Leu Tyr Val Leu Phe Glu Val Phe Asp Val Val Arg Val
                915                 920                 925

His Gln Pro His Arg Gly Val Ile Glu Thr Val Tyr Leu Arg Thr Pro
930                 935                 940

Phe Ser Ala Gly Asn Ala Thr Thr
```

945         950

<210> SEQ ID NO 13
<211> LENGTH: 951
<212> TYPE: PRT
<213> ORGANISM: Human Adenovirus Species C

<400> SEQUENCE: 13

Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
            20                  25                  30

Arg Ala Thr Glu Thr Tyr Phe Ser Leu Asn Asn Lys Phe Arg Asn Pro
        35                  40                  45

Thr Val Ala Pro Thr His Asp Val Thr Thr Asp Arg Ser Gln Arg Leu
    50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
                85                  90                  95

Ala Ser Thr Tyr Phe Asp Ile Arg Gly Val Leu Asp Arg Gly Pro Thr
            100                 105                 110

Phe Lys Pro Tyr Ser Gly Thr Ala Tyr Asn Ala Leu Ala Pro Lys Gly
        115                 120                 125

Ala Pro Asn Ser Cys Glu Trp Asp Glu Ala Thr Ala Leu Glu Ile
    130                 135                 140

Asn Leu Lys Lys Lys Gln Ala Glu Gln Lys Thr His Val Tyr
145                 150                 155                 160

Ala Gln Ala Pro Leu Ser Gly Ile Lys Ile Thr Lys Glu Gly Leu Gln
                165                 170                 175

Ile Gly Thr Ala Asp Ala Thr Val Ala Gly Ala Gly Lys Glu Ile Phe
            180                 185                 190

Ala Asp Lys Thr Phe Gln Pro Glu Pro Gln Val Gly Glu Ser Gln Trp
        195                 200                 205

Asn Glu Ala Asp Ala Thr Ala Ala Gly Gly Arg Val Leu Lys Lys Thr
    210                 215                 220

Thr Pro Met Lys Pro Cys Tyr Gly Ser Tyr Ala Arg Pro Thr Asn Ser
225                 230                 235                 240

Asn Gly Gly Gln Gly Val Met Val Glu Gln Asn Gly Lys Leu Glu Ser
                245                 250                 255

Gln Val Glu Met Gln Phe Phe Ser Thr Ser Thr Asn Ala Thr Asn Glu
            260                 265                 270

Val Asn Asn Ile Gln Pro Thr Val Val Leu Tyr Ser Glu Asp Val Asn
        275                 280                 285

Met Glu Thr Pro Asp Thr His Leu Ser Tyr Lys Pro Lys Met Gly Asp
    290                 295                 300

Lys Asn Ala Lys Val Met Leu Gly Gln Gln Ala Met Pro Asn Arg Pro
305                 310                 315                 320

Asn Tyr Ile Ala Phe Arg Asp Asn Phe Ile Gly Leu Met Tyr Tyr Asn
                325                 330                 335

Ser Thr Gly Asn Met Gly Val Leu Ala Gly Gln Ala Ser Gln Leu Asn
            340                 345                 350

Ala Val Val Asp Leu Gln Asp Arg Asn Thr Glu Leu Ser Tyr Gln Leu
        355                 360                 365

```
Leu Leu Asp Ser Ile Gly Asp Arg Thr Arg Tyr Phe Ser Met Trp Asn
370                 375                 380
Gln Ala Val Asp Ser Tyr Asp Pro Asp Val Arg Ile Ile Glu Asn His
385                 390                 395                 400
Gly Thr Glu Asp Glu Leu Pro Asn Tyr Cys Phe Pro Leu Gly Gly Ile
                405                 410                 415
Gly Ile Thr Asp Thr Phe Gln Ala Val Lys Thr Thr Ala Ala Asn Gly
            420                 425                 430
Asp Gln Gly Asn Thr Thr Trp Gln Lys Asp Ser Thr Phe Ala Glu Arg
        435                 440                 445
Asn Glu Ile Gly Val Gly Asn Asn Phe Ala Met Glu Ile Asn Leu Asn
450                 455                 460
Ala Asn Leu Trp Arg Asn Phe Leu Tyr Ser Asn Ile Ala Leu Tyr Leu
465                 470                 475                 480
Pro Asp Lys Leu Lys Tyr Asn Pro Thr Asn Val Glu Ile Ser Asp Asn
                485                 490                 495
Pro Asn Thr Tyr Asp Tyr Met Asn Lys Arg Val Ala Pro Gly Leu
            500                 505                 510
Val Asp Cys Tyr Ile Asn Leu Gly Ala Arg Trp Ser Leu Asp Tyr Met
        515                 520                 525
Asp Asn Val Asn Pro Phe Asn His His Arg Asn Ala Gly Leu Arg Tyr
530                 535                 540
Arg Ser Met Leu Leu Gly Asn Gly Arg Tyr Val Pro Phe His Ile Gln
545                 550                 555                 560
Val Pro Gln Lys Phe Phe Ala Ile Lys Asn Leu Leu Leu Pro Gly
                565                 570                 575
Ser Tyr Thr Tyr Glu Trp Asn Phe Arg Lys Asp Val Asn Met Val Leu
            580                 585                 590
Gln Ser Ser Leu Gly Asn Asp Leu Arg Val Asp Gly Ala Ser Ile Lys
        595                 600                 605
Phe Asp Ser Ile Cys Leu Tyr Ala Thr Phe Pro Met Ala His Asn
610                 615                 620
Thr Ala Ser Thr Leu Glu Ala Met Leu Arg Asn Asp Thr Asn Asp Gln
625                 630                 635                 640
Ser Phe Asn Asp Tyr Leu Ser Ala Ala Asn Met Leu Tyr Pro Ile Pro
                645                 650                 655
Ala Asn Ala Thr Asn Val Pro Ile Ser Ile Pro Ser Arg Asn Trp Ala
            660                 665                 670
Ala Phe Arg Gly Trp Ala Phe Thr Arg Leu Lys Thr Lys Glu Thr Pro
        675                 680                 685
Ser Leu Gly Ser Gly Tyr Asp Pro Tyr Thr Tyr Ser Gly Ser Ile
690                 695                 700
Pro Tyr Leu Asp Gly Thr Phe Tyr Leu Asn His Thr Phe Lys Lys Val
705                 710                 715                 720
Ala Ile Thr Phe Asp Ser Ser Val Ser Trp Pro Gly Asn Asp Arg Leu
                725                 730                 735
Leu Thr Pro Asn Glu Phe Glu Ile Lys Arg Ser Val Asp Gly Glu Gly
            740                 745                 750
Tyr Asn Val Ala Gln Cys Asn Met Thr Lys Asp Trp Phe Leu Val Gln
        755                 760                 765
Met Leu Ala Asn Tyr Asn Ile Gly Tyr Gln Gly Phe Tyr Ile Pro Glu
770                 775                 780
Ser Tyr Lys Asp Arg Met Tyr Ser Phe Phe Arg Asn Phe Gln Pro Met
```

```
            785                 790                 795                 800
Ser Arg Gln Val Val Asp Asp Thr Lys Tyr Lys Asp Tyr Gln Gln Val
                    805                 810                 815

Gly Ile Ile His Gln His Asn Asn Ser Gly Phe Val Gly Tyr Leu Ala
                820                 825                 830

Pro Thr Met Arg Glu Gly Gln Ala Tyr Pro Ala Asn Val Pro Tyr Pro
            835                 840                 845

Leu Ile Gly Lys Thr Ala Val Asp Ser Ile Thr Gln Lys Lys Phe Leu
        850                 855                 860

Cys Asp Arg Thr Leu Trp Arg Ile Pro Phe Ser Ser Asn Phe Met Ser
865                 870                 875                 880

Met Gly Ala Leu Thr Asp Leu Gly Gln Asn Leu Leu Tyr Ala Asn Ser
                    885                 890                 895

Ala His Ala Leu Asp Met Thr Phe Glu Val Asp Pro Met Asp Glu Pro
                900                 905                 910

Thr Leu Leu Tyr Val Leu Phe Glu Val Phe Asp Val Val Arg Val His
            915                 920                 925

Gln Pro His Arg Gly Val Ile Glu Thr Val Tyr Leu Arg Thr Pro Phe
        930                 935                 940

Ser Ala Gly Asn Ala Thr Thr
945                 950
```

<210> SEQ ID NO 14
<211> LENGTH: 948
<212> TYPE: PRT
<213> ORGANISM: Human Adenovirus Species C

<400> SEQUENCE: 14

```
Met Ala Thr Pro Ser Met Met Pro Gln Trp Ser Tyr Met His Ile Ser
1               5                   10                  15

Gly Gln Asp Ala Ser Glu Tyr Leu Ser Pro Gly Leu Val Gln Phe Ala
                20                  25                  30

Arg Ala Thr Glu Thr Tyr Phe Ser Leu Asn Asn Lys Phe Arg Asn Pro
            35                  40                  45

Thr Val Ala Pro Thr His Asp Val Thr Thr Asp Arg Ser Gln Arg Leu
        50                  55                  60

Thr Leu Arg Phe Ile Pro Val Asp Arg Glu Asp Thr Ala Tyr Ser Tyr
65                  70                  75                  80

Lys Ala Arg Phe Thr Leu Ala Val Gly Asp Asn Arg Val Leu Asp Met
                85                  90                  95

Ala Ser Thr Tyr Phe Asp Ile Arg Gly Val Leu Asp Arg Gly Pro Thr
            100                 105                 110

Phe Lys Pro Tyr Ser Gly Thr Ala Tyr Asn Ala Leu Ala Pro Lys Gly
        115                 120                 125

Ala Pro Asn Ser Cys Glu Trp Asp Glu Ala Ala Thr Ala Leu Glu Ile
    130                 135                 140

Asn Leu Lys Lys Lys Gln Ala Glu Gln Lys Thr His Val Tyr
145                 150                 155                 160

Ala Gln Ala Pro Phe Ala Gly Glu Ala Ile Asn Lys Asn Gly Leu Gln
                165                 170                 175

Ile Gly Thr Asn Gly Ala Ala Thr Glu Gly Asn Lys Glu Ile Tyr Ala
            180                 185                 190

Asp Lys Thr Tyr Gln Pro Glu Pro Gln Ile Gly Glu Ser Gln Trp Asn
        195                 200                 205
```

-continued

Glu Ala Glu Ser Ser Val Ala Gly Gly Arg Val Leu Lys Lys Thr Thr
210                 215                 220

Pro Met Lys Pro Cys Tyr Gly Ser Tyr Ala Arg Pro Thr Asn Ser Asn
225                 230                 235                 240

Gly Gly Gln Gly Val Met Val Glu Gln Asn Gly Lys Leu Glu Ser Gln
            245                 250                 255

Val Glu Met Gln Phe Phe Ser Thr Ser Val Asn Ala Met Asn Glu Ala
                260                 265                 270

Asn Ala Ile Gln Pro Lys Leu Val Leu Tyr Ser Glu Asp Val Asn Met
            275                 280                 285

Glu Thr Pro Asp Thr His Leu Ser Tyr Lys Pro Gly Lys Ser Asp Asp
290                 295                 300

Asn Ser Lys Ala Met Leu Gly Gln Gln Ser Met Pro Asn Arg Pro Asn
305                 310                 315                 320

Tyr Ile Ala Phe Arg Asp Asn Phe Ile Gly Leu Met Tyr Tyr Asn Ser
                325                 330                 335

Thr Gly Asn Met Gly Val Leu Ala Gly Gln Ala Ser Gln Leu Asn Ala
            340                 345                 350

Val Val Asp Leu Gln Asp Arg Asn Thr Glu Leu Ser Tyr Gln Leu Leu
            355                 360                 365

Leu Asp Ser Ile Gly Asp Arg Thr Arg Tyr Phe Ser Met Trp Asn Gln
370                 375                 380

Ala Val Asp Ser Tyr Asp Pro Asp Val Arg Ile Ile Glu Asn His Gly
385                 390                 395                 400

Thr Glu Asp Glu Leu Pro Asn Tyr Cys Phe Pro Leu Gly Gly Ile Gly
                405                 410                 415

Val Thr Asp Thr Tyr Gln Ala Ile Lys Ala Thr Asn Gly Asn Gly Gly
            420                 425                 430

Ala Thr Thr Trp Ala Gln Asp Asn Thr Phe Ala Glu Arg Asn Glu Ile
            435                 440                 445

Gly Val Gly Asn Asn Phe Ala Met Glu Ile Asn Leu Asn Ala Asn Leu
450                 455                 460

Trp Arg Asn Phe Leu Tyr Ser Asn Ile Ala Leu Tyr Leu Pro Asp Lys
465                 470                 475                 480

Leu Lys Tyr Asn Pro Thr Asn Val Glu Ile Ser Asp Asn Pro Asn Thr
            485                 490                 495

Tyr Asp Tyr Met Asn Lys Arg Val Val Ala Pro Gly Leu Val Asp Cys
                500                 505                 510

Tyr Ile Asn Leu Gly Ala Arg Trp Ser Leu Asp Tyr Met Asp Asn Val
            515                 520                 525

Asn Pro Phe Asn His His Arg Asn Ala Gly Leu Arg Tyr Arg Ser Met
530                 535                 540

Leu Leu Gly Asn Gly Arg Tyr Val Pro Phe His Ile Gln Val Pro Gln
545                 550                 555                 560

Lys Phe Phe Ala Ile Lys Asn Leu Leu Leu Pro Gly Ser Tyr Thr
                565                 570                 575

Tyr Glu Trp Asn Phe Arg Lys Asp Val Asn Met Val Leu Gln Ser Ser
            580                 585                 590

Leu Gly Asn Asp Leu Arg Val Asp Gly Ala Ser Ile Lys Phe Asp Ser
            595                 600                 605

Ile Cys Leu Tyr Ala Thr Phe Phe Pro Met Ala His Asn Thr Ala Ser
610                 615                 620

Thr Leu Glu Ala Met Leu Arg Asn Asp Thr Asn Asp Gln Ser Phe Asn

```
            625                 630                 635                 640
Asp Tyr Leu Ser Ala Ala Asn Met Leu Tyr Pro Ile Pro Ala Asn Ala
                    645                 650                 655

Thr Asn Val Pro Ile Ser Ile Pro Ser Arg Asn Trp Ala Ala Phe Arg
                660                 665                 670

Gly Trp Ala Phe Thr Arg Leu Lys Thr Lys Glu Thr Pro Ser Leu Gly
            675                 680                 685

Ser Gly Tyr Asp Pro Tyr Tyr Thr Tyr Ser Gly Ser Ile Pro Tyr Leu
        690                 695                 700

Asp Gly Thr Phe Tyr Leu Asn His Thr Phe Lys Lys Val Ala Ile Thr
705                 710                 715                 720

Phe Asp Ser Ser Val Ser Trp Pro Gly Asn Asp Arg Leu Leu Thr Pro
                725                 730                 735

Asn Glu Phe Glu Ile Lys Arg Ser Val Asp Gly Glu Gly Tyr Asn Val
                740                 745                 750

Ala Gln Cys Asn Met Thr Lys Asp Trp Phe Leu Val Gln Met Leu Ala
            755                 760                 765

Asn Tyr Asn Ile Gly Tyr Gln Gly Phe Tyr Ile Pro Glu Ser Tyr Lys
        770                 775                 780

Asp Arg Met Tyr Ser Phe Phe Arg Asn Phe Gln Pro Met Ser Arg Gln
785                 790                 795                 800

Val Val Asp Asp Thr Lys Tyr Lys Asp Tyr Gln Gln Val Gly Ile Leu
                805                 810                 815

His Gln His Asn Asn Ser Gly Phe Val Gly Tyr Leu Ala Pro Thr Met
            820                 825                 830

Arg Glu Gly Gln Ala Tyr Pro Ala Asn Phe Pro Tyr Pro Leu Ile Gly
        835                 840                 845

Lys Thr Ala Val Asp Ser Ile Thr Gln Lys Lys Phe Leu Cys Asp Arg
    850                 855                 860

Thr Leu Trp Arg Ile Pro Phe Ser Ser Asn Phe Met Ser Met Gly Ala
865                 870                 875                 880

Leu Thr Asp Leu Gly Gln Asn Leu Leu Tyr Ala Asn Ser Ala His Ala
                885                 890                 895

Leu Asp Met Thr Phe Glu Val Asp Pro Met Asp Glu Pro Thr Leu Leu
            900                 905                 910

Tyr Val Leu Phe Glu Val Phe Asp Val Val Arg Val His Gln Pro His
        915                 920                 925

Arg Gly Val Ile Glu Thr Val Tyr Leu Arg Thr Pro Phe Ser Ala Gly
    930                 935                 940

Asn Ala Thr Thr
945

<210> SEQ ID NO 15
<211> LENGTH: 4
<212> TYPE: PRT
<213> ORGANISM: Human Adenovirus Species C

<400> SEQUENCE: 15

Lys Lys Lys Lys
1

<210> SEQ ID NO 16
<211> LENGTH: 13
<212> TYPE: PRT
<213> ORGANISM: Human Adenovirus Species C
```

-continued

```
<400> SEQUENCE: 16

Glu Glu Glu Lys Lys Lys Asn Glu Lys Glu Val Asp Glu
1               5                   10

<210> SEQ ID NO 17
<211> LENGTH: 20
<212> TYPE: PRT
<213> ORGANISM: Human Adenovirus Species C

<400> SEQUENCE: 17

Glu Ile Asn Leu Glu Glu Asp Asp Asp Asn Glu Asp Glu Val Asp
1               5                   10                  15

Glu Gln Ala Glu
            20

<210> SEQ ID NO 18
<211> LENGTH: 13
<212> TYPE: PRT
<213> ORGANISM: Human Adenovirus Species C

<400> SEQUENCE: 18

Lys Ile Asn Leu Lys Lys Asn Lys Val Lys Gln Ala Lys
1               5                   10

<210> SEQ ID NO 19
<211> LENGTH: 16
<212> TYPE: PRT
<213> ORGANISM: Human Adenovirus Species C

<400> SEQUENCE: 19

Ser Thr Thr Glu Ala Ala Ala Gly Asn Gly Asp Asn Leu Thr Pro Lys
1               5                   10                  15

<210> SEQ ID NO 20
<211> LENGTH: 16
<212> TYPE: PRT
<213> ORGANISM: Human Adenovirus Species C

<400> SEQUENCE: 20

Ser Thr Thr Lys Ala Ala Ala Gly Asn Gly Lys Asn Leu Thr Pro Lys
1               5                   10                  15

<210> SEQ ID NO 21
<211> LENGTH: 41
<212> TYPE: PRT
<213> ORGANISM: Human Adenovirus Species C

<400> SEQUENCE: 21

Gly Gly Val Ile Asn Thr Glu Thr Leu Thr Lys Val Lys Pro Lys Thr
1               5                   10                  15

Gly Gln Glu Asn Gly Trp Glu Lys Asp Ala Thr Glu Phe Ser Asp Lys
            20                  25                  30

Asn Glu Ile Arg Val Gly Asn Asn Phe
        35                  40

<210> SEQ ID NO 22
<211> LENGTH: 41
<212> TYPE: PRT
<213> ORGANISM: Human Adenovirus Species C

<400> SEQUENCE: 22

Gly Gly Val Ile Asn Thr Glu Thr Leu Thr Lys Val Lys Pro Lys Thr
1               5                   10                  15
```

```
Gly Gln Lys Asn Gly Trp Lys Lys Ala Thr Glu Phe Ser Asp Lys
            20                  25                  30

Asn Glu Ile Arg Val Gly Asn Asn Phe
            35                  40
```

```
<210> SEQ ID NO 23
<211> LENGTH: 74
<212> TYPE: DNA
<213> ORGANISM: Human Adenovirus Species C

<400> SEQUENCE: 23
caaatccttg cgaatgggat gaagctgcta ctgctcttga aataaaccta ggcctggtga    60
tgatggcggg atcg                                                     74

<210> SEQ ID NO 24
<211> LENGTH: 74
<212> TYPE: DNA
<213> ORGANISM: Human Adenovirus Species C

<400> SEQUENCE: 24
ccagaataag gcgcctgccc aaatacgtga gttttttgct gctcagcttg tcagaagaac    60
tcgtcaagaa ggcg                                                     74

<210> SEQ ID NO 25
<211> LENGTH: 76
<212> TYPE: DNA
<213> ORGANISM: Human Adenovirus Species C

<400> SEQUENCE: 25
ggagggcaag gcattcttgt aaagcaacaa aatggaaagc tagaaagtca agggcctggt    60
gatgatggcg ggatcg                                                   76

<210> SEQ ID NO 26
<211> LENGTH: 76
<212> TYPE: DNA
<213> ORGANISM: Human Adenovirus Species C

<400> SEQUENCE: 26
gtctggggtt tctatatcta catcttcact gtacaatacc actttaggag tctcagaaga    60
actcgtcaag aaggcg                                                   76

<210> SEQ ID NO 27
<211> LENGTH: 75
<212> TYPE: DNA
<213> ORGANISM: Human Adenovirus Species C

<400> SEQUENCE: 27
catggaactg aagatgaact tccaaattac tgctttccac tgggaggtgt gggcctggtg    60
atgatggcgg gatcg                                                    75

<210> SEQ ID NO 28
<211> LENGTH: 76
<212> TYPE: DNA
<213> ORGANISM: Human Adenovirus Species C

<400> SEQUENCE: 28
ctccacaggt tggcatttag attgatttcc atggcaaaat tatttccaac tctcagaaga    60
actcgtcaag aaggcg                                                   76
```

<210> SEQ ID NO 29
<211> LENGTH: 24
<212> TYPE: DNA
<213> ORGANISM: Human Adenovirus Species C

<400> SEQUENCE: 29
ttttaagccc tactctggca ctgc                                          24

<210> SEQ ID NO 30
<211> LENGTH: 24
<212> TYPE: DNA
<213> ORGANISM: Human Adenovirus Species C

<400> SEQUENCE: 30
ccttcgacac ctatttgaat accc                                          24

<210> SEQ ID NO 31
<211> LENGTH: 24
<212> TYPE: DNA
<213> ORGANISM: Human Adenovirus Species C

<400> SEQUENCE: 31
cacaaatgaa aatggagggc aagg                                          24

<210> SEQ ID NO 32
<211> LENGTH: 24
<212> TYPE: DNA
<213> ORGANISM: Human Adenovirus Species C

<400> SEQUENCE: 32
gtgggcatgt aagaaatatg agtg                                          24

<210> SEQ ID NO 33
<211> LENGTH: 25
<212> TYPE: DNA
<213> ORGANISM: Human Adenovirus Species C

<400> SEQUENCE: 33
gacagctatg atccagatgt tagaa                                         25

<210> SEQ ID NO 34
<211> LENGTH: 24
<212> TYPE: DNA
<213> ORGANISM: Human Adenovirus Species C

<400> SEQUENCE: 34
ctccacaggt tggcatttag attg                                          24

<210> SEQ ID NO 35
<211> LENGTH: 24
<212> TYPE: DNA
<213> ORGANISM: Mus musculus

<400> SEQUENCE: 35
ctccacaggt tggcatttag attg                                          24

<210> SEQ ID NO 36
<211> LENGTH: 24
<212> TYPE: DNA
<213> ORGANISM: Mus musculus

<400> SEQUENCE: 36
ctccacaggt tggcatttag attg                                          24

<210> SEQ ID NO 37
<211> LENGTH: 20
<212> TYPE: DNA
<213> ORGANISM: Human Adenovirus Species C

<400> SEQUENCE: 37
tagacgatcc ctactgtacg                                           20

<210> SEQ ID NO 38
<211> LENGTH: 20
<212> TYPE: DNA
<213> ORGANISM: Human Adenovirus Species C

<400> SEQUENCE: 38
ccggacgtag tcatatttcc                                           20

<210> SEQ ID NO 39
<211> LENGTH: 20
<212> TYPE: DNA
<213> ORGANISM: Human Adenovirus Species C

<400> SEQUENCE: 39
ggaaatatga ctacgtccgg                                           20

<210> SEQ ID NO 40
<211> LENGTH: 18
<212> TYPE: DNA
<213> ORGANISM: Human Adenovirus Species C

<400> SEQUENCE: 40
gctcctcctg agcgcaag                                             18

<210> SEQ ID NO 41
<211> LENGTH: 20
<212> TYPE: DNA
<213> ORGANISM: Human Adenovirus Species C

<400> SEQUENCE: 41
catctgctgg aaggtggaca                                           20

<210> SEQ ID NO 42
<211> LENGTH: 34
<212> TYPE: PRT
<213> ORGANISM: Human Adenovirus Species C

<400> SEQUENCE: 42

Asp Glu Ala Ala Thr Ala Leu Glu Ile Asn Leu Glu Glu Asp Asp
1               5                   10                  15

Asp Asn Glu Asp Glu Val Asp Glu Gln Ala Glu Gln Gln Lys Thr His
            20                  25                  30

Val Phe

<210> SEQ ID NO 43
<211> LENGTH: 25
<212> TYPE: PRT
<213> ORGANISM: Human Adenovirus Species C

<400> SEQUENCE: 43

Asp Glu Ala Ala Thr Ala Leu Glu Ile Asn Leu Lys Lys Lys Gln
1               5                   10                  15

Ala Glu Gln Gln Lys Thr His Val Phe

```
<210> SEQ ID NO 44
<211> LENGTH: 102
<212> TYPE: DNA
<213> ORGANISM: Human Adenovirus Species C

<400> SEQUENCE: 44
gatgaagctg ctactgctct tgaaataaac ctagaagaag aggacgatga caacgaagac    60
gaagtagacg agcaagctga gcagcaaaaa actcacgtat tt                      102

<210> SEQ ID NO 45
<211> LENGTH: 75
<212> TYPE: DNA
<213> ORGANISM: Human Adenovirus Species C

<400> SEQUENCE: 45
gatgaagctg ctactgctct tgaaataaac ctaaaaaaga aaagcaagc tgagcagcaa     60 aaaactcacg tattt                                                     75

<210> SEQ ID NO 46
<211> LENGTH: 21
<212> TYPE: PRT
<213> ORGANISM: Human Adenovirus Species C

<400> SEQUENCE: 46

Asp Glu Ala Ala Thr Ala Leu Glu Ile Asn Leu Gln Ala Glu Gln Gln
1               5                   10                  15

Lys Thr His Val Phe
            20

<210> SEQ ID NO 47
<211> LENGTH: 34
<212> TYPE: PRT
<213> ORGANISM: Human Adenovirus Species C

<400> SEQUENCE: 47

Asp Glu Ala Ala Thr Ala Leu Glu Ile Asn Leu Glu Glu Glu Lys Lys
1               5                   10                  15

Lys Asn Glu Lys Glu Val Asp Glu Gln Ala Glu Gln Gln Lys Thr His
            20                  25                  30

Val Phe

<210> SEQ ID NO 48
<211> LENGTH: 27
<212> TYPE: PRT
<213> ORGANISM: Human Adenovirus Species C

<400> SEQUENCE: 48

Asp Glu Ala Ala Thr Ala Leu Lys Ile Asn Leu Lys Lys Asn Lys Val
1               5                   10                  15

Lys Gln Ala Lys Gln Gln Lys Thr His Val Phe
            20                  25

<210> SEQ ID NO 49
<211> LENGTH: 37
<212> TYPE: PRT
<213> ORGANISM: Human Adenovirus Species C

<400> SEQUENCE: 49

Glu Gln Thr Glu Asp Ser Gly Arg Ala Val Ala Glu Asp Glu Glu Glu
```

-continued

```
              1               5              10              15
            Glu Glu Asp Glu Asp Glu Glu Glu Glu Glu Gln Asn Ala Arg
                           20              25              30
            Asp Gln Ala Thr Lys
                      35

<210> SEQ ID NO 50
<211> LENGTH: 952
<212> TYPE: PRT
<213> ORGANISM: Human Adenovirus Species C

<400> SEQUENCE: 50

Met Ala Thr Pro Ser Met Met Pro Gln Trp Ser Tyr Met His Ile Ser
  1               5                  10                  15

Gly Gln Asp Ala Ser Glu Tyr Leu Ser Pro Gly Leu Val Gln Phe Ala
             20                  25                  30

Arg Ala Thr Glu Thr Tyr Phe Ser Leu Asn Asn Lys Phe Arg Asn Pro
         35                  40                  45

Thr Val Ala Pro Thr His Asp Val Thr Thr Asp Arg Ser Gln Arg Leu
     50                  55                  60

Thr Leu Arg Phe Ile Pro Val Asp Arg Glu Asp Thr Ala Tyr Ser Tyr
 65                  70                  75                  80

Lys Ala Arg Phe Thr Leu Ala Val Gly Asp Asn Arg Val Leu Asp Met
                 85                  90                  95

Ala Ser Thr Tyr Phe Asp Ile Arg Gly Val Leu Asp Arg Gly Pro Thr
            100                 105                 110

Phe Lys Pro Tyr Ser Gly Thr Ala Tyr Asn Ala Leu Ala Pro Lys Gly
        115                 120                 125

Ala Pro Asn Ser Cys Glu Trp Asp Glu Ala Ala Thr Ala Leu Glu Ile
    130                 135                 140

Asn Leu Lys Lys Lys Gln Ala Glu Gln Lys Thr His Val Tyr
145                 150                 155                 160

Ala Gln Ala Pro Leu Ser Gly Glu Thr Ile Thr Lys Ser Gly Leu Gln
                165                 170                 175

Ile Gly Ser Asp Asn Ala Glu Thr Gln Ala Lys Pro Val Tyr Ala Asp
            180                 185                 190

Pro Ser Tyr Gln Pro Glu Pro Gln Ile Gly Glu Ser Gln Trp Asn Glu
        195                 200                 205

Ala Asp Ala Asn Ala Ala Gly Gly Arg Val Leu Lys Lys Thr Thr Pro
    210                 215                 220

Met Lys Pro Cys Tyr Gly Ser Tyr Ala Arg Pro Thr Asn Pro Phe Gly
225                 230                 235                 240

Gly Gln Ser Val Leu Val Pro Asp Glu Lys Gly Val Pro Leu Pro Lys
                245                 250                 255

Val Asp Leu Gln Phe Phe Ser Asn Thr Thr Ser Leu Asn Asp Arg Gln
            260                 265                 270

Gly Asn Ala Thr Lys Pro Lys Val Val Leu Tyr Ser Glu Asp Val Asn
        275                 280                 285

Leu Glu Thr Pro Asp Thr His Leu Ser Tyr Lys Pro Gly Lys Gly Asp
    290                 295                 300

Glu Asn Ser Lys Ala Met Leu Gly Gln Gln Ser Met Pro Asn Arg Pro
305                 310                 315                 320

Asn Tyr Ile Ala Phe Arg Asp Asn Phe Ile Gly Leu Met Tyr Tyr Asn
                325                 330                 335
```

-continued

```
Ser Thr Gly Asn Met Gly Val Leu Ala Gly Gln Ala Ser Gln Leu Asn
                340                 345                 350

Ala Val Val Asp Leu Gln Asp Arg Asn Thr Glu Leu Ser Tyr Gln Leu
            355                 360                 365

Leu Leu Asp Ser Ile Gly Asp Arg Thr Arg Tyr Phe Ser Met Trp Asn
        370                 375                 380

Gln Ala Val Asp Ser Tyr Asp Pro Asp Val Arg Ile Ile Glu Asn His
385                 390                 395                 400

Gly Thr Glu Asp Glu Leu Pro Asn Tyr Cys Phe Pro Leu Gly Gly Ile
                405                 410                 415

Gly Val Thr Asp Thr Tyr Gln Ala Ile Lys Ala Asn Gly Asn Gly Ala
            420                 425                 430

Gly Asp Asn Gly Asn Thr Thr Trp Thr Lys Asp Glu Thr Phe Ala Thr
        435                 440                 445

Arg Asn Glu Ile Gly Val Gly Asn Asn Phe Ala Met Glu Ile Asn Leu
    450                 455                 460

Asn Ala Asn Leu Trp Arg Asn Phe Leu Tyr Ser Asn Ile Ala Leu Tyr
465                 470                 475                 480

Leu Pro Asp Lys Leu Lys Tyr Asn Pro Thr Asn Val Glu Ile Ser Asp
                485                 490                 495

Asn Pro Asn Thr Tyr Asp Tyr Met Asn Lys Arg Val Val Ala Pro Gly
            500                 505                 510

Leu Val Asp Cys Tyr Ile Asn Leu Gly Ala Arg Trp Ser Leu Asp Tyr
        515                 520                 525

Met Asp Asn Val Asn Pro Phe Asn His His Arg Asn Ala Gly Leu Arg
530                 535                 540

Tyr Arg Ser Met Leu Leu Gly Asn Gly Arg Tyr Val Pro Phe His Ile
545                 550                 555                 560

Gln Val Pro Gln Lys Phe Phe Ala Ile Lys Asn Leu Leu Leu Leu Pro
                565                 570                 575

Gly Ser Tyr Thr Tyr Glu Trp Asn Phe Arg Lys Asp Val Asn Met Val
            580                 585                 590

Leu Gln Ser Ser Leu Gly Asn Asp Leu Arg Val Asp Gly Ala Ser Ile
        595                 600                 605

Lys Phe Asp Ser Ile Cys Leu Tyr Ala Thr Phe Phe Pro Met Ala His
    610                 615                 620

Asn Thr Ala Ser Thr Leu Glu Ala Met Leu Arg Asn Asp Thr Asn Asp
625                 630                 635                 640

Gln Ser Phe Asn Asp Tyr Leu Ser Ala Ala Asn Met Leu Tyr Pro Ile
                645                 650                 655

Pro Ala Asn Ala Thr Asn Val Pro Ile Ser Ile Pro Ser Arg Asn Trp
            660                 665                 670

Ala Ala Phe Arg Gly Trp Ala Phe Thr Arg Leu Lys Thr Lys Glu Thr
        675                 680                 685

Pro Ser Leu Gly Ser Gly Tyr Asp Pro Tyr Tyr Thr Tyr Ser Gly Ser
    690                 695                 700

Ile Pro Tyr Leu Asp Gly Thr Phe Tyr Leu Asn His Thr Phe Lys Lys
705                 710                 715                 720

Val Ala Ile Thr Phe Asp Ser Ser Val Ser Trp Pro Gly Asn Asp Arg
                725                 730                 735

Leu Leu Thr Pro Asn Glu Phe Glu Ile Lys Arg Ser Val Asp Gly Glu
            740                 745                 750

Gly Tyr Asn Val Ala Gln Cys Asn Met Thr Lys Asp Trp Phe Leu Val
```

```
                755                 760                 765
Gln Met Leu Ala Asn Tyr Asn Ile Gly Tyr Gln Gly Phe Tyr Ile Pro
    770                 775                 780
Glu Ser Tyr Lys Asp Arg Met Tyr Ser Phe Phe Arg Asn Phe Gln Pro
785                 790                 795                 800
Met Ser Arg Gln Val Val Asp Thr Lys Tyr Lys Asp Tyr Gln Gln
                805                 810                 815
Val Gly Ile Ile His Gln His Asn Asn Ser Gly Phe Val Gly Tyr Leu
            820                 825                 830
Ala Pro Thr Met Arg Glu Gly Gln Ala Tyr Pro Ala Asn Val Pro Tyr
        835                 840                 845
Pro Leu Ile Gly Lys Thr Ala Val Asp Ser Ile Thr Gln Lys Lys Phe
    850                 855                 860
Leu Cys Asp Arg Thr Leu Trp Arg Ile Pro Phe Ser Ser Asn Phe Met
865                 870                 875                 880
Ser Met Gly Ala Leu Thr Asp Leu Gly Gln Asn Leu Leu Tyr Ala Asn
                885                 890                 895
Ser Ala His Ala Leu Asp Met Thr Phe Glu Val Asp Pro Met Asp Glu
            900                 905                 910
Pro Thr Leu Leu Tyr Val Leu Phe Glu Val Phe Asp Val Val Arg Val
        915                 920                 925
His Gln Pro His Arg Gly Val Ile Glu Thr Val Tyr Leu Arg Thr Pro
    930                 935                 940
Phe Ser Ala Gly Asn Ala Thr Thr
945                 950

<210> SEQ ID NO 51
<211> LENGTH: 27
<212> TYPE: PRT
<213> ORGANISM: Human Adenovirus Species C

<400> SEQUENCE: 51

Asp Glu Ala Ala Thr Ala Leu Glu Ile Asn Leu Lys Lys Lys Lys
1               5                   10                  15

Lys Gln Ala Glu Gln Gln Lys Thr His Val Phe
            20                  25

<210> SEQ ID NO 52
<211> LENGTH: 29
<212> TYPE: PRT
<213> ORGANISM: Human Adenovirus Species C

<400> SEQUENCE: 52

Asp Glu Ala Ala Thr Ala Leu Glu Ile Asn Leu Lys Lys Lys Lys
1               5                   10                  15

Lys Lys Lys Gln Ala Glu Gln Gln Lys Thr His Val Phe
            20                  25

<210> SEQ ID NO 53
<211> LENGTH: 45
<212> TYPE: PRT
<213> ORGANISM: Human Adenovirus Species C

<400> SEQUENCE: 53

Asp Glu Ala Ala Thr Ala Leu Glu Ile Asn Leu Gly Gly Ser Gly Gly
1               5                   10                  15
```

```
Gly Ser Gly Lys Lys Lys Lys Lys Lys Lys Gly Ser Gly Gly Gly
            20              25              30

Ser Gly Gly Gln Ala Glu Gln Gln Lys Thr His Val Phe
        35              40              45
```

ADENOVIRUS COMPRISING A MODIFIED ADENOVIRUS HEXON PROTEIN

FIELD OF THE INVENTION

The present invention relates to a human adenovirus species C having a capsid which comprises a modified adenovirus hexon protein, wherein the modified adenovirus hexon protein has a modified HVR1 region, wherein the modified HVR1 region has the sequence DEAATA-LEINLKKKKQAEQQ (SEQ ID NO.: 1). The invention further relates to the adenovirus of the invention for use in treating or preventing a human disease. The invention further relates to a nucleic acid encoding the modified adenovirus hexon protein. The invention further relates to the use of an adenovirus according to the invention for transducing mesenchymal stromal cells (MSCs) or tumor cells. The invention further relates to an in vitro method for transducing MSCs and a transduced MSC obtainable by the method. The invention further relates to the transduced MSC of the invention for use in treating a disease.

BACKGROUND OF THE INVENTION

Adenoviruses are non-enveloped viruses belonging to the virus family Adenoviridae. They carry a linear double-stranded DNA genome with a size of about 36 kilobases (kb). Currently, there are 89 different Human Adenovirus (HAdV) types that are known and that are grouped into seven species, designated species A to G. HAdV species C comprises six types, namely types 1, 2, 5, 6, 57 and 89.

Recombinant adenoviruses can be used for the transfer of nucleic acids, proteins or other molecules into cells of a patient in preventive or therapeutic settings. However, efficient delivery to, e.g., tumors after systemic HAdV administration is still challenging due to several cellular and non-cellular non-target interactions and sequestration mechanisms.

Mesenchymal stromal cells (MSCs) have a natural migration behaviour to tumor tissue and are thus an interesting potential carrier of adenoviruses to tumor tissue. However, while adenoviruses can infect most types of target cells, MSCs, which do not express the coxsackievirus and adenovirus receptor (CAR), are hardly infected by adenoviruses in vitro.

Therefore, new tools and methods are needed that overcome the current limitations for using adenoviruses in medicine.

SUMMARY OF THE INVENTION

In a first aspect, the present invention relates to a human adenovirus species C having a capsid which comprises a modified adenovirus hexon protein, wherein the modified adenovirus hexon protein has a modified HVR1 region, wherein the modified HVR1 region has the sequence DEAATALEINLKKKKQAEQQ (SEQ ID NO.: 1).

In a second aspect, the present invention relates to the adenovirus of the invention for use in treating or preventing a human disease.

In a third aspect, the present invention relates to a nucleic acid encoding a modified adenovirus hexon protein of a human adenovirus species C, wherein the modified adenovirus hexon protein has a modified HVR1 region, wherein the modified HVR1 region has the sequence of SEQ ID NO.: 1.

In a further aspect, the present invention relates to the use of an adenovirus according to the invention for transducing mesenchymal stromal cells (MSCs) or tumor cells.

In a further aspect, the present invention relates to an in vitro method for transducing MSCs, the method comprising the step of:

contacting a plurality of MSCs with an adenovirus according to the invention.

In a further aspect, the present invention relates to a transduced MSC obtainable by the method of the invention.

In a further aspect, the present invention relates to the transduced MSC of the invention for use in treating a disease.

BRIEF DESCRIPTION OF THE FIGURES

FIG. 1 shows an alignment of the amino acid sequences of hypervariable region 1 of HAdV5 wildtype and HAdV5-Mut3 hexon proteins (FIG. 1A) and of hypervariable regions 1 (HVR1), 5 (HVR5) and 7 (HVR7) of HAdV5 wildtype, HAdV5-ΔHVR1, HAdV5-Mut2, HAdV5-Mut3, HAdV5-Mut4, HAdV5-Mut5, HAdV5-Mut6 hexon proteins (FIG. 1B). Negatively charged amino acids are depicted in bold letters. Inserted lysine residues are depicted in italic letters.

FIG. 2 shows an alignment of the nucleotide sequences encoding hypervariable region 1 of HAdV5 wildtype and HAdV5-Mut3 hexon proteins. Nucleotides encoding for the inserted lysine residues are depicted in capital letters.

FIG. 14 shows an alignment of the amino acid sequences of HVR1 of HAdV5 wildtype and HAdV5-Mut7, HAdV5-Mut8 and HAdV5-Mut9 hexon proteins. Inserted lysine residues are depicted in bold letters. Further inserted amino acids are depicted in italic letters.

DETAILED DESCRIPTION OF THE INVENTION

Figure 3:
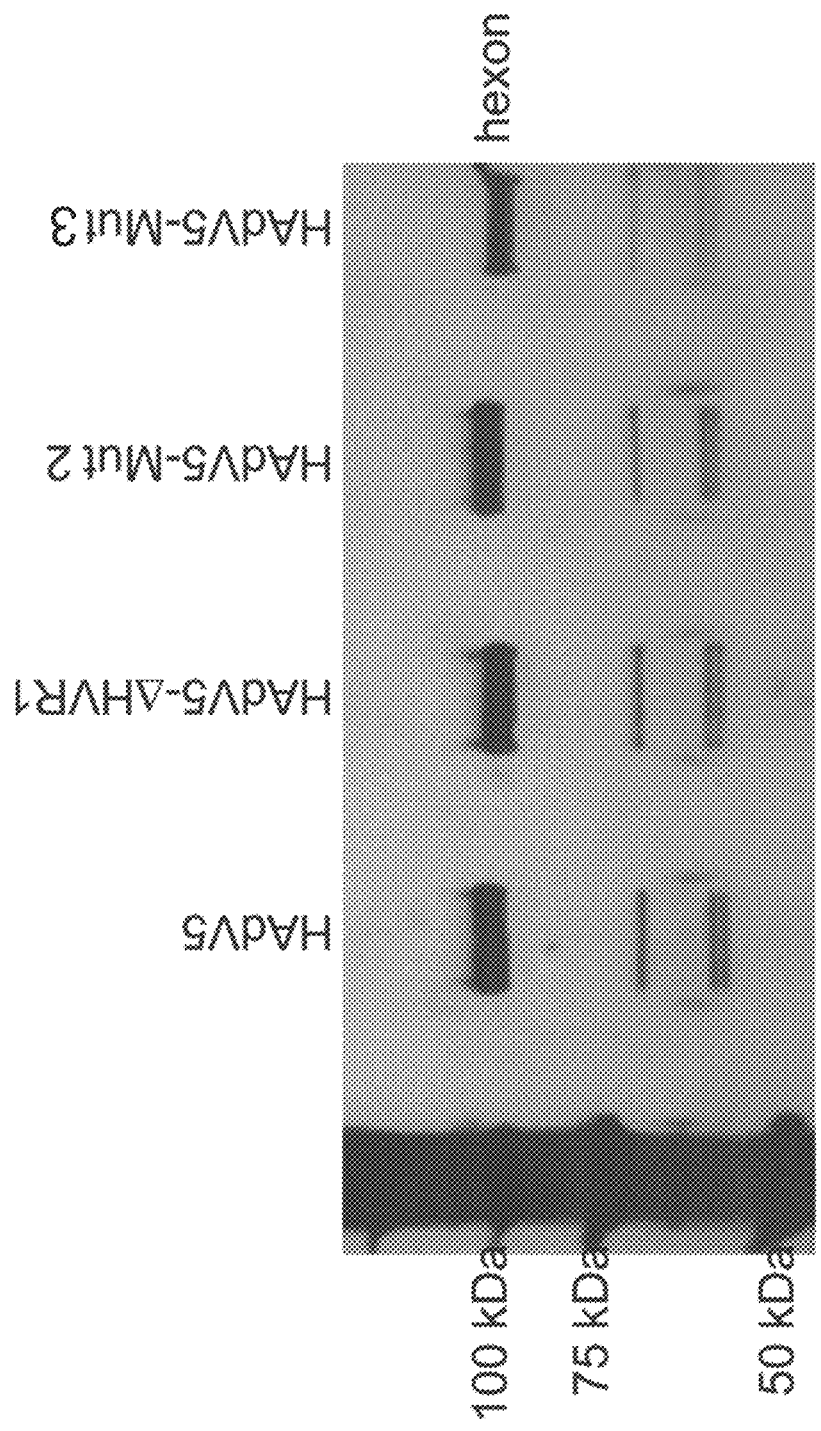
FIG. 3 shows that the hexon protein appeared smaller in silver staining for HAdV5-ΔHVR1 and HAdV5-Mut3 than for HAdV5-Mut2 and HAdV5 wildtype (HAdV5). $5 \times 10^9$ virus particles were separated by SDS-PAGE and stained by silver staining.

In a first aspect, the present invention relates to a human adenovirus species C having a capsid which comprises a modified adenovirus hexon protein, wherein the modified adenovirus hexon protein has a modified HVR1 region, wherein the modified HVR1 region has the sequence DEAATALEINLKKKKQAEQQ (SEQ ID NO.: 1).

Human adenovirus (HAdV) species C comprises six types, namely types 1, 2, 5, 6, 57 and 89. Complete nucleotide sequences representing all adenovirus species C prototypes are available as GenBank entries: HAdV-C1 (AC_000017.1), HAdV-C2 (AC_000007.1), HAdV-05 (AC_000008.1), HAdV-C6 (FJ349096.1), HAdV-057 (HQ003817.1) and HAdV-C89 (MH121097.1).

Adenoviruses have an icosahedral-shaped capsid. The outer shell of the capsid comprises three major types of proteins: hexon, penton base and fiber. These three capsid proteins contribute to the majority of activities required for the early stages of adenovirus infection. The adenovirus hexon protein accounts for the majority of the outer shell of the capsid, forming 240 homo-trimers that encapsidate the majority of the virus, including the viral genome and associated proteins. The fiber protein protrudes from each of the 12 vertices of the icosahedron, while the penton base lies at the base of each fiber protein.

The adenovirus hexon protein has seven hypervariable regions (HVRs), designated HVR1 to HVR7. The modified adenovirus hexon protein of the adenovirus of the invention has a modified HVR1 region, wherein the modified HVR1 region has the sequence DEAATALEINLKKKKQAEQQ (SEQ ID NO.: 1). In other words, the modified HVR1 region comprises the sequence DEAATALEINLKKKKQAEQQ (SEQ ID NO.: 1). The amino acid sequence of SEQ ID NO.: 1 is derived from the wildtype amino acid sequence of HVR1 of the HAdV type 5 hexon protein by replacing 13 consecutive amino acid residues of the wildtype sequence, namely the amino acid stretch EEEDDDNEDEVDE (SEQ ID NO.: 6), by four consecutive lysine residues. Due to the modified HVR1 region, the modified adenovirus hexon protein differs from the respective wildtype adenovirus hexon protein.

The modified HVR1 region may comprise additional amino acids located N-terminal or C-terminal of SEQ ID NO.: 1. Typically, the modified HVR1 region has five additional amino acids which are located C-terminal of SEQ ID NO.: 1 and which correspond to the respective wildtype amino acids.

The invention is based on the finding that a modified adenovirus hexon protein that has a modified HVR1 region, wherein the modified HVR1 region has the amino acid sequence of SEQ ID NO.: 1, leads to an adenovirus with improved characteristics. Importantly, the improved characteristics could not be observed for other similar modifications of the HVR1 region.

The inventors set out to produce six different modified (mutant) adenovirus vectors, each having a different type of modified HVR1 region in the hexon protein (FIG. 1B). All mutants were designed with a view to reducing the negative surface charge of the viral particles. The mutant designated HAdV5-Mut3 has a modified HVR1 region that has the sequence of SEQ ID NO.: 1 (FIG. 1A). The complete sequence of the HVR1 region of the modified hexon protein of HAdV5-Mut3 is:

(SEQ ID NO.: 43)
DEAATALEINLKKKKQAEQQKTHVF

The inventors found that certain modifications to the HVR1 region render the production of the mutant virus vectors unfeasible. Production of the mutant vectors designated HAdV5-Mut4, HAdV5-Mut5, HAdV5-Mut6 was unfeasible.

Production of three further modified (mutant) adenovirus vectors designated HAdV5-Mut7, HAdV5-Mut8 and HAdV5-Mut9, each having a different type of modified HVR1 region in the hexon protein (FIG. 14), was also found to be unfeasible.

The inventors further found that deleting the negatively charged HVR1 loop (mutant HAdV5-ΔHVR1) resulted only in a slight reduction of the negative surface charge of virus particles. The replacement of four aspartic acids by lysines in case of mutant HAdV5-Mut2 further reduced the negative surface charge. However and interestingly, HAdV5-Mut3, which comprises the modified HVR1 region of SEQ ID NO.: 1, showed a significant reduction of the negative surface charge in comparison to HAdV5 wildtype, HAdV5-ΔHVR1, and HAdV5-Mut2.

Surprisingly, the inventors further found that HAdV5-Mut3 showed a significant reduction of human blood coagulation factor X (FX)-mediated transduction of CAR-negative cells in comparison to HAdV5 wildtype, HAdV5-ΔHVR1, and HAdV5-Mut2. Binding of FX to HAdV5 mediates transduction of hepatocytes and therefore triggers the sequestration of particles, which is one of the major obstacles for efficient HAdV delivery to, e.g., tumors after systemic HAdV administration. The adenovirus of the invention overcomes this obstacle. In contrast, HAdV5-ΔHVR1 and HAdV5-Mut2 showed no reduced FX-binding although their HVR1 region modifications are similar to the one of HAdV5-Mut3.

The significantly reduced FX binding to HAdV5-Mut3 and the thereby reduced hepatocyte transduction of HAdV5-Mut3 is an unexpected finding. According to Alba et al. (Alba et al., 2009), FX interaction with HAdV5 capsid is via binding to HVR5 and HVR7 of the adenovirus hexon protein. FX interaction with HVR3, HVR5 and HVR7 of the adenovirus hexon protein has also been reported. In contrast, a role of HVR1 in FX binding was neither known nor expected. Therefore, it is a surprising finding that a modification in the HVR1 region of the adenovirus hexon protein affects FX binding. Importantly, for FX binding to be affected, the type of modification of the HVR1 region is decisive. This is evidenced by the fact that HAdV5-ΔHVR1 and HAdV5-Mut2 showed no reduced FX-binding although their HVR1 region modifications are similar to the one of HAdV5-Mut3.

More specifically, the findings of the inventors show that just introducing a number of lysine resides such as four or six lysine residues may not be sufficient. In HAdV5-Mut4, five glutamic acid residues and one aspartic acid residue were replaced by lysine residues. HAdV5-Mut4 was not viable. In HAdV5-Mut2, four aspartic acid residues were replaced by lysine residues. However, HAdV5-Mut2 showed no reduced FX binding.

The findings of the inventors show that reduced FX binding is only observed for HAdV5-Mut3, where four lysine residues, which are arranged in a consecutive manner, have been introduced. Thus, the findings show that it is necessary to introduce four consecutive lysine residues.

Likewise, the findings of the inventors show that just deleting the stretch of 13 amino acids in the HVR1 region as in HAdV5-ΔHVR1 without introducing any lysine residues is not sufficient to affect FX binding.

In addition, the inventors found that the adenovirus of the invention also overcomes another obstacle for efficient HAdV delivery to, e.g., tumors after systemic HAdV administration, namely the neutralization by natural IgM antibodies. This finding was unexpected since HAdV5-ΔFX particles, which also show reduced FX binding, were almost completely neutralized by natural IgMs upon incubation with both human and murine plasma. However and interestingly, the inventors did not observe this effect when HAdV5-Mut3 was incubated with human or murine plasma samples, even though these particles show a reduced FX binding comparable to that of HAdV5-ΔFX. Thus, the inventors showed that the modified HVR1 region of HAdV5-Mut3 allows vector particles devoid of FX-shielding to escape from natural IgMs. This also prevents IgM-mediated binding of the adenovirus of the invention to erythrocytes which is another barrier after systemic, in particular intravenous, administration of HAdV.

Yet another problem of efficient systemic administration of HAdV are liver-residential macrophages called Kupffer cells. Kupffer cells have scavenger receptors on their cell surface, which bind and capture negatively charged molecules, thereby causing HAdV uptake. While the uptake by murine macrophages was significantly reduced compared to HAdV5 wildtype for all three mutant vectors HAdV5-ΔHVR1, HAdV5-Mut2 and HAdV5-Mut3, the effect was most pronounced for HAdV5-Mut3.

Taken together, the adenovirus of the invention overcomes multiple barriers of HAdV systemic administration faced to date. Accordingly, the adenovirus of the invention is particularly useful for systemic administration.

The adenovirus of the invention was further found to have a transduction efficiency of tumor cells that is either improved or similar compared to the respective HAdV wildtype. Therefore, the adenovirus of the invention is also particularly useful for utilization as an oncolytic virus.

The term "transduction of cells" as used herein refers to the process of transferring one or more nucleic acids into the cells using an adenovirus. The adenovirus is typically a recombinant adenovirus that has been produced by a suitable packaging cell. An important application of the transduction of cells by recombinant adenoviruses is the virus-mediated delivery of one or more genes into target cells, for example into target cells of a patient in gene therapy.

The term "transduction efficiency" as used herein refers to the proportion or percentage of target cells that are successfully transduced by adenovirus after transduction of the cells.

The term "target cell" as used herein refers to a cell that is to be transduced (infected) by an adenovirus.

Even though HAdV5 was used in the studies underlying the present invention, the present invention is not limited to HAdV5. The findings of the inventors likewise apply to all HAdV species C types comprising the modified adenovirus hexon protein, wherein the modified adenovirus hexon protein has a modified HVR1 region having the sequence of SEQ ID NO.: 1.

In a preferred embodiment, the adenovirus is adenovirus type 5. Adenovirus type 5 is also referred to as HAdV type 5, HAdV-05, HAdV-5 or HAdV5 herein. Viral vectors based on HAdV type 5 belong to the most commonly used vectors in gene therapy research. They have been extensively studied over many years both preclinically and clinically, in particular as oncolytic adenoviruses for cancer therapy. The amino acid sequence of SEQ ID NO.: 1 is derived from a portion of the wildtype amino acid sequence of the HVR1 region of the HAdV type 5 hexon protein.

In another embodiment, the adenovirus is adenovirus type 1, type 2, type 6, type 57 or type 89.

In a preferred embodiment, the modified adenovirus hexon protein has an unmodified (wildtype) HVR5 and/or HVR7 region.

In a preferred embodiment, the adenovirus is an adenovirus vector or an oncolytic adenovirus.

The term "adenovirus vector" as used herein refers to a replication-deficient adenovirus vector. There are different replication-deficient vector types based on adenovirus. Adenoviral (Ad) vectors usually have at least deletions of the E1A and E1B genes and are therefore replication-deficient in human cells. Production takes place in human complementing cell lines, which express the E1A and E1B proteins and in which the E1A and E1B genes are chromosomally integrated. For example, the DELTA E1 Ad vector (also called E1-deleted Ad vector or first-generation Ad vector) is widely used as laboratory tool, in pre-clinical research and development, in clinical studies and in product development in the context of gene therapy or genetic vaccination. This vector type is made replication-defective by removal of the E1 region encoding the E1A and E1B proteins. In addition, this vector type may also contain deletions in the E3 region. Second generation Ad vectors comprise, in addition to deletions of the E1 genes (and optionally deletions in the E3 region), deletions of the E2 genes and/or the E4 genes. In high-capacity Ad (HC-Ad) vectors (also called helper-dependent Ad vectors), all viral coding sequences are replaced by the transgene(s) of interest.

Adenovirus vectors normally carry expression cassettes, in which, under control of a promoter sequence, RNAs are expressed that are either coding for proteins or that are non-coding for protein, for example rather coding for non-coding RNAs such as small-hairpin RNAs (shRNAs) or micro RNAs (miRNAs).

The term "oncolytic adenovirus" as used herein refers to a replication-competent adenovirus. Replication-competent adenoviruses are in clinical development mainly for the treatment of cancers, in particular solid cancers. These viruses multiply in neoplastic tumor cells resulting in their destruction. Regarding safe clinical use, tumor-selective replication has been considered to reduce or prevent damage to non-neoplastic, healthy tissue. Therefore, they also have been named as conditionally-replication competent adenovirus. Many different strategies have been pursued to achieve tumor-selective activity. A common strategy relates to the deletion of the Rb-binding site in E1A (referred to as Delta-24), resulting in transcription factor E2F-dependent replication of adenovirus in tumor cells but not in non-neoplastic cells. Other strategies rely on the use of tumor- or tissue-specific regulatory promoter elements to control expression of an essential adenovirus gene (for example E1A) to specific cell types. Overall, oncolytic adenoviruses are promising tools for cancer therapy.

As mentioned above, the adenovirus of the invention was found to have a transduction efficiency of tumor cells that is either improved or similar compared to the respective HAdV wildtype. Therefore, the adenovirus of the invention is particularly useful for utilization as an oncolytic virus.

In a preferred embodiment, the adenovirus comprises a transgene. The term "transgene" as used herein refers to a gene or genetic material that is non-native to the adenovirus and that is delivered to a target cell by means of transducing the target cell with the adenovirus comprising the transgene. In a preferred embodiment, the adenovirus comprises one or several transgenes, preferably two or three transgenes.

In a preferred embodiment, the capsid has at least one additional capsid modification. The additional capsid modification can be present, for example, in the modified adenovirus hexon protein and/or in a different adenovirus capsid protein such as the adenovirus fiber protein, the penton base protein or the minor capsid protein IX. The introduction of several modifications in these proteins in order to obtain adenoviruses with altered characteristics is known.

In a preferred embodiment, the additional capsid modification is a modified adenovirus fiber protein. In a preferred embodiment, the modified adenovirus fiber protein lacks coxsackievirus and adenovirus receptor (CAR) binding due to ablation of the CAR-binding site of the fiber protein by genetic modification of the viral gene coding for the fiber protein. Ablated CAR binding prevents binding of HAdV to erythrocytes and thus prevents sequestration of viral particles by erythrocytes, especially upon intravenous administration. Accordingly, by using both the modified adenovirus hexon protein with the modified HVR1 region having the sequence of SEQ ID NO.: 1 and a modified adenovirus fiber protein that lacks CAR binding, an adenovirus that is free from non-target interactions with hepatocytes, from non-target interactions with natural IgM antibodies, and from IgM- or CAR-mediated non-target interactions with erythrocytes is obtained. Such an adenovirus is particularly useful for systemic administration.

In a second aspect, the present invention relates to the adenovirus of the invention for use in treating or preventing a human disease. As discussed above, the adenovirus of the invention is particularly useful for systemic administration. Accordingly, the adenovirus of the invention is particularly suited for use in treating or preventing a human disease.

In a preferred embodiment, the disease is treated or prevented by gene therapy. The term "gene therapy" as used herein refers to the therapeutic delivery of a nucleic acid into cells of a patient to treat or prevent a disease. The nucleic acid encodes a therapeutic molecule such as, for example, a therapeutic protein, that is expressed by the transduced cells.

In a preferred embodiment, the disease is treated or prevented by genetic vaccination. The term "genetic vaccination" as used herein refers to the delivery of a nucleic acid into cells of a subject to produce a protective or therapeutic immunological response in order to protect the subject against a disease or to treat an existing disease. The nucleic acid encodes an immunogen or an antigen that is expressed by the transduced cells and that induces the immunological response.

In a preferred embodiment, the disease is cancer. As mentioned above, oncolytic adenoviruses are promising tools for treating cancer and the adenovirus of the invention is particularly useful for utilization as an oncolytic virus.

In a third aspect, the present invention relates to a nucleic acid encoding a modified adenovirus hexon protein of a human adenovirus species C, wherein the modified adenovirus hexon protein has a modified HVR1 region, wherein the modified HVR1 region has the sequence of SEQ ID NO.: 1.

In a preferred embodiment, the nucleic acid has the sequence of SEQ ID NO.: 2.

In a further aspect, the present invention relates to the use of an adenovirus according to the invention for transducing mesenchymal stromal cells (MSCs) or tumor cells.

Mesenchymal stromal cells (MSCs), also termed mesenchymal stem cells, show a natural ability to migrate to tumors. They are thus interesting potential carrier cells to carry adenoviruses to tumor tissue. Transduced MSCs hide the viral particles from sequestration mechanisms, increase the viral load due to intracellular virus replication, and transport them to the tumor site where newly produced particles are set free. However, MSCs are hardly transduced by commonly used HAdV type 5 wildtype vectors. Surprisingly, the inventors found that when using the adenovirus according to the invention, the transduction of MSCs with HAdV vectors was greatly enhanced. In addition, the inventors found that transduction of MSCs with the adenovirus according to the invention leads to an improved adenoviral replication in the MSCs compared to transduction with wildtype HAdV. The inventors further confirmed that the migration behaviour of MSCs is not affected by transduction of MSCs with the adenovirus according to the invention. Therefore, the adenovirus of the invention is particularly useful for transducing MSCs.

In a preferred embodiment, the MSCs are human MSCs.

As mentioned above, the adenovirus of the invention was found to have a transduction efficiency of tumor cells that is either improved or similar compared to the respective HAdV wildtype. Therefore, the adenovirus of the invention is also useful for transducing tumor cells.

In a preferred embodiment, the tumor cells are human tumor cells.

In a preferred embodiment, the adenovirus is used in combination with a transduction enhancer for transducing MSCs. The inventors found that the transduction efficiency of MSCs with the adenovirus according to the invention can be further increased by using a transduction enhancer.

In a preferred embodiment, the transduction enhancer is selected from the group consisting of coagulation factor X, spermidine, spermine, hexadimethrine bromide, poly-L-lysine and lactoferrin.

In a preferred embodiment, the transduction enhancer is coagulation factor X, spermidine, spermine or hexadimethrine bromide.

In a further preferred embodiment, the transduction enhancer is coagulation factor X.

In a further aspect, the present invention relates to an in vitro method for transducing MSCs, the method comprising the step of:

contacting a plurality of MSCs with an adenovirus according to the invention.

As discussed above, the adenovirus of the invention is particularly useful for transducing MSCs. This paves the way for using MSCs as carrier of adenoviruses to tumor tissue.

In a preferred embodiment, the plurality of MSCs is further contacted with a transduction enhancer, wherein the transduction enhancer preferably is selected from the group consisting of coagulation factor X, spermidine, spermine, hexadimethrine bromide, poly-L-lysine and lactoferrin.

In a further aspect, the present invention relates to a transduced MSC obtainable by the method of the invention.

In a further aspect, the present invention relates to the transduced MSC of the invention for use in treating a disease.

In a preferred embodiment, the disease is a human disease.

In a preferred embodiment, the disease is treated by gene therapy.

In a preferred embodiment, the disease is treated by cell therapy. The term "cell therapy" as used herein refers to the therapeutic delivery of cellular material into a patient to treat a disease. The cellular material are generally intact, living cells such as transduced MSCs which are obtainable by the method of the invention.

Further disclosed is an in vivo method for transducing tumor cells, the method comprising the step of:

contacting a plurality of tumor cells with an adenovirus according to the invention.

Further disclosed is an in vitro method for transducing tumor cells, the method comprising the step of:

contacting a plurality of tumor cells with an adenovirus according to the invention.

As discussed above, the adenovirus of the invention is particularly useful for transducing tumor cells.

In a preferred embodiment, the plurality of tumor cells is further contacted with a transduction enhancer, wherein the transduction enhancer preferably is selected from the group consisting of coagulation factor X, spermidine, spermine, hexadimethrine bromide, poly-L-lysine and lactoferrin. The use of a transduction enhancer further increases the transduction efficiency of tumor cells with the adenovirus of the invention.

Further disclosed is a transduced tumor cell obtainable by the in vitro method for transducing tumor cells according to the disclosure.

Further disclosed is a human adenovirus having a capsid which comprises a modified adenovirus hexon protein of SEQ ID NO.: 3.

The amino acid sequence of the modified adenovirus hexon protein of SEQ ID NO.: 3 is derived from the wildtype amino acid sequence of the HAdV type 5 hexon protein by replacing 13 consecutive amino acid residues in the HVR1 region of the wildtype sequence by four consecutive lysine residues. The modified adenovirus hexon protein of SEQ ID NO.: 3 has a modified HVR1 region having the sequence of SEQ ID NO.: 1. Accordingly, the presence of the modified adenovirus hexon protein of SEQ ID NO.: 3 confers improved characteristics to the adenovirus. More specifically, as discussed above, such an adenovirus is particularly useful for systemic administration.

In a preferred embodiment, the adenovirus is an adenovirus species C, preferably adenovirus type 5.

Further disclosed is a human adenovirus species C having a capsid which comprises a modified adenovirus hexon protein, wherein the modified adenovirus hexon protein has a modified HVR1 region, wherein the modified HVR1 region comprises three to eight consecutive lysine or arginine residues.

The modified HVR1 region having the sequence of SEQ ID NO.: 1 comprises four consecutive lysine residues. It can be reasonably expected that the effects observed for adenoviruses having a respectively modified hexon protein will also be obtained in case the four consecutive lysine residues will be inserted at a position in the HVR1 region that is different from their position in SEQ ID NO.: 1. It can further be expected that the effects will likewise be obtained in case the modified HVR1 region comprises three to eight consecutive lysine residues. Since arginine residues have chemically similar properties as lysine residues, in particular a positive charge, it can further be expected that the effects will likewise be obtained in case the modified HVR1 region comprises three to eight consecutive arginine residues.

In a preferred embodiment, the three to eight consecutive lysine or arginine residues are directly adjacent to one or several amino acid residues that are not negatively charged. The directly adjacent amino acid residues are amino acid residues that are located N-terminal and/or C-terminal of the three to eight consecutive lysine or arginine residues.

In a preferred embodiment, the modified HVR1 region comprises four to eight consecutive lysine or arginine residues.

In a preferred embodiment, the modified HVR1 region comprises three to eight, preferably four to eight, consecutive lysine residues.

In a further preferred embodiment, the modified HVR1 region comprises four consecutive lysine residues.

In a further aspect, the present disclosure relates to an in vitro method for transducing MSCs, the method comprising the step of:

contacting a plurality of MSCs with an adenovirus and with a transduction enhancer, wherein the transduction enhancer is selected from the group consisting of coagulation factor X, spermidine, spermine, hexadim -continued FDSICLYATFFPMAHNTASTLEAMLRNDTNDQSFNDYLSAANMLYPIPAN
ATNVPISIPSRNWAAFRGWAFTRLKTKETPSLGSGYDPYYTYSGSIPYLD
GTFYLNHTFKKVAITFDSSVSWPGNDRLLTPNEFEIKRSVDGEGYNVAQC
NMTKDWFLVQMLANYNIGYQGFYIPESYKDRMYSFFRNFQPMSRQWDDT
KYKDYQQVGILHQHNNSGFVGYLAPTMREGQAYPANFPYPLIGKTAVDSI
TQKKFLCDRTLWRIPFSSNFMSMGALTDLGQNLLYANSAHALDMTFEVDP
MDEPTLLYVLFEVFDVVRVHQPHRGVIETVYLRTPFSAGNATT Amino Acid Sequence of HVR1 of HAdV5-Mut3 Hexon:

(SEQ ID NO.: 43)
DEAATALEINLKKKKQAEQQKTHVF

The HAdV5 hexon nucleotide sequence is given according to GenBank AY339865.1, position 18,842-21,700. The HVR1 of the hexon is depicted in bold letters, respectively, according to Khare et al. 2012. Nucleotides encoding for the inserted lysine residues are depicted in capital letters.

Nucleotide Sequence of HAdV5 Wildtype Hexon:

(SEQ ID NO.: 4)

```
18842    atggctacc ccttcgatga tgccgcagtg gtcttacatg cacatctcgg gccaggacgc
18901    ctcggagtac ctgagcccg ggctggtgca gtttgcccgc gccaccgaga cgtacttcag
18961    cctgaataac aagtttagaa accccacggt ggcgcctacg cacgacgtga ccacagaccg
19021    gtcccagcgt ttgacgctgc ggttcatccc tgtggaccgt gaggatactg cgtactcgta
19081    caaggcgcgg ttcaccctag ctgtgggtga taaccgtgtg ctggacatgg cttccacgta
19141    ctttgacatc cgcggcgtgc tggacagggg ccctactttt aagccctact ctggcactgc
19201    ctacaacgcc ctggctccca agggtgcccc aaatccttgc gaatgggatg aagctgctac
19261    tgctcttgaa ataaacctag aagaaggaga cgatgacaac gaagacgaag tagacgagca
19321    agctgagcag caaaaaactc aagtatttgg gcaggcgcct tattctggta taaatattac
19381    aaaggagggt attcaaatag gtgtcgaagg tcaaacacct aaatatgccg ataaaacatt
19441    tcaacctgaa cctcaaatag gagaatctca gtggtacgaa acagaaatta atcatgcagc
19501    tgggagagtc ctaaaaaaga ctaccccaat gaaaccatgt tacggttcat atgcaaaacc
19561    cacaaatgaa aatggagggc aaggcattct tgtaaagcaa caaaatggaa agctagaaag
19621    tcaagtggaa atgcaatttt tctcaactac tgaggcagcc gcaggcaatg gtgataactt
19681    gactcctaaa gtggtattgt acagtgaaga tgtagatata gaaacccccag acactcatat
19741    ttcttacatg cccactatta aggaaggtaa ctcacgagaa ctaatgggcc aacaatctat
19801    gcccaacagg cctaattaca ttgcttttag ggacaatttt attggtctaa tgtattacaa
19861    cagcacgggt aatatgggtg ttctggcggg ccaagcatcg cagttgaatg ctgttgtaga
19921    tttgcaagac agaaacacag agctttcata ccagcttttg cttgattcca ttggtgatag
19981    aaccaggtac ttttctatgt ggaatcaggc tgttgacagc tatgatccag atgttagaat
20041    tattgaaaat catggaactg aagatgaact tccaaattac tgctttccac tgggaggtgt
20101    gattaataca gagactctta ccaaggtaaa acctaaaaca ggtcaggaaa atggatggga
20161    aaaagatgct acagaatttt cagataaaaa tgaaataaga ttggaaata attttgccat
20221    ggaaatcaat ctaaatgcca acctgtggag aaatttcctg tactccaaca tagcgctgta
20281    tttgcccgac aagctaaagt acagtccttc caacgtaaaa atttctgata cccaaacac
20341    ctacgactac atgaacaagc gagtggtggc tcccgggcta gtggactgct acattaacct
20401    tggagcacgc tggtcccttg actatatgga caacgtcaac ccatttaacc accaccgcaa
20461    tgctggcctg cgctaccgct caatgttgct gggcaatggt cgctatgtgc ccttccacat
20521    ccaggtgcct cagaagttct ttgccattaa aaacctcctt ctcctgccgg gctcatacac
20581    ctacgagtgg aacttcagga aggatgttaa catggttctg cagagctccc taggaaatga
20641    cctaagggtt gacggagcca gcattaagtt tgatagcatt tgcctttacg ccaccttctt
```

-continued

```
20701   ccccatggcc cacaacaccg cctccacgct tgaggccatg cttagaaacg acaccaacga
20761   ccagtccttt aacgactatc tctccgccgc caacatgctc tacccctatac ccgccaacgc
20821   taccaacgtg cccatatcca tcccctcccg caactgggcg ctttccgcg gctgggcctt
20881   cacgcgcctt aagactaagg aaacccatc actgggctcg ggctacgacc cttattacac
20941   ctactctggc tctataccct acctagatgg aaccttttac ctcaaccaca cctttaagaa
21001   ggtggccatt acctttgact cttctgtcag ctggcctggc aatgaccgcc tgcttacccc
21061   caacgagttt gaaattaagc gctcagttga cggggagggt tacaacgttg cccagtgtaa
21121   catgaccaaa gactggttcc tggtacaaat gctagctaac tataacattg gctaccaggg
21181   cttctatatc ccagagagct acaaggaccg catgtactcc ttctttagaa acttccagcc
21241   catgagccgt caggtggtgg atgatactaa atacaaggac taccaacagg tgggcatcct
21301   acaccaacac aacaactctg gatttgttgg ctaccttgcc cccaccatgc gcgaaggaca
21361   ggcctaccct gctaacttcc cctatccgct tataggcaag accgcagttg acagcattac
21421   ccagaaaaag tttctttgcg atcgcaccct ttggcgcatc ccattctcca gtaactttat
21481   gtccatgggc gcactcacag acctgggcca aaaccttctc tacgccaact ccgcccacgc
21541   gctagacatg acttttgagg tggatcccat ggacgagccc acccttcttt atgttttgtt
21601   tgaagtcttt gacgtggtcc gtgtgcacca gccgcaccgc ggcgtcatcg aaaccgtgta
21661   cctgcgcacg cccttctcgg ccggcaacgc cacaacataa
```

Nucleotide Sequence of HAdV5-Mut3 Hexon:

(SEQ ID NO.: 2)
```
18842    atggctacc ccttcgatga tgccgcagtg gtcttacatg cacatctcgg gccaggacgc
18901   ctcggagtac ctgagccccg ggctggtgca gtttgcccgc gccaccgaga cgtacttcag
18961   cctgaataac aagtttagaa accccacggt ggcgcctacg cacgacgtga ccacagaccg
19021   gtcccagcgt ttgacgctgc ggttcatccc tgtggaccgt gaggatactg cgtactcgta
19081   caaggcgcgg ttcaccctag ctgtgggtga taaccgtgtg ctggacatgg cttccacgta
19141   ctttgacatc cgcggcgtgc tggacagggg ccctactttt aagcccctact ctggcactgc
19201   ctacaacgcc ctggctccca agggtgcccc aaatccttgc gaatgggatg aagctgctac
19261   tgctcttgaa ataaacctaA AAAAGAAAAA Gcaagctgag cagcaaaaaa ctcacgtatt
19321   tgggcaggcg ccttattctg gtataaatat tacaaaggag ggtattcaaa taggtgtcga
19381   aggtcaaaca cctaaatatg ccgataaaac atttcaacct gaaccctcaaa taggagaatc
19441   tcagtggtac gaaacagaaa ttaatcatgc agctgggaga gtcctaaaaa agactacccc
19501   aatgaaacca tgttacggtt catatgcaaa acccacaaat gaaaatggag gcaaggcat
19561   tcttgtaaag caacaaatg aaagctaga aagtcaagtg gaaatgcaat ttttctcaac
19621   tactgaggca gccgcaggca atggtgataa cttgactcct aaagtggtat tgtacagtga
19681   agatgtagat atagaaaccc cagacactca tatttcttac atgcccacta ttaaggaagg
19741   taactcacga gaactaatgg ccaacaatc tatgcccaac aggcctaatt acattgcttt
19801   tagggacaat tttattggtc taatgtatta caacagcacg ggtaatatgg gtgttctggc
19861   gggccaagca tcgcagttga atgctgttgt agatttgcaa gacagaaaca cagagctttc
19921   ataccagctt ttgcttgatt ccattggtga tagaaccagg tacttttcta tctggaatca
19981   ggctgttgac agctatgatc cagatgttag aattattgaa atcatggaa ctgaagatga
20041   acttccaaat tactgctttc cactgggagg tgtgattaat acagagactc ttaccaaggt
```

```
-continued
20101    aaaacctaaa acaggtcagg aaaatggatg ggaaaaagat gctacagaat tttcagataa
20161    aaatgaaata agagttggaa ataattttgc catggaaatc aatctaaatg ccaacctgtg
20221    gagaaatttc ctgtactcca acatagcgct gtatttgccc gacaagctaa agtacagtcc
20281    ttccaacgta aaaatttctg ataacccaaa cacctacgac tacatgaaca agcgagtggt
20341    ggctcccggg ctagtggact gctacattaa ccttggagca cgctggtccc ttgactatat
20401    ggacaacgtc aacccattta accaccaccg caatgctggc ctgcgctacc gctcaatgtt
20461    gctgggcaat ggtcgctatg tgcccttcca catccaggtg cctcagaagt tctttgccat
20521    taaaaacctc cttctcctgc cgggctcata cacctacgag tggaacttca ggaaggatgt
20581    taacatggtt ctgcagagct ccctaggaaa tgacctaagg gttgacggag ccagcattaa
20641    gtttgatagc atttgccttt acgccaccct cttccccatg gcccacaaca ccgcctccac
20701    gcttgaggcc atgcttagaa acgacaccaa cgaccagtcc tttaacgact atctctccgc
20761    cgccaacatg ctctacccta tacccgccaa cgctaccaac gtgcccatat ccatcccctc
20821    ccgcaactgg gcggctttcc gcggctgggc cttcacgcgc cttaagacta aggaaacccc
20881    atcactgggc tcgggctacg accttattca cacctactct ggctctatac cctacctaga
20941    tggaaccttt tacctcaacc acacctttaa gaaggtggcc attacctttg actcttctgt
21001    cagctggcct ggcaatgacc gcctgcttac ccccaacgag tttgaaatta agcgctcagt
21061    tgacggggag ggttacaacg ttgcccagtg taacatgacc aaagactggt tcctggtaca
21121    aatgctagct aactataaca ttggctacca gggcttctat atcccagaga gctacaagga
21181    ccgcatgtac tccttcttta gaaacttcca gcccatgagc cgtcaggtgg tggatgatac
21241    taaatacaag gactaccaac aggtgggcat cctacaccaa cacaacaact ctggatttgt
21301    tggctacctt gcccccacca tgcgcgaagg acaggcctac cctgctaact tcccctatcc
21361    gcttataggc aagaccgcag ttgacagcat tacccagaaa agtttctttt gcgatcgcac
21421    cctttggcgc atcccattct ccagtaactt tatgtccatg ggcgcactca cagacctggg
21481    ccaaaacctt ctctacgcca actccgccca cgcgctagac atgactttg aggtggatcc
21541    catggacgag cccaccctc tttatgtttt gtttgaagtc tttgacgtgg tccgtgtgca
21601    ccagccgcac cgcggcgtca tcgaaaccgt gtacctgcgc acgcccttct cggccggcaa
21661    cgccacaaca taa
```

Nucleotide Sequence of HVR1 of HAdV5 Wildtype Hexon:

(SEQ ID NO.: 44)
gatgaagctgctactgctcttgaaataaacctagaagaagaggacgatgacaacgaagac-
gaagtagacgagcaagctgagcagcaaaaaactcacgtattt Nucleotide Sequence of HVR1 of HAdV5-Mut3 Hexon:

(SEQ ID NO.: 45)
gatgaagctgctactgctcttgaaataaacctaAAAAAGAAAAAGcaagc
tgagcag-caaaaaactcacgtattt Amino Acid Sequence of HVR1 of HAdV5-ΔHVR1 Hexon:

(SEQ ID NO.: 46)
DEAATALEINLQAEQQKTHVF

Amino Acid Sequence of HVR1 of HAdV5-Mut2 Hexon:

(SEQ ID NO.: 47)
DEAATALEINLEEEKKKNEKEVDEQAEQQKTHVF

Amino Acid Sequence of HVR1 of HAdV5-Mut4 Hexon:

(SEQ ID NO.: 48)
DEAATALKINLKKNKVKQAKQQKTHVF

Amino Acid Sequence of HVR1 of HAdV5-Mut5 Hexon:

```
                              (SEQ ID NO.: 43)
DEAATALEINLKKKKQAEQQKTHVF
```

Amino Acid Sequence of HVR1 of HAdV5-Mut6 Hexon:

```
                              (SEQ ID NO.: 48)
DEAATALKINLKKNKVKQAKQQKTHVF
```

Amino Acid Sequence of HVR1 of HAdV5-Mut7 Hexon:

```
                              (SEQ ID NO.: 51)
DEAATALEINLKKKKKQAEQQKTHVF
```

Amino Acid Sequence of HVR1 of HAdV5-Mut8 Hexon:

```
                              (SEQ ID NO.: 52)
DEAATALEINLKKKKKKKQAEQQKTHVF
```

Amino Acid Sequence of HVR1 of HAdV5-Mut9 Hexon:

```
                              (SEQ ID NO.: 53)
DEAATALEINLGGSGGGSGKKKKKKKKGSGGGSGGQAEQQKTHVF
```

The portions of the HVR1 regions of human adenovirus type 1 (HAdV1), type 2 (HAdV2), type 6 (HAdV6) and type 57 (HAdV57) hexon proteins, which have been replaced by the amino acid sequence of SEQ ID NO.: 1, are as follows (aa, amino acids):

```
HAdV1: aa 136-173 of HAdV1 Hexon (GenBank:
BAG48778.1):
                              (SEQ ID NO.: 7)
EQEEPTQEMAEELEDEEEAEEEEAEEEAEAPQADQKVK HAdV2: aa 136-171 of HAdV2 Hexon (GenBank:
CAC67477.1):
                              (SEQ ID NO.: 8)
EQTEDSGRAVAEDEEEEDEDEEEEEEEQNARDQATK HAdV6: aa 136-167 of HAdV6 Hexon (GenBank:
BAU36782.1):
                              (SEQ ID NO.: 9)
EQNETAQVDAQELDEEENEANEAQAREQEQAK HAdV57: aa 136-166 of HAdV57 Hexon (GenBank:
BBF89158.1)
                              (SEQ ID NO.: 10)
DEDDTQVQVAAEDDQDDDEEEEQLPQQRNGK HAdV89: aa 136-172 of HAdV89 Hexon (GenBank:
AZR67181):
                              (SEQ ID NO.: 49)
EQTEDSGRAVAEDEEEEDEDEEEEEEEQNARDQATK
```

The resulting amino acid sequences of the modified adenovirus hexon proteins are given below.

Amino Acid Sequence of a Modified Adenovirus Hexon Protein of an Adenovirus of the Invention, Wherein the Adenovirus is Adenovirus Type 1 (Amino Acid Sequence of HAdV1-Mut3 Hexon):

```
                              (SEQ ID NO.: 11)
MATPSMMPQWSYMHISGQDASEYLSPGLVQFARATETYFSLNNKFRNPT
VAPTHDVTTDRSQRLTLRFIPVDREDTAYSYKARFTLAVGDNRVLDMAS
TYFDIRGVLDRGPTFKPYSGTAYNALAPKGAPNSCEWDEAATALEINLK
KKKQAEQQKTHVYAQAPLAGEKITANGLQIVSDTQTEGNPVFADPTYQP
EPQVGESQWNEAEATASGGRVLKKTTPMKPCYGSYARPTNKNGGQGILV
ANNQGALESKVEMQFFAPSGTAMNERNAVQPSIVLYSEDVNMETPDTHI
SYKPSKTDENSKAMLGQQAMPNRPNYIAFRDNFIGLMYYNSTGNMGVLA
GQASQLNAVVDLQDRNTELSYQLLLDSIGDRTRYFSMWNQAVDSYDPDV
RIIENHGTEDELPNYCFPLGGIGVTDTYQGIKSNGNGNPQNWTKNDDFA
ARNEIGVGNNFALEINLNANLWRNFLYSNIALYLPDKLKYTPTNVEISP
NPNSYDYMNKRVVAPGLVDCYINLGARWSLDYMDNVNPFNHHRNAGLRY
RSMLLGNGRYVPFHIQVPQKFFAIKNLLLLPGSYTYEWNFRKDVNMVLQ
SSLGNDLRVDGASIKFDSICLYATFFPMAHNTASTLEAMLRNDTNDQSF
NDYLSAANMLYPIPANATNVPISIPSRNWAAFRGWAFTRLKTKETPSLG
SGYDPYYTYSGSIPYLDGTFYLNHTFKKVAITFDSSVSWPGNDRLLTPN
EFEIKRSVDGEGYNVAQCNMTKDWFLVQMLANYNIGYQGFYIPESYKDR
MYSFFRNFQPMSRQVVDDTKYKDYQQVGILHQHNNSGFVGYLAPTMREG
QAYPANFPYPLIGKTAVDSITQKKFLCDRTLWRIPFSSNFMSMGALTDL
GQNLLYANSAHALDMTFEVDPMDEPTLLYVLFEVFDWVRVHQPHRGVIE
TVYLRTPFSAGNATT
```

Amino Acid Sequence of a Modified Adenovirus Hexon Protein of an Adenovirus of the Invention, Wherein the Adenovirus is Adenovirus Type 2 (Amino Acid Sequence of HAdV2-Mut3 Hexon):

```
                              (SEQ ID NO.: 12)
MATPSMMPQWSYMHISGQDASEYLSPGLVQFARATETYFSLNNKFRNPT
VAPTHDVTTDRSQRLTLRFIPVDREDTAYSYKARFTLAVGDNRVLDMAS
TYFDIRGVLDRGPTFKPYSGTAYNALAPKGAPNSCEWDEAATALEINLK
KKKQAEQQKTHVYAQAPLSGETITKSGLQIGSDNAETQTKPVYADPSYQ
PEPQIGESQWNEADANAAGGRVLKKTTPMKPCYGSYARPTNPFGGQSVL
VPDEKGVPLPKVDLQFFSNTTSLNDRQGNATKPKVVLYSEDVNMETPDT
HLSYKPGKGDENSKAMLGQQSMPNRPNYIAFRDNFIGLMYYNSTGNMGV
LAGQASQLNAVVDLQDRNTELSYQLLLDSIGDRTRYFSMWNQAVDSYDP
DVRIIENHGTEDELPNYCFPLGGIGVTDTYQAIKANGNGSGDNGDTTWT
KDETFATRNEIGVGNNFAMEINLNANLWRNFLYSNIALYLPDKLKYNPT
NVEISDNPNTYDYMNKRVVAPGLVDCYINLGARWSLDYMDNVNPFNHHR
NAGLRYRSMLLGNGRYVPFHIQVPQKFFAIKNLLLLPGSYTYEWNFRKD
VNMVLQSSLGNDLRVDGASIKFDSICLYATFFPMAHNTASTLEAMLRND
TNDQSFNDYLSAANMLYPIPANATNVPISIPSRNWAAFRGWAFTRLKTK
ETPSLGSGYDPYYTYSGSIPYLDGTFYLNHTFKKVAITFDSSVSWPGND
RLLTPNEFEIKRSVDGEGYNVAQCNMTKDWFLVQMLANYNIGYQGFYIP
ESYKDRMYSFFRNFQPMSRQVVDDTKYKEYQQVGILHQHNNSGFVGYLA
PTMREGQAYPANVPYPLIGKTAVDSITQKKFLCDRTLWRIPFSSNFMSM
```

-continued

GALTDLGQNLLYANSAHALDMTFEVDPMDEPTLLYVLFEVFDVVRVHQP

HRGVIETVYLRTPFSAGNATT

Amino Acid Sequence of a Modified Adenovirus Hexon Protein of an Adenovirus of the Invention, Wherein the Adenovirus is Adenovirus Type 6 (Amino Acid Sequence of HAdV6-Mut3 Hexon):

(SEQ ID NO.: 13)
MATPSMMPQWSYMHISGQDASEYLSPGLVQFARATETYFSLNNKFRNPT

VAPTHDVTTDRSQRLTLRFIPVDREDTAYSYKARFTLAVGDNRVLDMAS

TYFDIRGVLDRGPTFKPYSGTAYNALAPKGAPNSCEWDEAATALEINLK

KKKQAEQQKTHVYAQAPLSGIKITKEGLQIGTADATVAGAGKEIFADKT

FQPEPQVGESQWNEADATAAGGRVLKKTTPMKPCYGSYARPTNSNGGQG

VMVEQNGKLESQVEMQFFSTSTNATNEVNNIQPTVVLYSEDVNMETPDT

HLSYKPKMGDKNAKVMLGQQAMPNRPNYIAFRDNFIGLMYYNSTGNMGV

LAGQASQLNAVVDLQDRNTELSYQLLLDSIGDRTRYFSMWNQAVDSYDP

DVRIIENHGTEDELPNYCFPLGGIGITDTFQAVKTTAANGDQGNTTWQK

DSTFAERNEIGVGNNFAMEINLNANLWRNFLYSNIALYLPDKLKYNPTN

VEISDNPNTYDYMNKRVVAPGLVDCYINLGARWSLDYMDNVNPFNHHRN

AGLRYRSMLLGNGRYVPFHIQVPQKFFAIKNLLLLPGSYTYEWNFRKDV

NMVLQSSLGNDLRVDGASIKFDSICLYATFFPMAHNTASTLEAMLRNDT

NDQSFNDYLSAANMLYPIPANATNVPISIPSRNWAAFRGWAFTRLKTKE

TPSLGSGYDPYYTYSGSIPYLDGTFYLNHTFKKVAITFDSSVSWPGNDR

LLTPNEFEIKRSVDGEGYNVAQCNMTKDWFLVQMLANYNIGYQGFYIPE

SYKDRMYSFFRNFQPMSRQVVDDTKYKDYQQVGIIHQHNNSGFVGYLAP

TMREGQAYPANVPYPLIGKTAVDSITQKKFLCDRTLWRIPFSSNFMSMG

ALTDLGQNLLYANSAHALDMTFEVDPMDEPTLLYVLFEVFDVVRVHQPH

RGVIETVYLRTPFSAGNATT

Amino Acid Sequence of a Modified Adenovirus Hexon Protein of an Adenovirus of the Invention, Wherein the Adenovirus is Adenovirus Type 57 (Amino Acid Sequence of HAdV57-Mut3 Hexon):

(SEQ ID NO.: 14)
MATPSMMPQWSYMHISGQDASEYLSPGLVQFARATETYFSLNNKFRNPT

VAPTHDVTTDRSQRLTLRFIPVDREDTAYSYKARFTLAVGDNRVLDMAS

TYFDIRGVLDRGPTFKPYSGTAYNALAPKGAPNSCEWDEAATALEINLK

KKKQAEQQKTHVYAQAPFAGEAINKNGLQIGTNGAATEGNKEIYADKTY

QPEPQIGESQWNEAESSVAGGRVLKKTTPMKPCYGSYARPTNSNGGQGV

MVEQNGKLESQVEMQFFSTSVNAMNEANAIQPKLVLYSEDVNMETPDTH

LSYKPGKSDDNSKAMLGQQSMPNRPNYIAFRDNFIGLMYYNSTGNMGVL

AGQASQLNAWDLQDRNTELSYQLLLDSIGDRTRYFSMWNQAVDSYDPDV

RIIENHGTEDELPNYCFPLGGIGVTDTYQAIKATNGNGGATTWAQDNTF

AERNEIGVGNNFAMEINLNANLWRNFLYSNIALYLPDKLKYNPTNVEIS

DNPNTYDYMNKRWAPGLVDCYINLGARWSLDYMDNVNPFNHHRNAGLRY

RSMLLGNGRYVPFHIQVPQKFFAIKNLLLLPGSYTYEWNFRKDVNMVLQ

SSLGNDLRVDGASIKFDSICLYATFFPMAHNTASTLEAMLRNDTNDQSF

NDYLSAANMLYPIPANATNVPISIPSRNWAAFRGWAFTRLKTKETPSLG

SGYDPYYTYSGSIPYLDGTFYLNHTFKKVAITFDSSVSWPGNDRLLTPN

EFEIKRSVDGEGYNVAQCNMTKDWFLVQMLANYNIGYQGFYIPESYKDR

MYSFFRNFQPMSRQVVDDTKYKDYQQVGILHQHNNSGFVGYLAPTMREG

QAYPANFPYPLIGKTAVDSITQKKFLCDRTLWRIPFSSNFMSMGALTDL

GQNLLYANSAHALDMTFEVDPMDEPTLLYVLFEVFDWRVHQPHRGVIET

VYLRTPFSAGNATT

Amino Acid Sequence of the Modified Adenovirus Hexon Protein of the Adenovirus of the Invention, Wherein the Adenovirus is Adenovirus Type 89 (Amino Acid Sequence of HAdV89-Mut3 Hexon):

(SEQ ID NO.: 50)
MATPSMMPQWSYMHISGQDASEYLSPGLVQFARATETYFSLNNKFRNPT

VAPTHDVTTDRSQRLTLRFIPVDREDTAYSYKARFTLAVGDNRVLDMAS

TYFDIRGVLDRGPTFKPYSGTAYNALAPKGAPNSCEWDEAATALEINLK

KKKQAEQQKTHVYAQAPLSGETITKSGLQIGSDNAETQAKPVYADPSYQ

PEPQIGESQWNEADANAAGGRVLKKTTPMKPCYGSYARPTNPFGGQSVL

VPDEKGVPLPKVDLQFFSNTTSLNDRQGNATKPKVVLYSEDVNLETPDT

HLSYKPGKGDENSKAMLGQQSMPNRPNYIAFRDNFIGLMYYNSTGNMGV

LAGQASQLNAVVDLQDRNTELSYQLLLDSIGDRTRYFSMWNQAVDSYDP

DVRIIENHGTEDELPNYCFPLGGIGVTDTYQAIKANGNGAGDNGNTTWT

KDETFATRNEIGVGNNFAMEINLNANLWRNFLYSNIALYLPDKLKYNPT

NVEISDNPNTYDYMNKRVVAPGLVDCYINLGARWSLDYMDNVNPFNHHR

NAGLRYRSMLLGNGRYVPFHIQVPQKFFAIKNLLLLPGSYTYEWNFRKD

VNMVLQSSLGNDLRVDGASIKFDSICLYATFFPMAHNTASTLEAMLRND

TNDQSFNDYLSAANMLYPIPANATNVPISIPSRNWAAFRGWAFTRLKTK

ETPSLGSGYDPYYTYSGSIPYLDGTFYLNHTFKKVAITFDSSVSWPGND

RLLTPNEFEIKRSVDGEGYNVAQCNMTKDWFLVQMLANYNIGYQGFYIP

ESYKDRMYSFFRNFQPMSRQVVDDTKYKDYQQVGIIHQHNNSGFVGYLA

PTMREGQAYPANVPYPLIGKTAVDSITQKKFLCDRTLWRIPFSSNFMSM

GALTDLGQNLLYANSAHALDMTFEVDPMDEPTLLYVLFEVFDVVRVHQP

HRGVIETVYLRTPFSAGNATT

Further aspects of the invention will be apparent to the person skilled in the art by the enclosed description of the examples, in particular the scientific results.

EXAMPLES

Materials and Methods

Cells

All cells were cultivated at 90% humidity, 5% CO2 and 37° C. and passaged twice a week to indicated split rates. Cells were detached with 0.05% trypsin-EDTA, except for J774A.1 cells, which were detached by scrapping.

A549 cells (ATCC #CCL-185; split rate: 1:8) were propagated in Minimum Essential Medium (Gibco) supplemented with 10% FBS and 1% penicillin/streptomycin/glutamine.

J774A.1 cells (ATCC #TIB-67; split rate: 1:10) were propagated in Dulbecco's Modified Eagle's Medium (Gibco) supplemented with 10% FBS and 1% penicillin/streptomycin/glutamine.

SKOV-3 cells (ATCC #HTB-77; split rate: 1:3) were propagated in Roswell Park Memorial Institute 1640 Medium (Gibco) supplemented with 5% FBS and 1% penicillin/streptomycin/glutamine.

UM-SCC-11B cells (carcinoma cells derived from a human head-and-neck squamous cell carcinoma, kindly provided by Prof. Dr. Brunner, University Clinic; split rate: 1:10) were propagated in Dulbecco's Modified Eagle's Medium (Gibco) supplemented with 10% FCS and 1% penicillin/streptomycin/glutamine.

MiaPaCa cells (ATCC #CRL-1420, split rate 1:7-1:15) were propagated in Dulbecco's Modified Eagle Medium: Nutrient Mixture F-12 (Gibco) with 10% FBS 1× GlutaMAX™ and 1× penicillin/streptomycin.

Huh7 cells (JCRB0403, split rate 1:10) were propagated in Dulbecco's Modified Eagle's Medium (Gibco) supplemented with 10% FCS and 1% penicillin/streptomycin/glutamine.

HepG2 cells (ATCC #HB-8065, split rate 1:4-1:7) were propagated in Minimum Essential Medium (Gibco) supplemented with 10% FBS and 1% penicillin/streptomycin/glutamine.

Human mesenchymal stromal cells (MSCs) (kindly provided by Institute for Clinical Transfusion Medicine and Immunogenetics, German Red Cross Ulm, Germany, and prepared as described in Fekete, Rojewski et al., 2012) were propagated in BioWhittaker® Alpha Minimum Essential Medium (Lonza) supplemented with 8% irradiated pooled human platelet lysate (PL) (prepared as described in Fekete, Gadelorge et al., 2012 and provided by the Institute for Clinical Transfusion Medicine and Immunogenetics, German Red Cross Ulm, Germany) and 500 Units of Heparin (Ratiopharm).

Viruses and Vectors

Replication-incompetent human adenovirus type 5 (HAdV5) vector particles had a deleted E1 region (GenBank ID: AY339865.1, sequence from nt 1 to 440 and from nt 3523 to 35935), and carried a CMV promoter-driven enhanced GFP (eGFP) expression cassette, subcloned from a pEGFP-N1 plasmid (Clontech 6085-1) that was inserted in reverse orientation in the deleted E1 region.

HAdV5-ΔCAR vector particles carried additionally a point mutation in the fiber knob (Y→477A) that significantly reduces CAR-binding (Kirby et al., 2000).

HAdV5-ΔFX vector particles carried additionally a point mutation in the hyper variable region (HVR) 7 of the hexon protein (E→451Q) that significantly reduces but not abolishes binding of blood coagulation factor X to the vector capsid (Krutzke et al., 2016).

HAdV5-ΔHVR1 particles carried a 13 amino acid deletion within a negatively charged region of HVR1 (ΔEEEDDDNEDEVDE (SEQ ID NO.: 6); nt 19280-19318) of the hexon protein to reduce the negative surface charge of HAdV5 particles (Alemany et al., 2000).

In case of HAdV5-Mut3 particles, these 13 amino acids within HVR1 were replaced by four lysine residues (EEEDDDNEDEVDE (SEQ ID NO.: 6)→KKKK (SEQ ID NO.: 15); nt 19280-19318).

For HAdV5-Mut2 some of the aspartic acids in this 13 amino acid stretch were replaced with lysine residues (EE-EDDDNEDEVDE (SEQ ID NO.: 6)→EEEKKK-NEKEVDE (SEQ ID NO.: 16); nt 19289-19306).

For HAdV5-Mut4 some negatively charged amino acids within HVR1 were replaced with lysine residues (EINLEEEDDDNEDEVDEQAE (SEQ ID NO.: 17)→KINLK-KNKVKQAK (SEQ ID NO.: 18)).

For HAdV5-Mut5 some amino acids within HVR1 (EE-EDDDNEDEVDE (SEQ ID NO.: 6)→KKKK (SEQ ID NO.: 15)), within HVR5 (STTEAAAGNGDNLTPK (SEQ ID NO.: 19)→STTKAAAGNGKNLTPK (SEQ ID NO.: 20)), and within HVR7 (GGVINTETLTKVKPKTGQEN-GWEKDATEFSDKNEIRVGNNF (SEQ ID NO.: 21)→GGVINTETLTKVKPKTGQKNGWKKKATEFSDK-NEIRVGNNF (SEQ ID NO.: 22)) were replaced with lysine residues.

For HAdV5-Mut6 some negatively charged amino acids within HVR1 (EINLEEEDDDNEDEVDEQAE (SEQ ID NO.: 17)→KINLKKNKVKQAK (SEQ ID NO.: 18)), within HVR5 (STTEAAAGNGDNLTPK (SEQ ID NO.: 19)→STTKAAAGNGKNLTPK (SEQ ID NO.: 20)), and within HVR7 (GGVINTETLTKVKPKTGQENGWEK-DATEFSDKNEIRVGNNF (SEQ ID NO.: 21)→GGVIN-TETLTKVKPKTGQKNGWKKKATEFSDKNEIRVGNNF (SEQ ID NO.: 22)) were replaced with lysine residues.

For HAdV5-Mut7, the 13 amino acids of SEQ ID NO.: 6 within HVR1 were replaced by six lysine residues.

For HAdV5-Mut8, the 13 amino acids of SEQ ID NO.: 6 within HVR1 were replaced by eight lysine residues.

For HAdV5-Mut9, the 13 amino acids of SEQ ID NO.: 6 within HVR1 were replaced by 24 amino acids, namely by a stretch of eight lysine residues that is flanked by a flexible GS-linker of eight amino acids selected from glycine and serine on each side.

For HAdV5-ΔCAR-Mut3 vector particles, the 13 amino acids of SEQ ID NO.: 6 within HVR1 were replaced by four lysine residues and the vector particles carried additionally a point mutation in the fiber knob (Y→477A) that significantly reduces CAR-binding (Kirby et al., 2000).

HAdV5-TSG6 vector particles carried, instead of an eGFP expression cassette, in the E1 region a cDNA coding for the human Tumor Necrosis Factor (TNF) stimulated Gene 6 (TSG-6) protein (nucleotide accession GenBank: AJ419936.1) under control of the human CMV promoter. TSG-6 is a protein with anti-inflammatory activity and thus can be used as anti-inflammatory therapeutic.

Replication-competent wildtype adenovirus particles (HAdV5 wt) had no deletions, but carried the eGFP expression cassette that was inserted in forward orientation in a non-coding region between E1A and E1B (position 1648/1649).

Vector and Virus Rescue and Production

Replication-incompetent vectors were produced in E1-transcomplementing N52.E6 cells, replication-competent viruses were produced in A549 cells.

Vector and virus DNAs, respectively, were excised from circular bacmid DNA by SwaI restriction enzyme digestion, with subsequent purification using standard procedures. Producer cells (N52.E6 or A549 cells) were transfected with the linear DNAs, prepared as described above, using the transfection agent polyethylenimine (PEI). Vector and virus particles, respectively, were amplified by consecutive harvest and infection cycles with increasing cell numbers. After infection of $2\times10^8$-$4\times10^8$ cells, cells were harvested 48 h post infection, resuspended in 50 mM HEPES, 150 mM NaCl, pH 7.4, and lysed by three consecutive freeze/thawing cycles. Particles were purified by one CsCl step gradient (density bottom: 1.41 g/ml; density top: 1.27 g/ml; 2 h at 176,000×g, 4° C.) and one consecutive continuous CsCl gradient (density: 1.34 g/ml; 20 h at 176,000×g and 4° C.). Subsequently, particles were desalted using PD-10 size exclusion columns (GE Healthcare) and stored in buffer (50 mM Hepes, 150 mM NaCl, pH 7.4) with 10% glycerol at −80° C. Physical titers were determined by optical density measurement at OD260 nm of isolated virus/vector DNA.

Homologous Recombination

Modification of the HVR1, HVR5 and HVR7 region in HAdV5-ΔHVR1, HAdV5-Mut2, HAdV5-Mut3, HAdV5-Mut4, HAdV5-Mut5, and HAdV5-Mut6 vectors, as applicable, were done by homologous recombination according to bacmid kit "Counter-Selection BAC Modification Kit Red/ET Recombination". Therefore, a bacmid carrying the HAdV5 sequence was transformed into streptomycin-resistant *Escherichia coli* (*E. coli*) strain ElectroMAX™ DH10B™ by electroporation. Bacteria were streaked on lysogeny broth medium (LB) agar plates supplemented with chloramphenicol (20 µg/ml) and cultured overnight at 37° C. After streptomycin (50 µg/ml) and chloramphenicol (20 µg/ml) resistance was verified, *E. coli* was transformed by electroporation with pRed/ET plasmid provided by kit. Bacteria were streaked on LB agar plates containing tetracycline (3 µg/ml) and chloramphenicol (20 µg/ml). Plates were incubated for 20 h at 30° C. The next day single colonies were picked, cultured overnight at 30° C. and the expression of the recombination proteins Redα and Redβ from the Red/ET plasmid was induced by L-arabinose and a temperature shift to 37° C. Subsequently, bacteria were transformed with polymerase chain reaction (PCR) product carrying the rpsL-neo cassette with homologous arms for the gene region of interest. Bacteria suspension was streaked on LB agar containing tetracycline (3 µg/ml), chloramphenicol (20 µg/ml) and kanamycin (15 µg/ml) and cultured for more than 24 h at 30° C. Next, clones were picked selected by streptomycin sensitivity and deoxyribonucleic acid (DNA) integrity confirmed by restriction enzyme analysis. After confirmation of introduced rpsL-neo cassette, expression of Red/ET genes was again induced by L-arabinose and a temperature shift to 37° C. Bacteria were transformed with a second PCR product carrying the mutation for either HVR1, HVR5 or HVR7, respectively. These second PCR products also carried homologous arms for the gene region of interest and successfully recombined clones were selected on LB agar containing chloramphenicol (20 µg/ml) and streptomycin (50 µg/ml) overnight at 37° C. Single colonies were analyzed by DNA restriction analysis for the expected mutations. After large scale bacmid preparations, positive clones were further verified by sequencing.

Polymerase Chain Reaction (PCR) for the Generation of PCR Products for Homologous Recombination For the generation of HAdV5-ΔHVR1, HAdV5-Mut2, HAdV5-Mut3, HAdV5-Mut4, HAdV5-Mut5, and HAdV5-Mut6, the PCR product encoding the respective rpsL-neo cassette, carried flanking homology arms that were complementary to the gene region of interest. The used primers consisted of 74 base pairs (bp) (5'-50 bp complementary to the gene region of interest plus 24 bp complementary to rpsL-neo-3'). For PCR reaction 5 µl Pfx amplification buffer (10×), 1 µl MgSO$_4$ (50 mM), 2 µl dNTP's (10 mM), 1 µl of each primer 10 µM

```
(for HVR1:

rpsL-neo fw:

caaatccttgcgaatgggatgaagctgctactgctcttgaaataaacctaggcctggtgatgatggcgggatcg (SEQ ID NO.: 23), rpsL-neo rev:

ccagaataaggcgcctgcccaaatacgtgagttttttgctgctcagcttgtcagaagaactcgtcaagaaggcg (SEQ ID NO.: 24);

for HVR5:

rpsL-neo fw:

ggagggcaaggcattcttgtaaagcaacaaaatggaaagctagaaagtcaagGGCCTGGTGATGATGGCGGGATCG (SEQ ID NO.: 25), rpsL-neo rev:

gtctggggtttctatatctacatcttcactgtacaataccactttaggagtcTCAGAA-

GAACTCGTCAAGAAGGCG (SEQ ID NO.: 26);

for HVR7:

rpsL-neo fw:

catggaactgaagatgaacttccaaattactgctttccactgggaggtgtgGGCCTGGTGATGATGGCGGGATCG
```

(SEQ ID NO.: 27), rpsL-neo rev:

ctccacaggttggcatttagattgatttccatggcaaaattatttccaactcTCAGAA-

GAACTCGTCAAGAAGGCG (SEQ ID NO.: 28);

all primer sequences indicated in 5' > 3' direction), 0.5 µl rpsL-neo cassette template and 0.5 µl Platinum® Pfx DNA polymerase (2.5 U/µl) were mixed in a final volume of 50 µl. PCR cycles were performed as follows: 1 cycle: 95° C. for 5 min (initial denaturation); 27 cycles: 95° C. for 45 s (denaturation), 60° C. for 45 s (annealing), 68° C. for 2 min (elongation); 1 cycle: 68° C. for 10 min (final elongation).

The second PCR-products to replace the previously inserted rpsL-neo cassette were produced using synthesized templates from Invitrogen GeneArt that carried the desired mutations for either HAdV5-ΔHVR1, HAdV5-Mut2, HAdV5-Mut3, HAdV5-Mut4, HAdV5-Mut5, or HAdV5-Mut6. For PCR reaction 5 µl Pfx amplification buffer (10×), 1 µl MgSO$_4$ (50 mM), 2 µl dNTP's (10 mM), 1 µl of each primer 10 µM

```
(HVR1 fw: ttttaagccctactctggcactgc (SEQ ID
NO.: 29),

HVR1 rev: CCTTCGACACCTATTTGAATACCC (SEQ ID
NO.: 30);

HVR5fw: cacaaatgaaaatggagggcaagg, (SEQ ID
NO.: 31),

HVR5 rev: gtgggcatgtaagaaatatgagtg (SEQ ID
NO.: 32);

HVR7 fw: gacagctatgatccagatgttagaa (SEQ ID
NO.: 33),

HVR7 rev: ctccacaggttggcatttagattg (SEQ ID
NO.: 34);

all primer sequences indicated in 5' → 3'
direction),
```

100 ng template plasmid DNA and 0.5 µl Platinum® Pfx DNA polymerase (2.5 U/µl) were mixed in a final volume of 50 µl. PCR cycles were performed as follows: 1 cycle: 95° C. for 5 min (initial denaturation); 27 cycles: 95° C. for 45 s (denaturation), 55° C. for 45 s (annealing), 68° C. for 2 min (elongation); 1 cycle: 68° C. for 10 min (final elongation).

PCR products were separated by agarose gel electrophoresis on tris-acetic acid-ethylenediaminetetraacetic acid (TAE) gels. The desired band was cut out and purified by phenol-chloroform extraction followed by ethanol precipitation.

The same procedure was applied for the generation of HAdV5-Mut7, HAdV5-Mut8, and HAdV5-Mut9.

Silver Staining $5 \times 10^9$ vector particles dissolved in 20 µl PBS including 1×SDS-loading buffer with ß-mercaptoethanol, were denatured for 5 min at 70° C. Subsequently, viral proteins were separated by SDS-PAGE (5% stacking gel, 8% separation/running gel). For visualization of viral proteins silver staining was performed. Proteins were fixed for 30 min in fixation buffer (50% methanol, 12% acetic acid, 0.05% formaldehyde 37%), washed 15 min with wash buffer (50% ethanol) and then pretreated with equilibration buffer (0.8 mM sodium thiosulfate) for 1 min. Next, the gel was washed three times with dH$_2$O followed by an incubation for 20 min in impregnation buffer (11.78 mM silver nitrate, 0.05% formaldehyde 37%). Staining of proteins occurred by incubation of gel in development buffer (0.57 M sodium carbonate, 0.05% formaldehyde 37%, 15.8 µM sodium thiosulfate) for a reasonable time. Development was stopped with stop buffer (50% methanol, 12% acetic acid), when the protein bands were very clear but the bands of marker were hardly seen.

Zeta Potential Measurement

The measurement of the zeta potential was performed with ZetaSizer Nano-ZS (Malvern, UK). $2 \times 10^{11}$ vector particles was dialyzed three times (2 h followed by overnight and 6 h) with 50 mM HEPES (pH 7.4) in a Slide-A-Lyzer Dialysis cassettes (3.5K MWCO 0.5 ml, Thermo Fisher Scientific) under easy stirring at 4° C. Subsequently, a size exclusion chromatography using PD MiniTrap G-25 column (GE Healthcare Life Sciences) was performed according to the manufacturer without fil-ter to remove glycerol. Because the needed volume for clear disposable zeta cell cuvettes (Malvern, UK) was 1 ml, purified vector particles were filled up to 1 ml with 50 mM HEPES (pH 7.4 sterile filtered) (Krutzke et al., 2016). The following settings were applied for measurement and analysis in DTSNano 5.10 software: Measurement type zeta potential; sample material Protein RI 1.450, Absor 0.00; sample dispersant water temp 25° C., viscosity 0.8872CP, RI 1.330, dielectric constant 78.5; sample general options Smoluchowski; sample temperature 25° C., at start of measurement 2 min equilibration time; sample cell DTS 1060C clear disposable zeta cell; measurements automatic minimum 10, maximum 15; measurements number of measurements 1.

FX-Mediated Transduction of SKOV-3 Cells

SKOV-3 cells were seeded at a density of $2 \times 10^4$ cells/well in 200 µl serum-containing Roswell Park Memorial Institute 1640 medium. Next day, cells were washed and 100 µl serum-free Roswell Park Memorial Institute 1640 medium containing 8 µg/ml FX or not (as control) was provided. Cells were transduced with a pMOI 1000 ($2 \times 10^7$ VP). After an incubation for 3 h at 37° C. cells were washed and 200 µl serum-containing Roswell Park Memorial Institute 1640 medium was added. 72 h post transduction, cells were harvested and the eGFP expression analyzed by flow cytometry.

Scavenger Receptor-Mediated Uptake

J774A.1 cells were seeded in a density of $1 \times 10^5$ cells/well in a 24 well plate in 1 ml serum-containing Dulbecco's Modified Eagle Medium and cultured overnight at 37° C. The next day, cells were washed and 500 µl serum-free Dulbecco's Modified Eagle Medium was provided. If indicated, polyinosinic acid (Poly-(I)) (30 µg/ml) dissolved in Dulbecco's phosphate buffered saline was added to cells and cells were incubated at 37° C. for 1 h. Finally, cells were transduced with a pMOI of 2000 (1×10$^8$ VP). After 3 h of incubation at 37° C., cells were washed twice and subsequently incubated in 1 ml serum-containing Dulbecco's Modified Eagle Medium. Cells were harvested 24 h post transduction by adding 200 µl Dulbecco's phosphate buffered saline, 20 µl proteinase K and 20 µl RNase per well. After incubation for 2 min at room temperature, additionally 200 µl AL buffer ("QIAmp DNA Mini Kit") was added and cells incubated at 56° C. for 10 min. Subsequently, DNA of lysed cells was isolated according to the protocol of "QIAmp DNA Mini Kit" (Krutzke et al., 2016).

To quantify the adenoviral content of isolated total DNA samples, quantitative PCR (qPCR) for the adenoviral E4 gene was performed. Murine β-actin copy numbers were used for normalization to exclude dissent cell harvest efficiencies. The qPCR reaction contained 10 µl Kapa SYBRE FAST qPCR master mix, 0.4 µl of each primer (10 µM)
(for murine β-actin:
fw: caaggagtgcaagaacacag (SEQ ID NO.: 35);
rev: gccttggagtgtgtattgag (SEQ ID NO.: 36);
for Ad5 E4:
fw: tagacgatccctactgtacg (SEQ ID NO.: 37);
rev: ccggacgtagtcatatttcc (SEQ ID NO.: 38);
all primer sequences indicated in 5'→3' direction)
and 2 µl isolated total DNA in a final volume of 20 µl.

PCR cycles were performed as follows: 1 cycle 95° C. for 10 min (initial denaturation); 40 cycles 95° C. for 30 s (denaturation), 60° C. for 30 s (annealing), 72° C. for 20 s (elongation); 1 cycle 95° C. for 1 min (denaturation), 55° C. for 30 s (annealing); 1 cycle 95° C. 30 s (final denaturation).

IqM-Mediated Neutralization

A549 cells were seeded in 200 µl serum-containing minimum essential medium (Gibco) in 96-well plates. The next day, indicated viral vector particles were incubated for 10 min at 37° C. with PBS or plasma samples in a ratio of 2E6 VP/µl. Ad-naïve human and murine plasma samples were prepared from whole blood by centrifugation at 800×g for 10 min. To preserve complement activity, blood samples were anti-coagulated with 100 µg/ml hirudin (Celgene). Cells were washed and transduced with pre-incubated viral vectors with a pMOI of 1000 in 100 µl serum-free medium and incubated for 3 h at 37° C. Subsequently, cells were washed and supplemented with 200 µl serum-containing medium. After 24 h incubation at 37° C., cells were detached and the eGFP expression analyzed by flow cytometry.

Transduction of MSCs with HAdV5-TSG6 and Coagulation Factor X (FX) as TransDuction Enhancer 2-3×10$^5$ MSCs were seeded on a 6 cm dish in 6 ml PL containing alpha-Minimum Essential Medium (Lonza) and cultured overnight at 37° C. Next day, FX (2 µg/ml) was pre-incubated in alpha-Minimum Essential Medium with corresponding amount of TSG-6-expressing vector particles HAdV5-TSG6 in a final volume of 290 µl for 20-30 min at 37° C. During pre-incubation of FX with vector particles, cells were washed, 2.7 ml alpha-Minimum Essential Medium without any supplement was provided per 6 cm dish. Finally, the pre-incubated vector particle solution was added to cells for an incubation for 3 h at 37° C. followed by three times washing with alpha-Minimum Essential Medium. The cells were cultured for further 72 h in PL containing alpha-Minimum Essential Medium at 37° C. Cell culture supernatant was harvested and the concentration of TSG-6 in cell culture supernatants was analyzed by a sandwich TSG-6 ELISA.

To this end, a 96-well MaxiSorb Nunc plate was incubated overnight at 4° C. with 100 µl/well of coating solution (1 µg/ml TSG-6 monoclonal mouse IgG Santa Cruz SC-65886 in 0.1 M sodium carbonate/bicarbonate buffer pH 9.6). Next day, plate was washed with an ELISA plate washer "Well Wash Versa" three times with 300 µl/well of 0.05% Tween-PBS followed by an incubation for 1 h with 300 µl/well SuperBlock (Thermo Fisher) on a shaker at room temperature. After another round of washing, 100 µl/well of sample in corresponding dilutions or TSG-6 protein standard (R&D 2104-TS-050) was added to wells and incubated for 1 h at room temperature on a shaker. Again, plate was washed and 100 µl/well of detection solution (0.25 µg/ml anti-TSG-6 goat polyclonal IgG R&D BAF2104 in PBS) was incubated for 1 h at room temperature on a shaker. Before adding 100 µl/well of streptavidin-horseradish peroxidase conjugate (Dako P0397 c=0.020 µg/ml) followed by an incubation for 1 h at room temperature on a shaker, plate was washed again. Finally, after another washing step 100 µl/well of detection substrate (1-StepUltra TMB ELISA Substrate Thermo Fisher 34028) was given per well to start the enzymatic reaction in dark. After 15 min reaction was stopped by addition of 100 µl/well sulfuric acid (2 M) followed by a measurement at 450 nm in an ELISA reader.

Transduction of Tumor Cell Lines with HAdV5 and HAdV5-Mut3 and with HAdV5-ΔCAR-Mut3 and HAdV5-ΔCAR Different tumor cell lines (UM-SCC-11B, MiaPaCa, Huh7, HepG2, A549) were seeded in 200 µl of the respective medium in 96-well plates. The next day, cells were washed and transduced with a pMOI of 300 or 1000 by either HAdV5 or HAdV5-Mut3 in 100 µL serum-free medium. After incubation at 37° C. for 2 hours, cells were washed and 200 µL of serious medium was added. 24 hours post transduction, cells were harvested and the eGFP expression was analyzed by flow cytometry.

The same procedure was applied for transduction of the different tumor cell lines with HAdV5-ΔCAR-Mut3 and HAdV5-ΔCAR with a pMOI of 1000.

Transduction of MSCs by HAdV5 or HAdV5-Mut3, with or without Enhancing Molecules MSCs were seeded in 1 mL PL-containing BioWhittaker® Alpha minimum essential medium (Lonza) in 24-well plates. The next day, the indicated viral vector particles were pre-incubated with or without enhancing molecules for 30 minutes at 37° C. in a total volume of 300 µL in PL-free medium. As enhancing molecules, Factor X (250-2000 ng/mL), Spermidine (1-625 ng/µL), Spermine (1-1000 ng/µL), Polybrene (0.08-81 µg/µL), Poly-L-Lysine (1-25% v/v) and Lactoferrin (1-1000 µg/mL) were used. Subsequently, MSCs were washed and 500 µL PL-free medium was provided. Cells were transduced by adding 300 µL of the pre-incubated viral particles (resulting in the indicated pMOI) and incubated for 2 hours at 37° C. Afterwards, cells were washed, and 1 mL of PL-containing medium was added. 72 hours after transduction, MSCs were detached and eGFP expression was analyzed by flow cytometry.

Amount of Enhancers Used for Pre-Incubation of HAdV5:

| Enhancing molecule | Amount |
| --- | --- |
| Factor X | 4 fg/viral particle |
| Spermidine | 500 fg/viral particle |

-continued

| Enhancing molecule | Amount |
|---|---|
| Spermine | 1250 fg/viral particle |
| Polybrene | 18 fg/viral particle |
| Poly-L-Lysine | 4% v/v |
| Lactoferrin | 1250 fg/viral particle |

Adenoviral Replication in MSCs after Infection by HAdV5 wt or HAdV5-Mut3 wt, with or without Enhancing Molecules MSCs were seeded in 1 mL PL-containing BioWhittaker® Alpha minimum essential medium (Lonza) in 24-well plates. The next day, the indicated viral vector particles were pre-incubated with or without enhancing molecules for 30 minutes at 37° C. in a total volume of 300 µL in PL-free medium. As enhancing molecules, Factor X (4 fg/viral particle), Spermidine (500 fg/viral particle), Polybrene (18 fg/viral particle) were used in combination with HAdV5 wt. HAdV5-Mut3 wt was used without enhancer. Subsequently, MSCs were washed and 500 µL PL-free medium was provided. Cells were infected by adding 300 µL of the pre-incubated viral particles (resulting in a pMOI of 300 or 1000) and incubated for 2 hours at 37° C. Afterwards, cells were washed, and 1 mL of PL-containing medium was added. 24, 48, 72 and 96 hours post infection, cells and supernatant was harvested and lysed. MSC lysates were used to re-infect A549, previously seeded into 24-well plates 24 hours earlier. 4 hours post re-infection, A549 DNA was isolated using the GenElute™ Mammalian Genomic DNA Miniprep Kit (Sigma-Aldrich). The obtained A549 DNA samples were used to quantify the infectious adenovirus produced by MSCs using real-time quantitative PCR (qPCR). For qPCR analysis, a part of the adenoviral E4 transcription unit was amplified (forward primer: TAGACGATCCCTACTGTACG (SEQ ID

NO. 37)

reverse primer: GGAAATATGACTACGTCCGG (SEQ ID

NO.: 39);

all primer sequences indicated in 5' → 3' direction).

For normalization β-actin was analyzed, too (forward primer: GCTCCTCCTGAGCGCAAG (SEQ ID

NO.: 40);

reverse primer: CATCTGCTGGAAGGTGGACA (SEQ ID

NO.: 41)

all primer sequences indicated in 5' > 3' direction).

The Kapa SYBR FAST qPCR Universal Master Mix (PEQLAB Biotechnologie) was used according to the manufacturer's protocol.

MSC Migration Assays of not-Transduced and Transduced MSCs

To assess MSC migration (not-transduced or transduced with HAdV5 or HAdV5-Mut3), boyden chamber assays were performed. To do so, MSCs were seeded in 3 mL PL-containing BioWhittaker® Alpha minimum essential medium (Lonza) in 6-well plates. The next day, the indicated viral vector particles were pre-incubated with or without enhancing molecules for 30 minutes at 37° C. in a total volume of 300 µL in PL-free medium. As enhancing molecules, Factor X, Spermidine, Spermine, Polybrene, Poly-L-Lysine and Lactoferrin were used. Subsequently, MSCs were washed and 3000 µL PL-free medium was provided. Cells were transduced by adding 300 µL of the pre-incubated viral particles (resulting in the indicated pMOI) and incubated for 2 hours at 37° C. Afterwards, cells were washed, and 1 mL of PL-containing medium was added. 4 hours after transduction, MSCs were detached and seeded into transwell inserts (8 µM pore size, $1 \times 10^4$ cells per transwell). The transwells were placed on 24-well plates in which $1 \times 10^5$ UM-SCC-11B cells were seeded the day before. As a control, migration of MSCs towards UM-SCC-11B cultivation medium (DMEM with 3% FBS) was analyzed. 18 hours after seeding MSCs into the transwells, the transwells were washed with PBS and cells were fixed using ice-cold methanol. Subsequently, MSCs were stained with 10 µg/mL 4',6-Diamidin-2-phenylindol (DAPI) and 1% Triton-X diluted in PBS. Migrated cells were quantified by counting DAP I-stained nuclei.

Transduction of MSCs by HAdV5, HAdV5-Mut3, HAdV5-ΔCAR-Mut3, HAdV5-ΔHVR1 or HAdV5-Mut2

Transduction of MSCs with a pMOI of 1000 was performed as described in section "Transduction of MSCs by HAdV5 or HAdV5-Mut3, with or without enhancing molecules", except that MSCs were detached and eGFP expression was analyzed by flow cytometry 24 hours after transduction. No enhancing molecules were used.

Statistical Analysis

Results are given as mean±standard deviation. Statistical analysis was performed using unpaired two-sample (Welch) student's t-test or Wilcox test. Calculations were done with RStudio-software Version 2.15.0 or GraphPad Prism Version 6.07. P-values 0.05 were considered statistically significant.

Results

Production and Characterization of Mutant Vectors

FIG. 1 shows an alignment of the amino acid sequences of HVR1 of HAdV5 wildtype and HAdV5-Mut3 hexon proteins (FIG. 1A) and of HVR1, HVR5 and HVR7 of HAdV5 wildtype, HAdV5-ΔHVR1, HAdV5-Mut2, HAdV5-Mut3, HAdV5-Mut4, HAdV5-Mut5, HAdV5-Mut6 hexon proteins (FIG. 1B). Negatively charged amino acids are depicted in bold letters. Inserted lysine residues are depicted in italic letters.

Of note, production of the mutant vectors HAdV5-Mut4, HAdV5-Mut5, HAdV5-Mut6 was unfeasible, since there was no virus rescue after transfection of cleaved bacmid DNA in N52.E6 cells, indicating that this vector is not viable.

FIG. 14 shows an alignment of the amino acid sequences of HVR1 of HAdV5 wildtype and HAdV5-Mut7, HAdV5-Mut8 and HAdV5-Mut9 hexon proteins. Inserted lysine residues are depicted in bold letters. Further inserted amino acids are depicted in italic letters.

Production of the mutant vectors HAdV5-Mut7, HAdV5-Mut8, HAdV5-Mut9 was unfeasible, since there was no virus rescue after transfection of cleaved bacmid DNA in N52.E6 cells, indicating that this vector is not viable and that no functional virus particles can be formed, respectively.

FIG. 2 shows an alignment of the nucleotide sequences encoding hypervariable region 1 of HAdV5 wildtype and HAdV5-Mut3 hexon proteins. Nucleotides encoding for the inserted lysine residues are depicted in capital letters.

The integrity of viral proteins was confirmed by silver staining (FIG. 3). As a control, unmodified vector particles (HAdV5) were used and revealed a molecular weight of 108 kDa for the hexon protein. Silver staining verified the deletion of the negative loop of HVR1 in HAdV5-ΔHVR1 as well as the mutation of the HVR1 region in HAdV5-Mut3. Both of which alterations resulted in a respective, visible reduction of the molecular weight of the hexon protein. In contrast, the hexon protein with inserted lysines instead of aspartic acids (HAdV5-Mut2) showed the same molecular weight like unmodified hexon protein as it was expected.

Figure 4:
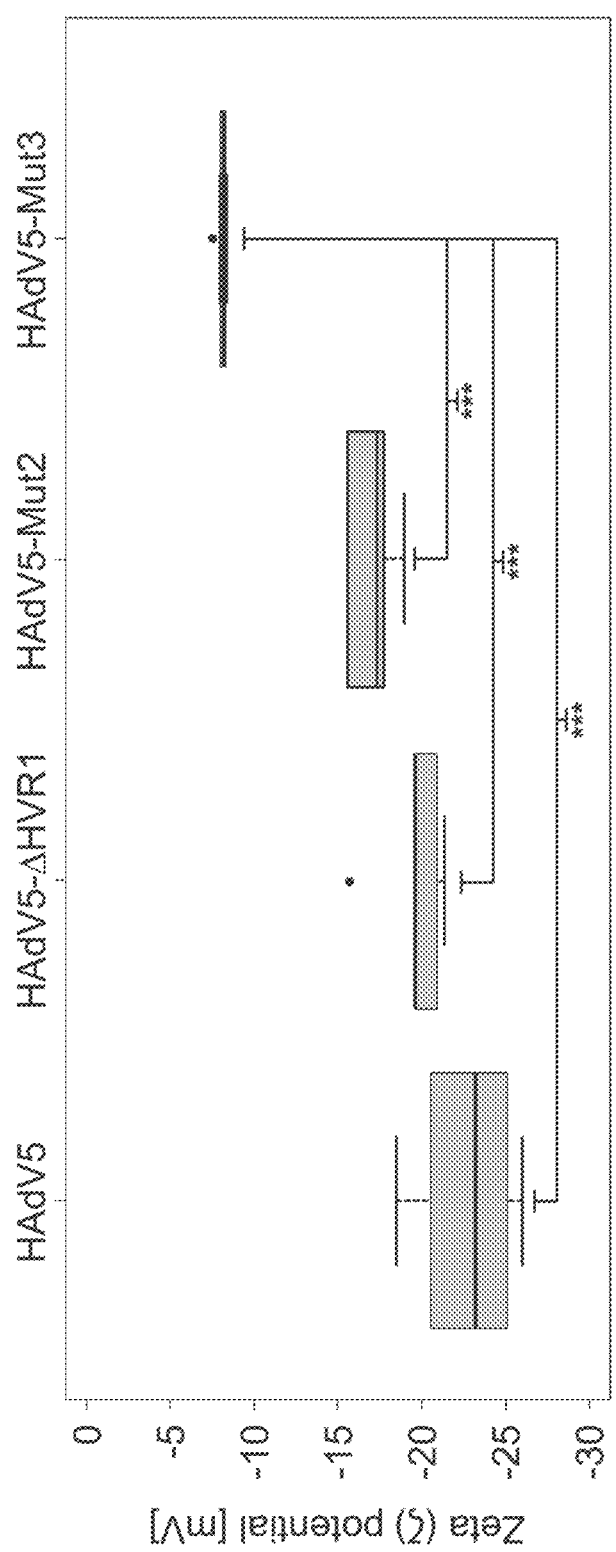
FIG. 4 shows that the surface charge of HAdV5-Mut3 is significantly higher than for HAdV5 wildtype (HAdV5), HAdV5-Mut2 and HAdV5-ΔHVR1. $2 \times 10^{11}$ virus particles of HAdV5, HAdV5-Mut2, HAdV5-Mut3 and HAdV5-ΔHVR1 were dialyzed overnight, purified with PD MiniTrap G-25 column and measured at ZetaSizer Nano-ZS. Results are given as mean±standard deviation (n=5-6). *** p≤0.0005.

Zeta potential measurements for determining the surface charge of the vector particles clearly revealed a negative surface charge of −22.8 mV for the control vector HAdV5, which is in accordance with the literature (FIG. 4). Interestingly, the deletion of the negatively charged HVR1 loop (HAdV5-ΔHVR1) resulted only in a not statistically significant, slight reduction of the negative surface charge of particles (−19.4 mV). The replacement of aspartic acids by lysines in case of HAdV5-Mut2 further reduced the negative surface charge (−17.33 mV). However and interestingly, HAdV5-Mut3 showed a statistically significant reduction of the negative surface charge in comparison to HAdV5, HAdV5-ΔHVR1, and HAdV5-Mut2 (−8.1 mV; compared to HAdV5: $p<4.303\times10^{-5}$; compared to HAdV5-ΔHVR1: $p<2.738\times10^{-4}$; compared to HAdV5-Mut2: $p<1.139\times10^{-7}$).

HAdV5-Mut3 Shows Significantly Less FX-Mediated Transduction of CAR-Negative SKOV-3 Cells than HAdV5 Wildtype (HAdV5), HAdV5-Mut2 and HAdV5-ΔHVR1

Binding of human blood coagulation factor X (FX) to HAdV5 mediates transduction of hepatocytes and therefore, triggers the sequestration of particles. The relevant binding residues for FX are located within HVR5 and HVR7 of hexon protein (Alba et al., 2009). To exclude CAR-mediated cell transduction, the inventors used CAR-negative SKOV-3 cells (FIG. 5) and analyzed if FX enhances cell transduction of mutant vectors. HAdV5-ΔFX vector particles are known to exhibit significantly reduced FX binding due to a point mutation within HVR7 (Krutzke et al., 2016) and were used as a control. FX-mediated cell transduction by HAdV5-ΔFX was significantly reduced compared to that of HAdV5 in the presence of FX ($p<3.686\times10^{-5}$). Surprisingly, similar effects were observed with HAdV5-Mut3, which showed statistical significantly reduced cell transduction in the presence of FX compared to HAdV5 ($p<1.135\times10^{-5}$). Interestingly, FX-mediated transduction efficiency of HAdV5-ΔHVR1 was not significantly reduced compared to HAdV5. The introduction of lysine residues instead of aspartic acid residues in HVR1 (HAdV5-Mut2) showed no reduction of FX-mediated uptake. Taken together, the results indicate that HAdV5-ΔHVR1 and HAdV5-Mut2 showed no reduced FX binding, while HAdV5-Mut3 showed significantly reduced FX binding that was comparable to that of HAdV5-ΔFX.

The Uptake of HAdV5-Mut3 by Scavenger Receptors is Significantly Reduced ComPared to HAdV5 Wildtype (HAdV5)

Figure 6:
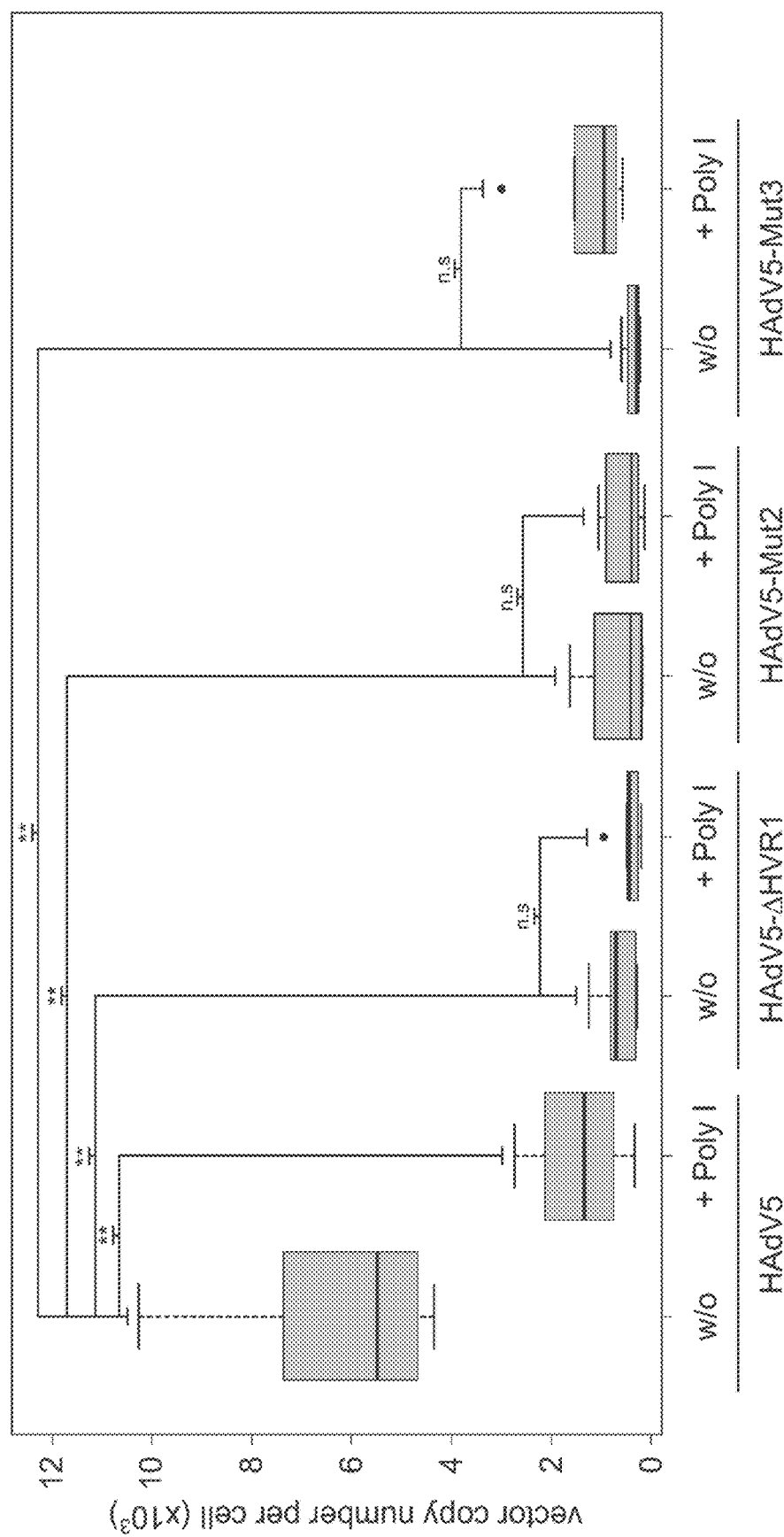
FIG. 6 shows that the uptake of HAdV5-Mut3 by scavenger receptors is significantly reduced compared to HAdV5 wildtype (HAdV5). $1 \times 10^5$ J774.A1 cells were treated with polyinosinic acid (Poly-(I)) (30 μg/ml) for 1 h if indicated, followed by infection with $2 \times 10^8$ virus particles (pMOI 2000), incubated for another 21 h, harvested followed by DNA isolation and qPCR analysis. Results are given as mean±standard deviation (n=6). ** p≤0.005.

The major sink of systemically administered HAdV5 are liver-residential macrophages called Kupffer cells (Alemany et al., 2000; Khare et al., 2012). These cells are known to possess scavenger receptors on their cell surface, which bind and capture negatively charged molecules. HAdV5 exhibits an overall negative surface charge that is mainly attributed to a stretch of negatively charged amino acids within HVR1 (Khare et al., 2012). To reduce the negative surface charge of particles, the inventors either deleted the negatively charged HVR1 loop (HAdV5-ΔHVR1), inserted lysine instead of aspartic acid in the stretch (HAdV5-Mut2) or replaced the entire stretch by four lysine residues (HAdV5-Mut3) (FIG. 4). Results clearly showed that the uptake of all three mutant vectors HAdV5-ΔHVR1, HAdV5-Mut2 and HAdV5-Mut3 by murine macrophages was significantly reduced compared to control vector HAdV5 (HAdV5-ΔHVR1 $p<0.001462$; HAdV5-Mut2 $p<0.001219$; HAdV5-Mut3 $p<0.001241$) (FIG. 6). This effect was even more pronounced with HAdV5-Mut3. The uptake of HAdV5 particles by macrophages was significantly inhibited in the presence of polyinosinic acid (Poly-(I)). Poly-(I) binds to and saturates scavenger receptors, thus confirmed a scavenger receptor-mediated virus uptake mechanism. Pre-incubation of cells with Poly-(I) had no effect on the uptake of HAdV5-ΔHVR1 and HAdV5-Mut2 by macrophages. Interestingly, pre-incubation of cells with Poly-(I) increased the uptake of HAdV5-Mut3 particles by macrophages.

Figure 5:
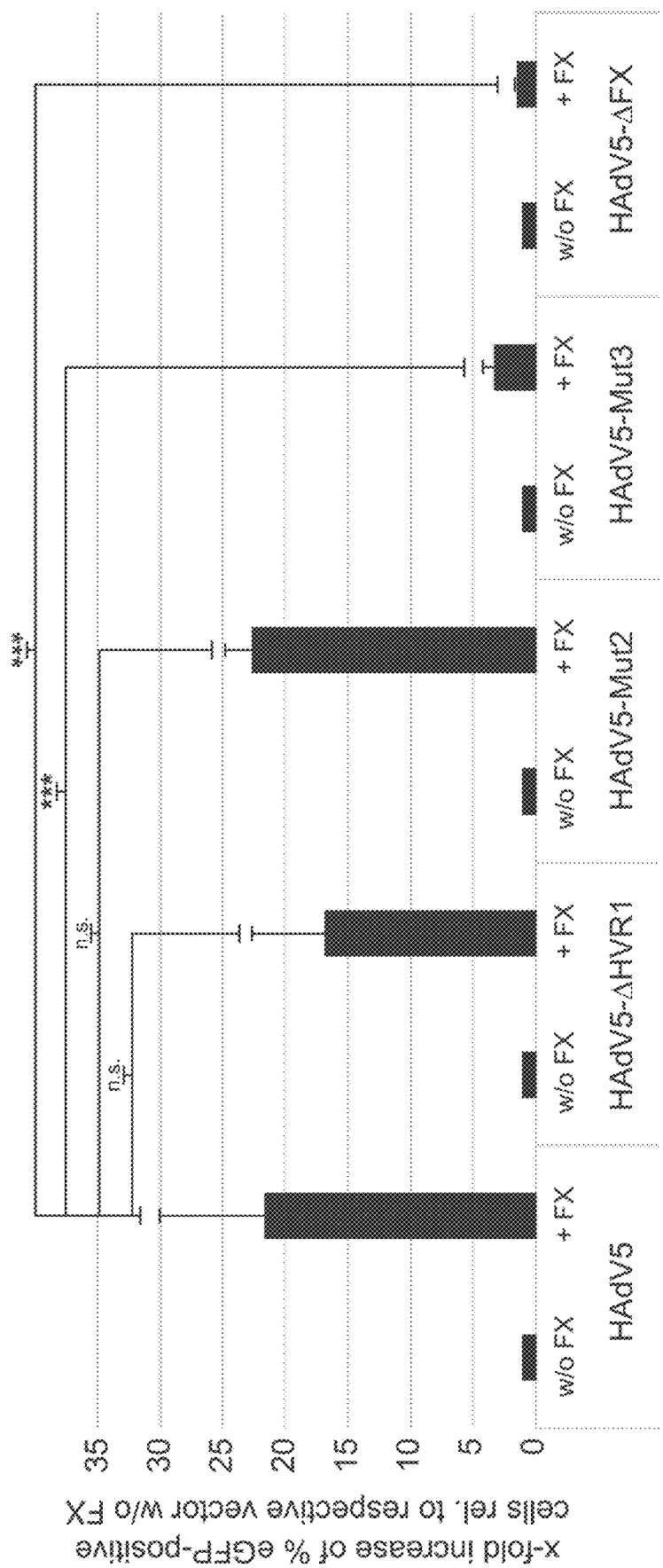
FIG. 5 shows that HAdV5-Mut3 shows significantly less Factor X (FX)-mediated transduction of CAR-negative cells than HAdV5 wildtype (HAdV5), HAdV5-Mut2 and HAdV5-ΔHVR1. $2 \times 10^4$ SKOV-3 cells were treated with FX (+FX) (8 μg/ml) or without FX (w/o FX) and infected with $2 \times 10^7$ virus particles (pMOI 1000), incubated for 72 h and analyzed for eGFP expression by flow cytometry. Results are given as mean±standard deviation (n=14-15). *** p≤0.0005.
Figure 7:
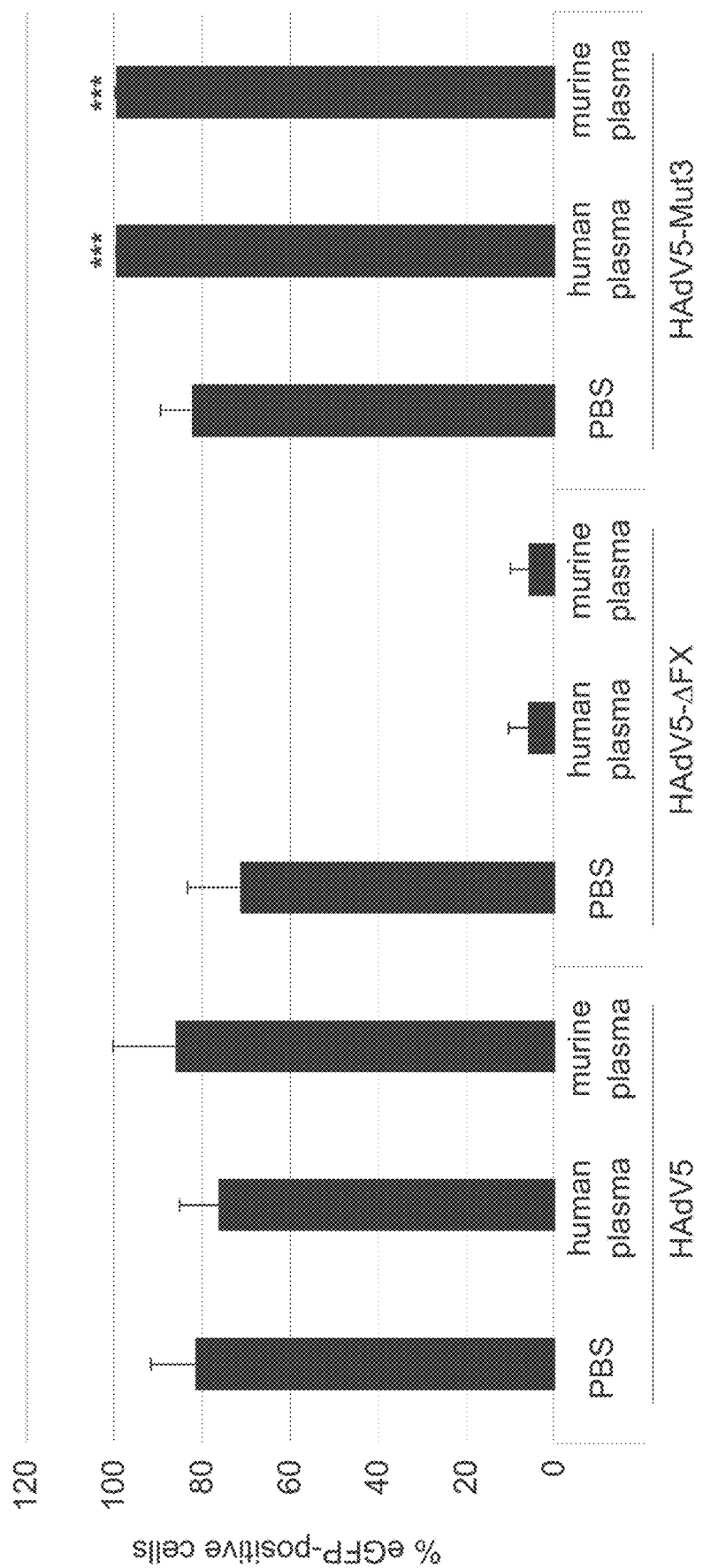
FIG. 7 shows that FX binding-ablated HAdV5-Mut3 vector particles escape from neutralization by natural IgMs. HAdV5 wildtype (HAdV5), HAdV5-ΔFX or HAdV5-Mut3 were incubated with PBS or Ad-naïve, hirudinized human or murine plasma samples of different donors or mouse strains for 10 min at 37° C. in a ratio of 2E6 VP/μl. Subsequently, A549 cells were transduced with a pMOI of 1,000. The eGFP expression by the cells was analyzed 24 h post transduction by flow cytometry. Results are given as mean±standard deviation (n=7-12). *** p≤0.0005.

FX Binding-Ablated HAdV5-Mut3 Vector Particles Escape from Neutralization by Natural IgMs Others and the inventors have shown that FX shields adenovirus type 5 vector particles from neutralization by natural IgM antibodies (Krutzke et al., 2016). Since the inventors showed that HAdV5-Mut3 shows significantly decreased FX binding (FIG. 5), they analyzed if these particles become susceptible for the neutralization by human and murine IgMs. Therefore, the inventors incubated vector particles with verifiably Ad-naïve human and murine plasma samples of different donors and mouse strains and subsequently analyzed A549 cell transduction (FIG. 7). Control HAdV5 vector particles, which bind FX normally (FIG. 5), transduced A549 cells in presence of human or murine plasma with the same efficiency as when incubated in PBS. In contrast, pre-incubation of HAdV5-ΔFX particles, which show reduced FX binding (FIG. 5), were almost completely neutralized by natural IgMs upon incubation with both human and murine plasma. However and interestingly, the inventors did not observe this effect when HAdV5-Mut3 was incubated with human or murine plasma samples ($p<5\times10^{-11}$ compared to respective pre-incubations of HAdV5-ΔFX), even though these particles show a reduced FX binding comparable to that of HAdV5-ΔFX (FIG. 5). Thus, the inventors show that the introduced Mut3 mutation allows vector particles devoid of FX-shielding to escape from natural IgMs.

Figure 8:
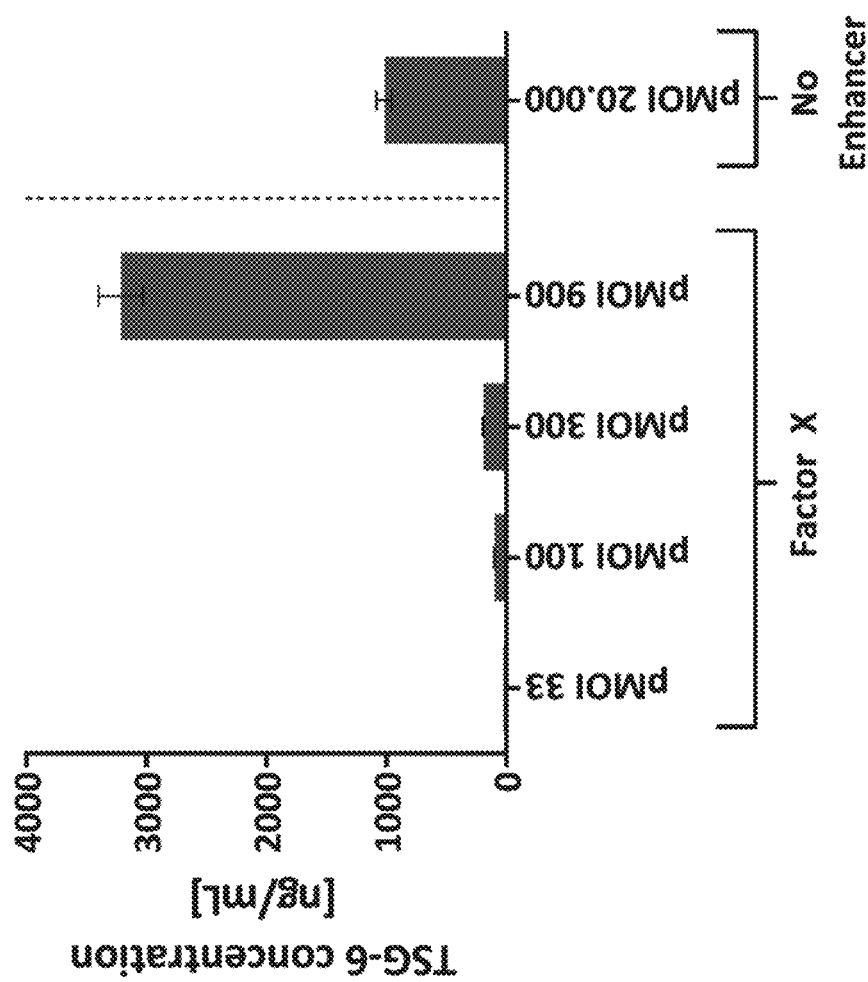
FIG. 8 shows a significantly enhanced secretion of HAdV5-encoded therapeutic protein TSG-6 by MSCs in the presence of Factor X. MSCs were transduced with different pMOIs of the TSG-6-expressing adenoviral vector HAdV5-TSG6 in the absence or presence of Factor X. 72 h post transduction, the TSG-6 concentration in cell culture supernatants was quantified by ELISA (n=1).

Significantly Enhanced Secretion of HAdV5-Encoded Therapeutic Protein TSG-6 by MSCs Transduced with HAdV5-TSG6 in the Presence of Factor X as Transduction Enhancer It was found that the expression and subsequent secretion of TSG-6, as a representative therapeutic protein, by MSCs was significantly enhanced in the presence of Factor X (FX) (FIG. 8). TSG-6 concentrations in supernatants of cells transduced with pMOI 900 in the presence of FX were about 3-fold higher compared to TSG-6 concentrations in supernatants of cells transduced with pMOI 20,000 in the absence of FX.

Transduction of Several Tumor Cell Lines is Improved or Preserved when Using HAdV5-Mut3 Compared to HAdV5 Wildtype (HAdV5)

Figure 9:
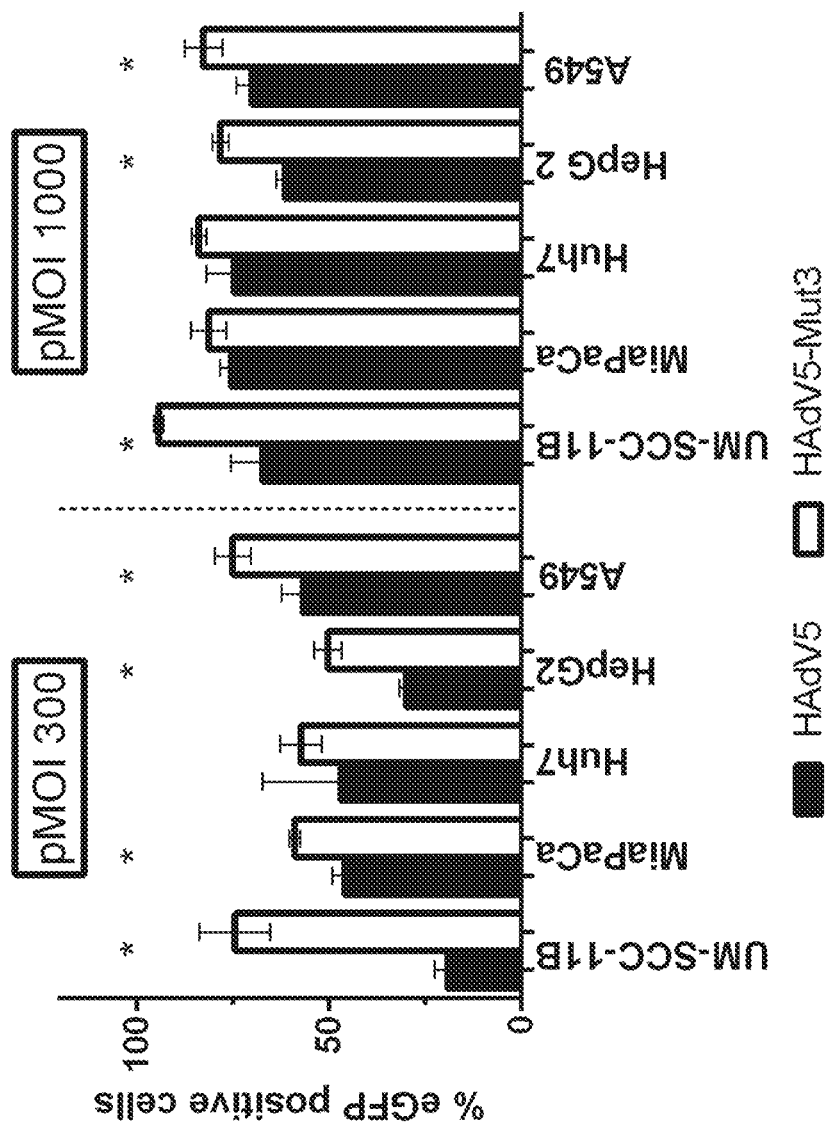
FIG. 9 shows that the transduction of several tumor cell lines is improved or preserved when using HAdV5-Mut3 compared to HAdV5 wildtype (HAdV5). HAdV5-Mut3 and HAdV5 were used to transduce UM-SCC-11B, MiaPaCa, Huh7, HepG2 and A549 cells with a pMOI of 300 and 1000. 24 hours post transduction, the percentage of eGFP positive cells was determined by flow cytometry. Results are given as mean±standard deviation (n=3). * p≤0.05.

It was found that the transduction efficiencies of several tumor cell lines are either improved or preserved when comparing HAdV5-Mut3 to HAdV5, suggesting benefits for utilization of HAdV5-Mut3 as an oncolytic virus (FIG. 9). For example, the proportion of eGFP positive UM-SCC-11B cells can be increased from about 20% to about 75% when HAdV5-Mut3 is used compared to HAdV5 (pMOI 300).

Significantly Enhanced Transduction of MSCs by Pre-Incubation of HAdV5 Wildtype (HAdV5) with Enhancers or by Utilization of HAdV5-Mut3

Figure 10:
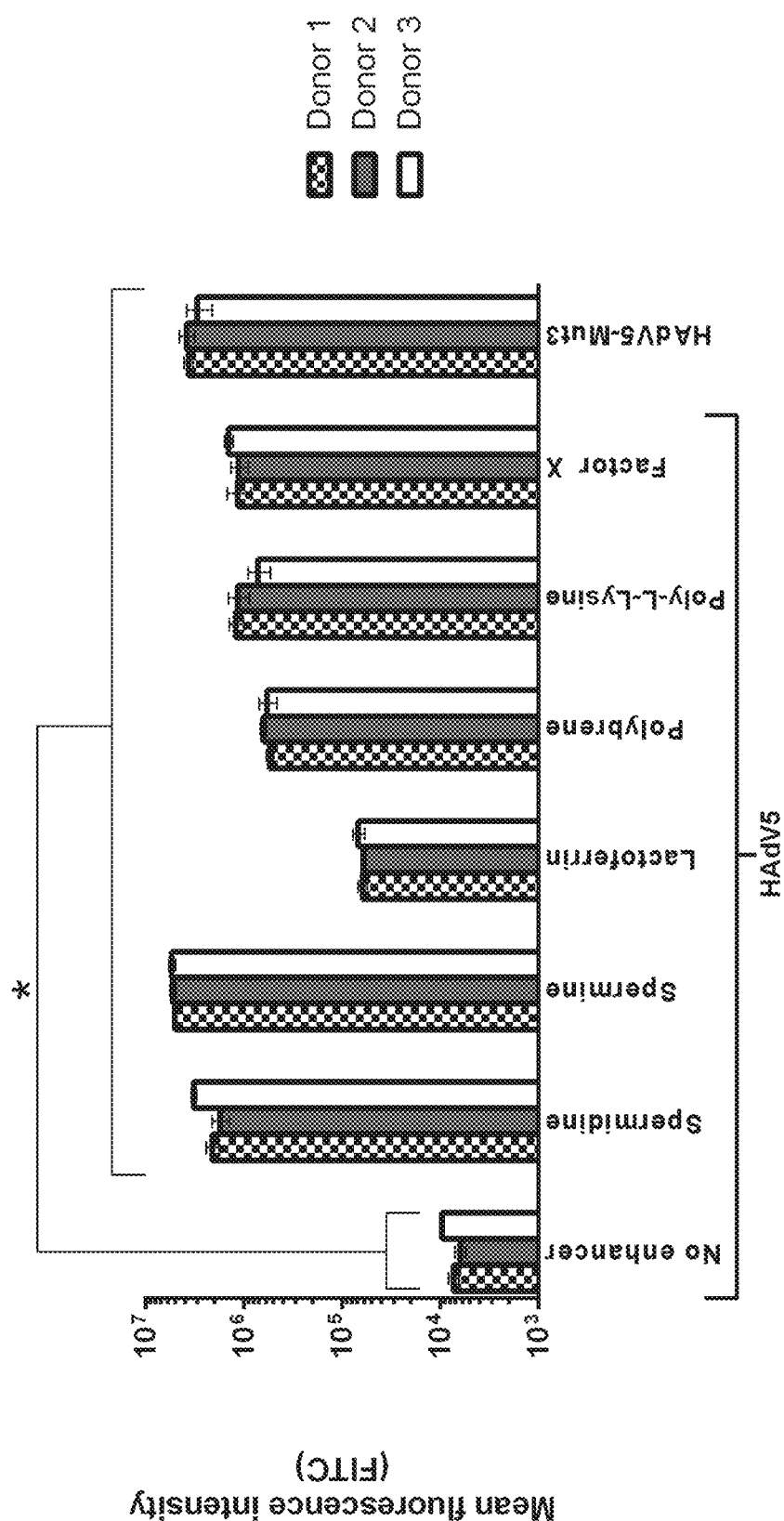
FIG. 10 shows a significantly enhanced transduction of MSCs by pre-incubation of HAdV5 wildtype (HAdV5) with enhancers or by utilization of HAdV5-Mut3. MSCs were transduced by HAdV5 (either pre-incubated with the respective enhancer or not) or HAdV5-Mut3 with a pMOI of 1000. 72 hours post transduction, eGFP expression was analyzed by flow cytometry. Results are given as mean±standard deviation (n=3). * p≤0.05.
Figure 11:
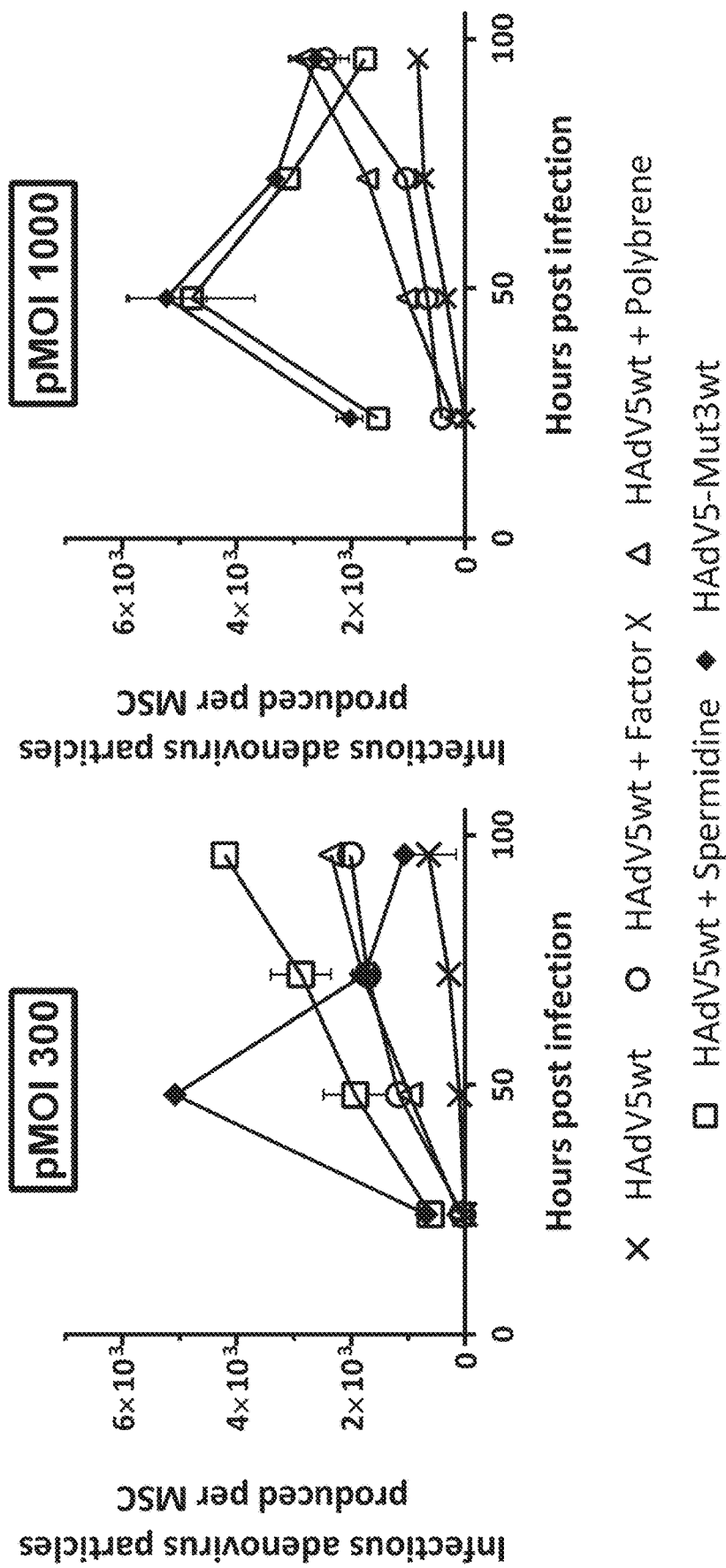
FIG. 11 shows an improved adenoviral replication in MSCs by using enhancer pre-incubated HAdV5 wt or by using HAdV5-Mut3 wt. MSCs were infected by HAdV5 wt (either pre-incubated with the respective enhancer or not) or HAdV5-Mut3 wt with a pMOI of 300 and 1000. 24, 48, 72 and 97 hours post infection, infectious adenoviral particles produced by MSCs were quantified. Results are given as mean±standard deviation of biological duplicates (n=1).

It was found that although nearly no eGFP expression is detected when MSCs are transduced by solely HAdV5, all enhancing molecules (enhancers) as well as the mutant HAdV5-Mut3 viral vector improved the mean fluorescence intensities (MFI) statistically significantly up to over 800-fold (FIG. 10). Strikingly, transduction by HAdV5-Mut3 results in high eGFP expression (over 600-fold increased MFI compared to HAdV5 transduction) without the use of enhancing molecules.

Figure 12:
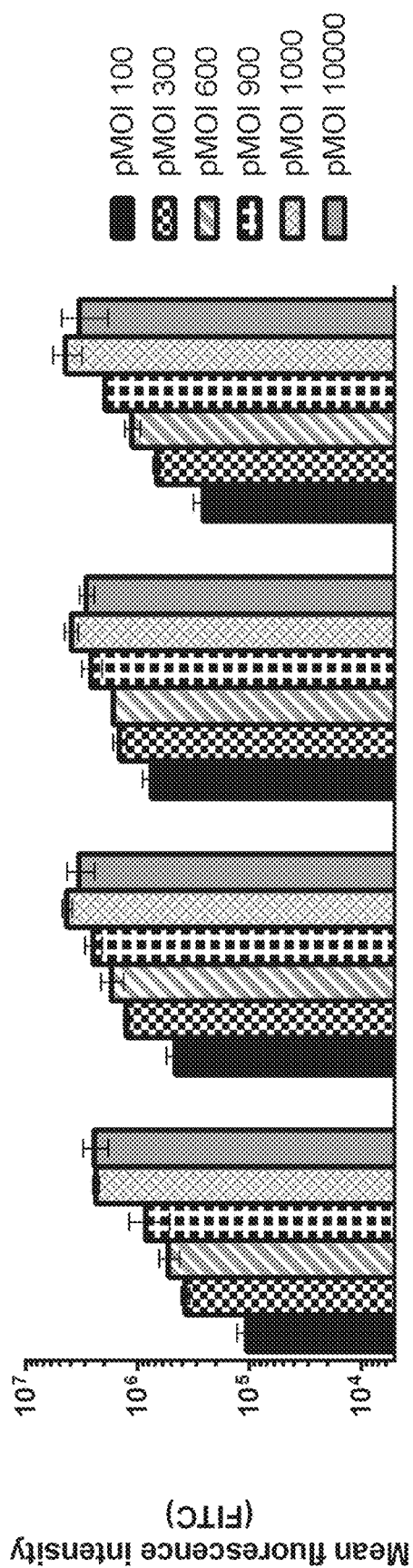
FIG. 12 shows that a combination of HAdV5-Mut3 with enhancers results in an enhanced eGFP expression. MSCs were transduced by HAdV5-Mut3 (either pre-incubated with the respective enhancer or not) with a pMOI of 100, 300, 600, 900, 1000 or 10,000. The eGFP expression was analyzed 72 hours post transduction by flow cytometry. Results are given as mean value of two donors (biological triplicates each)±standard deviation (n=2).

Combination of HAdV5-Mut3 with the enhancing molecules Spermidine (500 fg/viral particle), Spermine (1250 fg/viral particle) and Factor X (4 fg/viral particle) was also investigated (FIG. 12). It was found that the enhancing molecules slightly further enhanced transduction of cells by HAdV5-Mut3 (3-fold).

Improved Adenoviral Replication in MSCs by Using Enhancer-Pre-Incubated HAdV5 wt or by Using HAdV5-Mut3 wt It was found that enhancing molecules as well as HAdV5-Mut3 wt improve adenoviral replication compared to infection with HAdV5 wt alone. Strikingly, HAdV5-Mut3 wt shows a maximum of about $5\times10^3$ infectious particles/MSC after 48 hours, independent of the used pMOI. Only combination of Spermidine with a pMOI of 1000 of HAdV5 wt results in a similarly high virus yield (~$4.7\times10^3$ viral particles/MSC). All other combinations of HAdV5 wt with enhancers results in accumulation of infectious adenoviral particle over time (probably caused by constant reinfection of initially un-infected MSCs) without a detectable peak.

Transduction of MSCs does not Inhibit their Migration Towards UM-SCC-11B Cells

Figure 13:
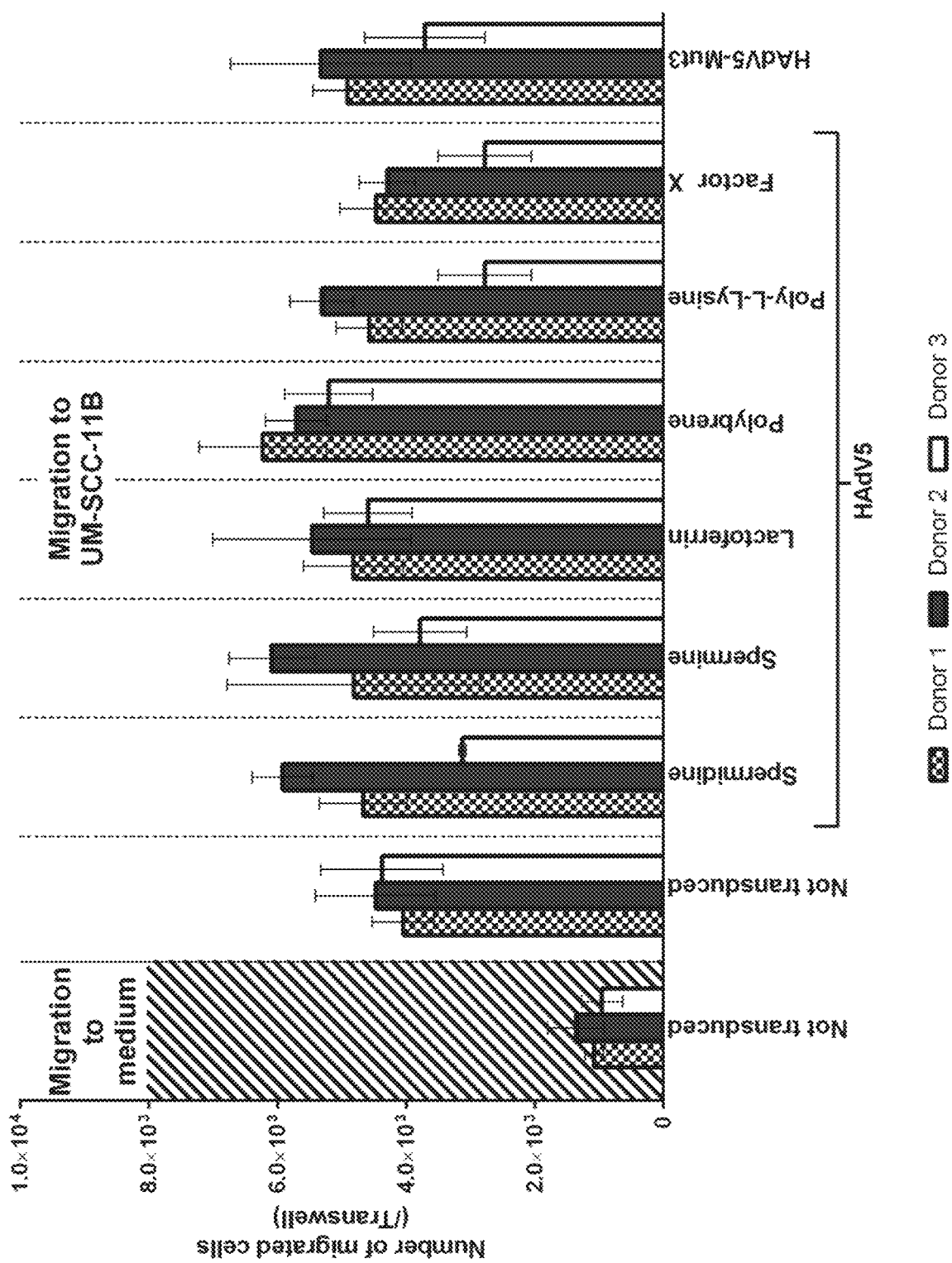
FIG. 13 shows that transduction of MSCs does not inhibit their migration towards UM-SCC-11B cells. Migration of MSCs, not-transduced or transduced using HAdV5 wildtype (HAdV5) in combination with enhancing molecules or using HAdV5-Mut3, was analyzed in a Boyden-Chamber-Assay. 18 hours after starting the migration assay, cells were fixed and stained with DAPI. Migrated cells were quantified by counting DAPI-stained nuclei. Results are given as mean±standard deviation.

It was found that MSCs show a significantly increased migration towards UM-SCC-11B cells compared to the sole cultivation medium (FIG. 13). Strikingly, migration towards UM-SCC-11B cells was not inhibited by transduction of cells with HAdV5 or HAdV5-Mut3. None of the tested enhancing molecules showed negative effects.

Transduction of Several Tumor Cell Lines is Improved or Preserved when Using HAdV5-Mut3 (HAdV-5-M3) Compared to HAdV5 Wildtype (HAdV-5) and is Improved when Using HAdV5-ΔCAR-Mut3 (HAdV-5-ΔCAR-M3) Compared to HAdV5-ΔCAR (HAdV-5-ΔCAR)

Figure 15:
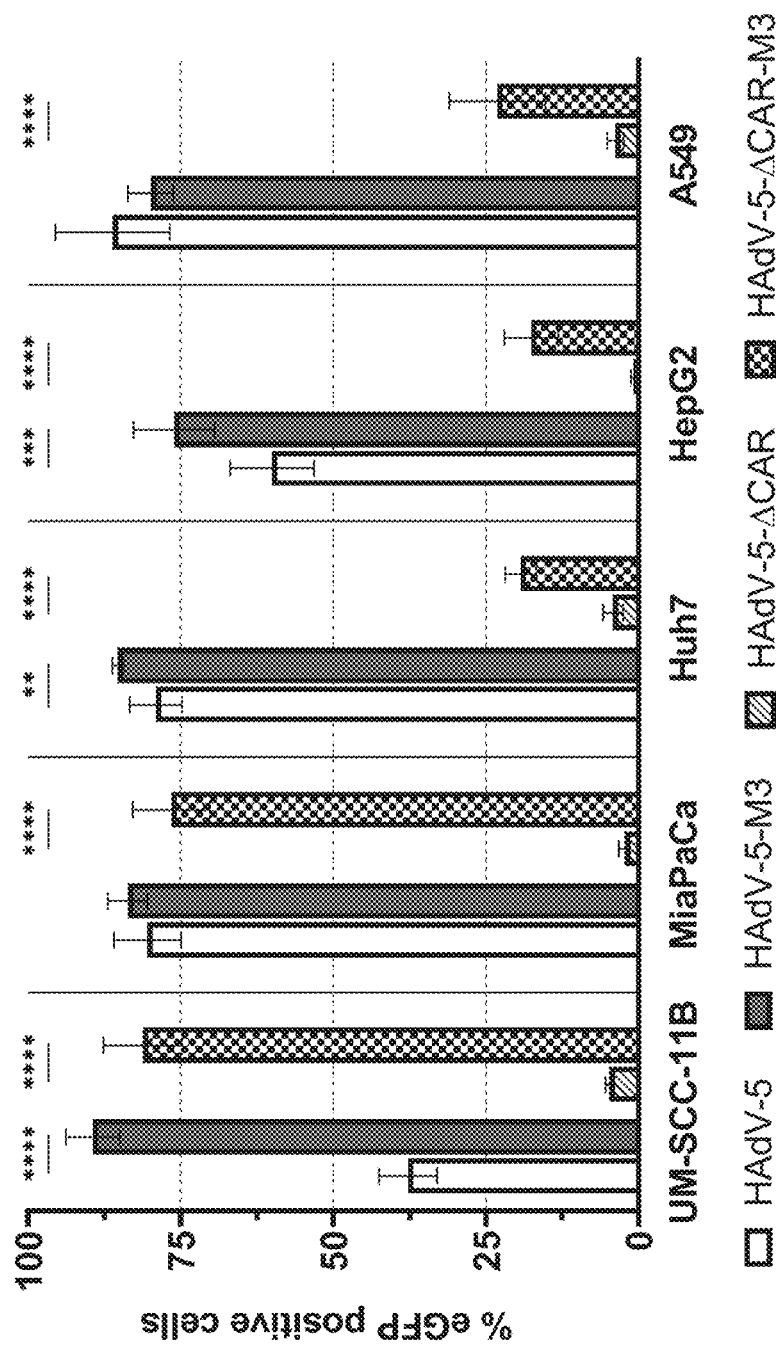
FIG. 15 shows that the transduction of several tumor cell lines is improved or preserved when using HAdV5-Mut3 (HAdV-5-M3) compared to HAdV5 wildtype (HAdV-5) and that the transduction of several tumor cell lines is improved when using HAdV5-ΔCAR-Mut3 (HAdV-5-ΔCAR-M3) compared to HAdV5-ΔCAR (HAdV-5-ΔCAR). The specified adenoviral vectors were used to transduce UM-SCC-11B, MiaPaCa, Huh7, HepG2 and A549 cells with a pMOI of 1000. 24 hours post transduction, the percentage of eGFP positive cells was determined by flow cytometry. Results are given as mean±standard deviation (n=9). * p≤0.05,  p≤0.01, * p≤0.001, **** p≤0.0001.

It was found that the transduction efficiencies of several tumor cell lines are either improved or preserved when comparing HAdV5-Mut3 to HAdV5 (FIG. 15, see also FIG. 9).

In addition, it was found that the transduction efficiencies of several tumor cell lines are significantly improved when using HAdV5-ΔCAR-Mut3 compared to HAdV5-ΔCAR (FIG. 15). This shows that CAR-independent transduction of tumor cells is enabled by HAdV5-ΔCAR-Mut3.

Significantly Enhanced Transduction of MSCs by Utilization of HAdV5-Mut3 (HAdV-5-M3) and HAdV5-ΔCAR-Mut3 (HAdV-5-ΔCAR-M3) and No Transduction of MSCs by Utilization of HAdV5-ΔHVR1 (HAdV-5-ΔHVR1) and HAdV5-Mut2 (HAdV-5-M2)

Figure 16:
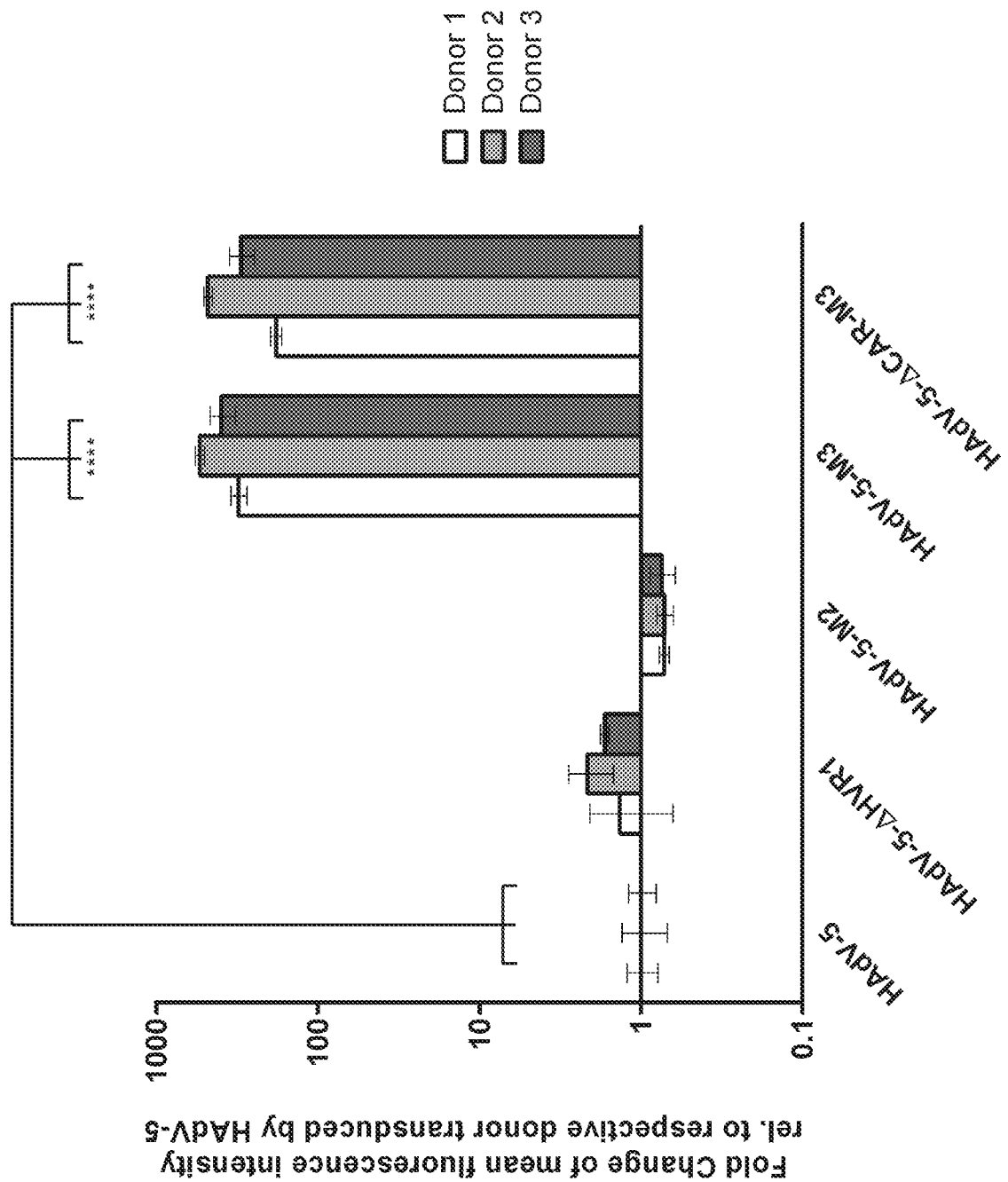
FIG. 16 shows a significantly enhanced transduction of MSCs by utilization of HAdV5-Mut3 (HAdV-5-M3) and HAdV5-ΔCAR-Mut3 (HAdV-5-ΔCAR-M3) and no transduction of MSCs by utilization of HAdV5-ΔHVR1 (HAdV-5-ΔHVR1) and HAdV5-Mut2 (HAdV-5-M2). MSCs were transduced by the specified adenoviral vectors with a pMOI of 1000. 24 hours post transduction, eGFP expression was analyzed by flow cytometry. Results are given as mean±standard deviation (n=3). * p≤0.05, **** p≤0.0001.

It was found that MSCs are efficiently transduced by HAdV5-Mut3 and HAdV5-ΔCAR-Mut3 vectors while nearly no eGFP expression is detected when MSCs are transduced by HAdV5 wildtype (HAdV-5) (FIG. 16, for HAdV5-Mut3 and HAdV5 see also FIG. 10).

It was further found that MSCs are not transduced by HAdV5-ΔHVR1 and HAdV5-Mut2 (FIG. 16).

REFERENCES

Alba, R. et al. Identification of coagulation factor (F)X binding sites on the adenovirus serotype 5 hexon: effect of mutagenesis on FX interactions and gene transfer. Blood 2009; 114:965-971.

Alemany, R. et al. Blood clearance rates of adenovirus type 5 in mice. J. Gen. Virol. 2000; 81:2605-2609.

Fekete N., Gadelorge M. et al. Platelet lysate from whole blood-derived pooled platelet concentrates and apheresis-derived platelet concentrates for the isolation and expansion of human bone marrow mesnchymal stromal cells: production process, content and identification of active components. Cytotherapy 2012; 14:540-554.

Fekete N., Rojewski M. T. et al. GMP-Compliant Isolation and Large-Scale Expansion of Bone Marrow-Derived MSC. PLOS ONE 2012; 7:e43255.

Khare, R. et al. Identification of Adenovirus Serotype 5 Hexon Regions That Interact with Scavenger Receptors. J. Virol. 2012; 86:2293-2301.

Kirby, I. et al. Identification of Contact Residues and Definition of the CAR-Binding Site of Adenovirus Type 5 Fiber Protein. J. Virol. 2000; 74:2804-2813.

Krutzke, L. et al. Substitution of blood coagulation factor X-binding to Ad5 by position-specific PEGylation: Preventing vector clearance and preserving infectivity. J. Controlled Release 2016; 235:379-392.

The invention claimed is:

1. A human adenovirus species C comprising a capsid which comprises a modified adenovirus hexon protein, wherein the modified adenovirus hexon protein has a modified HVR1 region, wherein the modified HVR1 region comprises the sequence DEAATALEINLKKKKQAEQQ (SEQ ID NO.: 1).

2. The adenovirus of claim 1, wherein the adenovirus is adenovirus type 5.

3. The adenovirus of claim 1, wherein the adenovirus is an adenovirus vector or an oncolytic adenovirus.

4. The adenovirus of claim 1, wherein the adenovirus comprises a transgene.

5. The adenovirus of claim 1, wherein the capsid comprises at least one additional capsid modification.

6. A method of treating a human disease in a patient in need thereof, comprising administering the adenovirus of claim 1 to the patient.

7. A nucleic acid encoding a modified adenovirus hexon protein of a human adenovirus species C, wherein the modified adenovirus hexon protein comprises a modified HVR1 region, wherein the modified HVR1 region comprises the sequence of SEQ ID NO.: 1.

8. The nucleic acid of claim 7, wherein the nucleic acid comprises the sequence of SEQ ID NO.: 2.

9. A method of transducing mesenchymal stromal cells (MSCs) or tumor cells comprising contacting the cells with the adenovirus of claim 1.

10. The method of claim 9, further comprising contacting the cells with a transduction enhancer for transducing MSCs.

11. The method of claim 10, wherein the transduction enhancer is selected from the group consisting of coagulation factor X, spermidine, spermine, hexadimethrine bromide, poly-L-lysine and lactoferrin.

12. An in vitro method for transducing MSCs, the method comprising the step of:
  contacting a plurality of MSCs with an adenovirus of claim 1.

13. The method according to claim 12, wherein the plurality of MSCs is further contacted with a transduction enhancer.

14. A transduced MSC obtainable by the method of claim 12.

15. A method of treating a disease in a patient in need thereof, comprising administering the transduced MSC of claim 14.

16. The adenovirus of claim 5, wherein the additional capsid modification is a modified adenovirus fiber protein.

17. The method according to claim 13, wherein the transduction enhancer is selected from the group consisting of coagulation fac-tor X, spermidine, spermine, hexadimethrine bromide, poly-L-lysine and lactoferrin.

18. The adenovirus of claim 1, wherein the modified HVR1 region consists of the sequence DEAATALEINLKKKKQAEQQ (SEQ ID NO.: 1).

19. The nucleic acid of claim 7, wherein the modified HVR1 region consists of the sequence of SEQ ID NO.: 1.

20. The nucleic acid of claim 7, wherein the nucleic acid consists of the sequence of SEQ ID NO.: 2.

21. The adenovirus of claim 1, wherein the modified HVR1 region consists of the sequence of SEQ ID NO.: 43.

* * * * *